United States Patent
Uygun et al.

(10) Patent No.: US 12,167,729 B2
(45) Date of Patent: Dec. 17, 2024

(54) CRYOPRESERVATION OF TISSUES AND ORGANS

(71) Applicant: The General Hospital Corporation, Boston, MA (US)

(72) Inventors: Mustafa Korkut Uygun, Newton, MA (US); Shannon Noella Tessier, Framingham, MA (US); Renier Johan de Vries, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 802 days.

(21) Appl. No.: 17/058,279

(22) PCT Filed: May 30, 2019

(86) PCT No.: PCT/US2019/034744
§ 371 (c)(1),
(2) Date: Nov. 24, 2020

(87) PCT Pub. No.: WO2019/232268
PCT Pub. Date: Dec. 5, 2019

(65) Prior Publication Data
US 2021/0195891 A1    Jul. 1, 2021

Related U.S. Application Data

(60) Provisional application No. 62/677,999, filed on May 3, 2018.

(51) Int. Cl.
*A01N 1/02* (2006.01)
(52) U.S. Cl.
CPC ......... *A01N 1/0284* (2013.01); *A01N 1/0221* (2013.01); *A01N 1/0247* (2013.01)
(58) Field of Classification Search
None
See application file for complete search history.

(56) References Cited

U.S. PATENT DOCUMENTS

| | | |
|---|---|---|
| 1,682,344 A | 8/1928 | Lesieur |
| 1,916,658 A | 7/1933 | Davidson |
| 3,183,961 A | 5/1965 | Brandt |
| 3,406,531 A | 10/1968 | Swenson et al. |
| 3,468,136 A | 9/1969 | Swenson et al. |
| 3,545,221 A | 12/1970 | Swenson et al. |
| 3,607,646 A | 9/1971 | Swenson et al. |
| 3,660,241 A | 5/1972 | Michielsen |
| 3,738,914 A | 6/1973 | Knudson et al. |
| 3,772,153 A | 11/1973 | De Roissart |
| 3,810,367 A | 5/1974 | Peterson |
| 3,843,455 A | 10/1974 | Bier |
| 3,877,843 A | 4/1975 | Fischel |
| 3,881,990 A | 5/1975 | Burton et al. |
| 3,914,954 A | 10/1975 | Doerig |
| 3,995,444 A | 12/1976 | Clark et al. |
| 4,186,565 A | 2/1980 | Toledo-Pereyra |
| 4,242,883 A | 1/1981 | Toledo-Pereyra |
| 4,745,759 A | 5/1988 | Bauer et al. |
| 4,798,824 A | 1/1989 | Belzer et al. |
| 5,194,269 A | 3/1993 | Lee |
| 5,356,771 A | 10/1994 | O'Dell |
| 5,599,659 A | 2/1997 | Brasile et al. |
| 6,046,046 A | 4/2000 | Hassanein |
| 6,524,785 B1 | 2/2003 | Cozzone et al. |
| 6,673,607 B2 | 1/2004 | Toner et al. |
| 6,902,931 B1 | 6/2005 | Toner et al. |
| 7,029,839 B2 | 4/2006 | Toledo-Pereyra et al. |
| 7,094,601 B2 | 8/2006 | Toner et al. |
| 7,250,292 B2 | 7/2007 | Fahy |
| 7,410,474 B1 | 8/2008 | Friend |
| 7,504,201 B2 | 3/2009 | Taylor et al. |
| 7,572,622 B2 | 8/2009 | Hassenein et al. |
| 7,651,835 B2 | 1/2010 | Hassenein et al. |
| 7,691,622 B2 | 4/2010 | Garland et al. |
| 7,749,693 B2 | 7/2010 | Brassil et al. |

(Continued)

FOREIGN PATENT DOCUMENTS

| | | |
|---|---|---|
| DE | 4342728 | 6/1995 |
| EP | 1246903 | 10/2002 |

(Continued)

OTHER PUBLICATIONS

Amir et al. Subzero nonfreezing cryopresevation of rat hearts using antifreeze protein I and antifreeze protein III (2004), 48, pp. 273-282 (Year: 2004).*
Bruinsma et al. Supercooling preservation and transplantation of the rat liver (2015) Nature Protocols, 10, pp. 484-494. (Year: 2015).*
Berendsen et al. Supercooling enables long-term transplantation survival following 4 days of liver preservation (2014) Nature Medicine, 20, pp. 790-794. (Year: 2014).*
Ishikawa et al. Hypothermic temperature effects on organ survival and restoration (2015) Scientific Reports, 5, pp. 1-12 (Year: 2015).*
Bruinsma et al. Subnormothermic Machine Perfusion for Ex Vivo Preservation and Recovery of the Human Liver for Transplantation (2014) American Journal of Transplantation, 14, pp. 1400-1409. (Year: 2014).*

(Continued)

*Primary Examiner* — Kara D Johnson
*Assistant Examiner* — Maytee Marie Contes De Jesus
(74) *Attorney, Agent, or Firm* — Fish & Richardson P.C.

(57) ABSTRACT

This disclosure is related to methods of preserving biological samples such as organs, and tissue. The present disclosure relates to methods of subzero preservation of biological tissue samples, such as entire organs from mammals, e.g., humans. The present disclosure is based, at least in part, on the discovery that biological tissue samples can be supercooled while minimizing formation of ice crystals by reducing liquid-air interfaces and lowering the melting point of the tissue samples, e.g., organs, or liquid in the tissue samples by use of cryoprotective agents while ensuring uniform distribution of cryoprotective agents throughout the biological sample by using improved perfusion techniques.

29 Claims, 17 Drawing Sheets

(56) References Cited

U.S. PATENT DOCUMENTS

| | | | |
|---|---|---|---|
| 7,811,808 | B2 | 10/2010 | Van Der Plaats et al. |
| 7,824,848 | B2 | 11/2010 | Owen et al. |
| 8,268,612 | B2 | 9/2012 | Owen et al. |
| 8,287,580 | B2 | 10/2012 | Rakhorst et al. |
| 8,323,954 | B2 | 12/2012 | Kravitz et al. |
| 8,440,390 | B2 | 5/2013 | Brockbank |
| 8,735,054 | B1 | 5/2014 | Sun et al. |
| 8,765,364 | B2 | 7/2014 | Curtis et al. |
| 8,771,930 | B2 | 7/2014 | Curtis et al. |
| 8,927,257 | B2 | 1/2015 | Hutzenlaub et al. |
| 8,986,978 | B2 | 3/2015 | Brassil |
| 9,078,428 | B2 | 7/2015 | Hassenein et al. |
| 9,215,867 | B2 | 12/2015 | Hassenein et al. |
| 9,247,728 | B2 | 2/2016 | Fishman et al. |
| 9,421,305 | B2 | 8/2016 | Lee et al. |
| 10,076,543 | B2 | 9/2018 | Wilhelmi et al. |
| 10,918,102 | B2 | 2/2021 | Uygun et al. |
| 2003/0073227 | A1 | 4/2003 | Hull |
| 2004/0053207 | A1 | 3/2004 | Griffiths et al. |
| 2004/0058432 | A1 | 3/2004 | Owen et al. |
| 2005/0147958 | A1 | 7/2005 | Hassenein et al. |
| 2005/0221269 | A1 | 10/2005 | Taylor et al. |
| 2007/0009881 | A1 | 1/2007 | Arzt et al. |
| 2007/0042337 | A1 | 2/2007 | Rubinsky et al. |
| 2007/0042339 | A1 | 2/2007 | Toner et al. |
| 2008/0096184 | A1 | 4/2008 | Brasile |
| 2008/0234768 | A1 | 9/2008 | Hassanein et al. |
| 2008/0288399 | A1 | 11/2008 | Curtis et al. |
| 2008/0299535 | A1 | 12/2008 | Tokuda et al. |
| 2009/0017439 | A1 | 1/2009 | Shimko et al. |
| 2009/0123437 | A1 | 5/2009 | Takbe |
| 2011/0183310 | A1 | 7/2011 | Kravitz |
| 2012/0148542 | A1 | 6/2012 | Kravitz |
| 2014/0030231 | A1 | 1/2014 | Yarmush et al. |
| 2015/0175956 | A1 | 6/2015 | Elhofy et al. |
| 2015/0230453 | A1 | 8/2015 | Fontes et al. |
| 2015/0322404 | A1 | 11/2015 | Yarmush et al. |
| 2019/0335745 | A1 | 11/2019 | Fekete et al. |
| 2020/0154697 | A1 | 5/2020 | Toner et al. |
| 2021/0100827 | A1 | 4/2021 | Audia et al. |
| 2022/0095607 | A1 | 3/2022 | Uygun et al. |

FOREIGN PATENT DOCUMENTS

| | | |
|---|---|---|
| KR | 2001/0002227 | 1/2001 |
| WO | WO 2001/048153 | 7/2001 |
| WO | WO 2007/025233 | 3/2007 |
| WO | WO 2008/024195 | 2/2008 |
| WO | WO 2009/099570 | 8/2009 |
| WO | WO 2011/002926 | 1/2011 |
| WO | WO 2011/098367 | 8/2011 |
| WO | WO 2011/140241 | 11/2011 |
| WO | WO 2016/065363 | 4/2016 |
| WO | WO 2018/005802 | 1/2018 |
| WO | WO 2018/232110 | 12/2018 |
| WO | WO 2020/163500 | 8/2020 |
| WO | WO 2020/229761 | 11/2020 |
| WO | WO 2022/241417 | 11/2022 |

OTHER PUBLICATIONS

Bojic et al., "Winter is coming: the future for cryopreservation," BMC Biology, Mar. 2021, 19:56, 20 pages.
Partial European Search Report in European Appln. No. 20752161.8, dated Nov. 30, 2022, 21 pages.
Extended European Search Report in European Appln. No. 20752161.8, dated Mar. 9, 2023, 16 pages.
Hohenberg et al., "High-pressure freezing of cell suspensions in cellulose capillary tubes," Journal of Microscopy, Jul. 1994, 175(1):34-43.
International Search Report and Written Opinion in International Appln. No. PCT/US2022/072229, mailed on Oct. 6, 2022, 15 pages.
[No Author Listed], "Buying time for transplants," Nat. Biotechnol., 2017, 35(9):801.
Academic.Oup.com [online], "78 Optimization of ex-vivo Subnormothermic Oxygenated Machine Perfusion in Vascularized Composite Allograft on Rat to Prolong Preservation Duration," Apr. 9, 2018, retrieved on Aug. 4, 2022, retrieved from URL<https://academic.oup.com/jbcr/article-abstract/39/suppl_1/S44/4965373?redirectedFrom=fulltext>, 7 pages.
Ahlborg et al., "Splanchnic and peripheral glucose and lactate metabolism during and after prolonged arm exercise," J Clin Invest., Mar. 1986, 77(3):690-699.
Almanza et al., "Endoplasmic reticulum stress signalling—from basic mechanisms to clinical applications," FEBS J., 2019, 286(2):241-278.
Amir et al., "Improved viability and reduced apoptosis in sub-zero 21-hour preservation of transplanted rat hearts using anti-freeze proteins," J. Heart Lung Transplant., 2005, 24(11):1915-1929.
Amir et al., "Prolonged 24-hour subzero preservation of heterotopically transplanted rat hearts using antifreeze proteins derived from arctic fish," Ann. Thorac. Surg., May 2004, 77(5):1648-1655.
Amir et al., "Subzero nonfreezing cryopresevation of rat hearts using antifreeze protein I and antifreeze protein III," Cryobiology, Jun. 2004, 48(3):273-282.
Ardehali et al., "Ex-vivo perfusion of donor hearts for human heart transplantation (Proceed II): a prospective, open-label, multicentre, randomised non-inferiority trial," The Lancet, Jun. 2015, 385(9987):2577-2584, 8 pages.
Avruch et al., "A novel model for ex situ reperfusion of the human liver following subnormothermic machine perfusion, " Technology (Singap World Sci.), Dec. 2017, 5(4):196-200, 5 pages.
Azari et al., "Technical Aspects of the Recipient Operation in Hand Transplantation," Journal of Reconstructive Microsurgery, Aug. 2011, 28:27-34, 8 pages.
Bang et al., "Antifreeze peptides and glycopeptides, and their derivatives: Potential uses in biotechnology," Marine Drugs, Jun. 2013, 11(6):2013-2041.
Bangsbo et al., "Lactate and $H^+$ uptake in inactive muscles during intense exercise in man," J Physiol., Oct. 1995, 488(Pt 1):219-229.
Baskin-Bey et al., "Cathepsin B inactivation attenuates hepatocyte apoptosis and liver damage in steatotic livers after cold ischemia-warm reperfusion injury," Am. J. Physiol. Gastrointest. Liver Physiol., Feb. 2005, 288(2):G396-G402.
Baskin-Bey et al., "Clinical Trial of the Pan-Caspase Inhibitor, IDN-6556, in Human Liver Preservation Injury," Am J Transplant, 2007, 7(1):218-25.
Behrends et al., "Network organization of the human autophagy system," Nature, Jul. 2010, 466(7302):68-76.
Bejaoui et al., "Emerging concepts in liver graft preservation," World Journal of Gastroenterology, Jan. 2015, 21(2):396-407.
Bejaoui et al., "Polyethylene Glycol Preconditioning: An Effective Strategy to Prevent Liver Ischemia Reperfusion Injury," Oxid Med Cell Longev, 2016, 2016:9096475, 10 pages.
Bejaoui et al., "Protective Effect of Intravenous High Molecular Weight Polyethylene Glycol on Fatty Liver Preservation," Biomed Res Int, Oct. 2015, 2015:794287, 10 pages.
Belzer and Southard, "Principles of solid-organ preservation by cold storage," Transplantation, Apr. 1988, 45(4):673-676.
Berendsen et al., "A simplified subnormothermic machine perfusion system restores ischemically damaged liver grafts in a rat model of ortholopic liver transplantation, " Transplantation Research, 2012, 1:6, 10 pages.
Berendsen et al., "Hepatocyte viability and ATP content decrease linearly over lime during conventional cold storage of rat liver grails," Transplantation Proceedings, 2011, 43(5):1484-1488.
Berendsen et al., "Supercooling Enables Long-Term Transplantation Survival Following 4 Days of Liver Preservation," Nat. Med. Jul. 2014, 20(7):790-793, 5 pages.
Bessems et al., "Improved Machine Perfusion Preservation of the Non-Heart-Beating Donor Rat Liver Using Polysol, New Machine Perfusion Preservation Solution," Liver Transplantation, 2005, 11(11):1379-1388.
Bessems et al., "Machine Perfusion Preservation of the Pig Liver Using a New Preservation Solution, Polysol," Transplantation Proceedings, 2006, 38:1238-1242.

(56) References Cited

OTHER PUBLICATIONS

Best, "Cryoprotectant Toxicity: Facts, Issues, and Questions," Rejuvenation Res., Oct. 2015, 18(5):422-436.
Blaisdell, "The pathophysiology of skeletal muscle ischemia and the reperfusion syndrome: a review," Cardiovasc Surg, Dec. 2002, 10(6):620-630.
Borghi-Scoazec et al., "Apoptosis after ischemia-reperfusion in human liver allografts," Liver Transplant. Surg. Off. Publ. Am. Assoc. Study Liver Dis. Int. Liver Transplant. Soc., Jul. 1997, 3(4):407-415.
Boteon et al., "Mechanisms of autophagy activation in endothelial cell and their targeting during normothermic machine liver perfusion," World J. Gastroenterol., Dec. 2017, 23(48):8443-8451.
Bral et al., "Preliminary Single-Center Canadian Experience of Human Normothermic Ex Vivo Liver Perfusion: Results of a Clinical Trial," Am. J. Transplant., Apr. 2017, 17(4):1071-1080.
Brenner et al., "Decoding cell death signals in liver inflammation," J Hepatol, Sep. 2013, 59(3):583-94.
Bretschneider et al., "Myocardial resistance and tolerance to ischemia: physiological and biochemical basis," J Cardiovasc Surg (Torino), May-Jun. 1975, 16(3):241-60.
Briard et al., "Small molecule ice recrystallization inhibitors mitigate red blood cell lysis during freezing, transient warming and thawing, " Sci. Rep., 2016, 29(6):23619, 10 pages.
BridgeToLife.com [online], "Belzer UW Cold Storage ViaSpan Reference," 2018, retrieved on Mar. 25, 2022, retrieved from URL<https://bridgetolife.com/wp-content/uploads/2018/06/compare-belzer-uw-cold-storage-solution-viaspan.pdf>, 1 page.
Brockmann et al., "Normothermic Perfusion: A New Paradigm for Organ Preservation," Annals of Surgery, Jul. 2009, 250(1):1-6.
Bruinsma and Uygun, "Subzero organ preservation: the dawn of a new ice age?," Curr. Opin. Organ Transplant., 2017, 22(3):281-286, 6 pages.
Bruinsma et al., "Determination and Extension of the Limits to Static Cold Storage with Subnormothermic Machine Perfusion," The International Journal of Artificial Organs, 2013, 36(11):775-780.
Bruinsma et al., "Functional Human Liver Preservation and Recovery by Means of Subnormothermic Machine Perfusion," J Vis Exp, 2015, 98:e52777, 5 pages.
Bruinsma et al., "Metabolic profiling during ex vivo machine perfusion of the human liver," Sci. Rep., 2016, 6:22415, 13 pages.
Bruinsma et al., "Peritransplant energy changes and their correlation to outcome after human liver transplantation, " Transplantation, 2017, 101(7):1637-1644.
Bruinsma et al., "Subnormothermic Machine Perfusion for Ex Vivo Preservation and Recovery of the Human Liver for Transplantation: Subnormothermic Machine Perfusion of Human Livers," Am. J. Transplant., 2014, 14(6):1400-1409.
Bruinsma et al., "Supercooling preservation and transplantation of the rat liver," Nat. Protoc., Mar. 2015, 10(3):484-494.
Buis et al., "Altered bile composition after liver transplantation is associated with the development of nonanastomotic biliary strictures," Journal of Hepatology 50:69-79 (2009).
Burkey et al., "Understanding Poly(vinyl alcohol)-Mediated Ice Recrystallization Inhibition through Ice Adsorption Measurement and pH Effects," Biomacromolecules, 2018, 19(1):248-55, 40 pages.
Burlage et al., "Abstract B384: Ex-vivo Subnormothermic Oxygenated Machine Perfusion of Rodent Hindlimb: Feasibility Study to Elongate Preservation Time of Vascularized Composite Allograft," Abstract, Presented at Proceedings of the 2018 American Transplant Congress, Seattle, WA, Jun. 2-6, 2018, 4 pages.
Burlage et al., "Abstract: Ex-vivo Subnormothermic Oxygenated Machine Perfusion of Rodent Hindlimb: Feasibility Study to Elongate Preservation Time of Vascularized Composite Allograft," Abstract, Presented at Proceedings of the Plastic Surgery Research Council 63rd Annual Meeting, Birmingham, AL, May 17-20, 2018, 2 pages.
Burlage et al., "Advances in machine perfusion, organ preservation, and cryobiology: potential impact on vascularized composite allotransplantation," Curr Opin Organ Transplant, Oct. 2018, 23(5):561-567.
Burlage et al., "Optimization of Subnormothermic Machine Perfusion for Ex Vivo Preservation of Rodent Vascularized Composite Allografts," J Surg Res, Feb. 2022, 270:151-161.
Butler et al., "Successful extracorporeal porcine liver perfusion for 72 hr," Transplantation, 2002, 73(8):1212-1218.
Campbell et al., "Restoration of ovarian function and natural fertility following the cryopreservation and autotransplantation of whole adult sheep ovaries," Hum. Reprod., Jun. 2014, 29(8):1749-1763.
Celik et al., "Microfluidic experiments reveal that antifreeze proteins bound to ice crystals suffice to prevent their growth," Proc. Nat'l Acad. Sci. U S A, 2013, 110(4):1309-1314.
Chawade et al., "Normalyzer: a tool for rapid evaluation of normalization methods for omics data sets," J. Proteome Res., 2014, 13(6):3114-3120.
Chazouilleres et al., "Protective Effect of Vasodilators on Liver Function after Long Hypothermic Preservation: A Study in the Isolated Perfused Rat Liver," Hepatology, Jun. 1989, 9(6):824-829.
Chen et al., "A Versatile Polypharmacology Platform Promotes Cytoprotection and Viability of Human Pluripotent and Differentiated Cells," Nature Methods, 2021, 18:528-541.
Chen et al., "Effective Application of ET-Kyoto Solution for Clinical Lung Transplantation," Transplantation Proceedings, 2004, 36:2812-2815.
Cho et al., "Changes in the expression of cell cycle regulators during rat liver regeneration after partial hepatectomy, " Exp. Mol. Med., 1996, 28(4):187-191.
Consoli et al., "Contribution of liver and skeletal muscle to alanine and lactate metabolism in humans," Am J Physiol, Nov. 1990, 259:E677-684.
Constantinescu et al., "Preservation of amputated extremities by extracorporeal blood perfusion; a feasibility study in a porcine model, " J Surg Res, Nov. 2011, 171(1):291-299.
Costanzo et al., "Hibernation physiology, freezing adaptation and extreme freeze tolerance in a northern population of the wood frog," J. Exp. Biol., Sep. 2013, 216(Pt 18):3461-3473.
Cypel et al., "Normothermic Ex Vivo Perfusion Prevents Lung Injury Compared to Extended Cold Preservation for Transplantation," American Journal of Transplantation, 2009, 9(10):2262-2269.
De Rougemont et al., "One Hour Hypothermic Oxygenated Perfusion (HOPE) Protects Nonviable Liver Allografts Donated Aller Cardiac Death," Annals of Surgery, 2009, 250(5):674-683.
De Vera et al., "Liver Transplantation Using Donation Aller Cardiac Death Donors: Long-Term Follow-Up from a Single Center," American Journal of Transplantation, 2009, 9(4):773-781.
De Vries et al., "Abstract 615.2: Extending the Human Liver Preservation Time for Transplantation by Supercooling, " Transplantation, Jul. 2018, 102(7S):S396.
De Vries et al., "Ex situ normothermic machine perfusion of donor livers using a haemoglobin-based oxygen carrier: a viable alternative to red blood cells," Transplant International, 2018, 31:1281-1282.
De Vries et al., "Pretransplant sequential hypo- and normothermic machine perfusion of suboptimal livers donated after circulatory death using a hemoglobin-based oxygen carrier perfusion solution," Am. J. Transplant. Off. J. Am. Soc. Transplant. Am. Soc. Transpl. Surg., 2019, 19:1202-1211.
De Vries et al., "Supercooling extends preservation time of human livers," Nat. Biotechnol., Oct. 2019, 37(10):1131-1136, 10 pages.
De Vries et al., "Systems engineering the organ preservation process for transplantation," Curr. Op. Biotechnol., Aug. 2019, 58:192-201.
Devireddy et al., "Liver Freezing Response of the Freeze-Tolerant Wood Frog, *Rana sylvatica*, in the Presence and Absence of Glucose. I. Experimental Measurements," Cryobiology, 1999, 38:310-326.
Do Amaral et al., "Hepatocyte responses to in vitro freezing and β-adrenergic stimulation: Insights into the extreme freeze tolerance of subarctic Rana sylvatica," J. Exp. Zool. Part Ecol. Genet. Physiol., 2015, 323(2):89-96.

(56) References Cited

OTHER PUBLICATIONS

Dobin et al., "STAR: ultrafast universal RNA-seq aligner," Bioinformatics, Jan. 2013, 29(1):15-21.
Donato et al., "Liver grafts preserved in Celsior solution as source of hepatocytes for drug metabolism studies: comparison with surgical liver biopsies," Drug Metabolism and Disposition, 2005, 33(1):108-114.
Dutheil et al., "Polyethylene glycols interact with membrane glycerophospholipids: is this part of their mechanism for hypothermic graft protection?," J. Chem. Biol., Mar. 2009, 2(1):39-49.
Dutkowski et al., "HOPE for human liver grails obtained from donors after cardiac death," Journal of Hepatology, 2014, 50:765-772.
Eickhoff et al., "Contrasting Behavior of Antifreeze Proteins: Ice Growth Inhibitors and Ice Nucleation Promoters," J. Phys. Chem. Lett., 2019,10(5):966-972.
Emadali et al., "Distinct endoplasmic reticulum stress responses are triggered during human liver transplantation," J. Pathol., Sep. 2005, 207(1):111-118.
EP Extended European Search Report in EP Appln. No. 18816781.1, dated Jul. 23, 2020, 13 pages.
EP Office Action in European Appln. No.18816781.1, dated Aug. 24, 2021, 6 pages.
EP Supplementary Partial European Search Report in European Appln. No. EP 18816781, dated Apr. 21, 2020, 16 pages.
Eshmuminov et al., "An integrated perfusion machine preserves injured human livers for 1 week," Nat. Biotechnol., Feb. 2020, 38(2):189-198.
Fahy et al., "Cryopreservation of Complex Systems: The Missing Link in the Regenerative Medicine Supply Chain," Rejuvenation Res., Jun. 2006, 9(2)279-291.
Fahy et al., "Cryopreservation of organs by vitrification: perspectives and recent advances," Cryobiology, Apr. 2004, 48(2):157-178.
Fahy et al., "Physical and biological aspects of renal vitrification," Organogenesis, 2009, 5(3):167-175.
Fahy, "Analysis of 'solution effects' injury: Cooling rate dependence of the functional and morphological sequellae of freezing in rabbit renal cortex protected with dimethyl sulfoxide," Cryobiology, 1981, 18(6):550-570.
Fairlie et al., "Crosstalk between apoptosis and autophagy signaling pathways," Int Rev Cell Mol Biol, 2020, 352:115-158.
Farrant, "Mechanism of cell damage during freezing and thawing and its prevention," Nature, 1965, 205:1284-1287.
Ferrigno et al., "Machine perfusion at 20° C. reduces preservation damage to livers from non-heart beating donors," Cryobiology, 2011, 62:152-158.
Fichter et al., "Development of an Extracorporeal Perfusion Device for Small Animal Free Flaps," PLoS One, 2016, 11:e0147755, 17 pages.
Fontes et al., "Liver preservation with machine perfusion and a newly developed cell-free oxygen carrier solution under subnormothermic conditions," Am J Transplant, Feb. 2015, 15(2):381-394.
Friend et al., "Normothermic Perfusion of the Isolated Liver," Transplantation Proceedings, 2001, 33:3436-3438.
Galluzzi et al., "Caspases Connect Cell-Death Signaling to Organismal Homeostasis," Immunity, 2016, 44:221-31.
Gearing et al., "CiiiDER: a tool for predicting and analysing transcription factor binding sites," PLoS One, 2019, 14:e0215495, 12 pages.
Geuken et al., "Rapid increase of bile salt secretion is associated with bile duct injury after human liver transplanlation," Journal of Hepatology, 2004, 41(6):1017-1025.
Giknis et al., "Clinical Laboratory Parameters for the Crl:CD(SD) Rats," Charles River Laboratories, 2006, 16 pages.
Giwa et al., "The promise of organ and tissue preservation to transform medicine," Nat Biotechnol., 2017, 35(6):530-542.
Gratwohl et al., "Hematopoietic Stem Cell Transplantation A Global Perspective," JAMA J. Am. Med. Assoc., Apr. 2010, 303(16)1617-1624.

Graw et al., "proteiNorm—A User-Friendly Tool for Normalization and Analysis of TMT and Label-Free Protein Quantification," ACS Omega 2020, 5(40):25625-25633.
Gringeri et al., "Subnormothermic machine perfusion for non-heart-beating donor liver grafts preservation in a Swine model: a new strategy to increase the donor pool?," Transplant. Proc., 2012, 44(7):2026-2028.
Gu et al., "circlize Implements and enhances circular visualization in R," Bioinformatics, Oct. 2014, 30(19):2811-2, 2 pages.
Guarrera et al., "Hypothermic Machine Preservation in Human Liver Transplantation: The First Clinical Series," American Journal of Transplantation, 2010, 10(2):372-381.
Guarrera et al., "Pushing the envelope in renal preservation; improved results with novel perfusate modifications for pulsatile machine perfusion of cadaver kidneys," Transplant Proc., 2004, 36(5):1257-60.
Guibert et al., "Organ Preservation: Current Concepts and New Strategies for the Next Decade," Transfusion Medicine and Hemotherapy, 2011, 38:125-142.
Guicciardi and Gores, "Apoptosis: a mechanism of acute and chronic liver injury," Gut, 2005, 54:1024-33.
Guicciardi et al., "Apoptosis and necrosis in the liver," Compr Physiol, 2013, 3(2):977-1010.
Hamilton et al., "Successful preservation of canine small intestine by freezing," J. Surg. Res., 1973, 14(4):313-318.
Han et al., "Beneficial Effects of Freezing Rate Determined by Indirect Thermophysical Calculation on Cell Viability in Cryopreserved Tissues," Artif. Cells. Blood Substit. Immobil. Biotechnol., Jan. 2006, 34(2)205-221.
Harrison et al., "A randomized, placebo-controlled trial of emricasan in patients with NASH and F1-F3 fibrosis," J Hepatol, 2020, 72:816-827.
Hasan et al., "Ice Recrystallization Inhibiting Polymers Enable Glycerol-Free Cryopreservation of Microorganisms, " Biomacromolecules, 2018, 19(8):3371-3376.
Hautz et al., "Histomorphometric evaluation of ischemia-reperfusion injury and the effect of preservation solutions histidine-tryptophan-ketoglutarate and University of Wisconsin in limb transplantation, " Transplantation, 2014, 98(7):713-720.
Hertl et al., "Evidence of Preservation Injury to Bile Ducts by Bile Salts in the Pig and Its Prevention by Infusions of Hydrophilic Bile Salts, " Hepalology, 1995, 21(4):1130-1137.
Higashi et al., "Restoration of ATP contents in the transplanted liver closely relates to graft viability in dogs," Eur. Surg. Res. Eur. Chir. Forsch. Rech. Chir. Eur., 1989, 21:76-82.
Hoekstra et al., "Bile Sall Toxicity Aggravates Cold Ischemic Injury of Bile Ducts Aller Liver Transplantation in Mdr2 $^{+/-}$ Mice," Hepatology, 2006, 43(5):1022-1031.
Hoffmann et al., "The use of oncotic support agents in perfusion preservation," Organ Preservation, 1982, 5 pages.
Hoglen et al., "A caspase inhibitor, IDN-6556, ameliorates early hepatic injury in an ex vivo rat model of warm and cold ischemia," Liver Transpl, 2007, 13:361-6.
Hoglen et al., "Characterization of IDN-6556 (3-{2-(2-tert-Butylphenylaminooxalyl)-amino]-propionylamino}-4-oxo-5-(2,3,5,6-tetrafluoro-phenoxy)-pentanoic Acid): a Liver-Targeted Caspase Inhibitor," The Journal of Pharmacology and Experimental Therapeutics, 2008, 309(2):634-640.
Hohenester et al., "A Biliary HCO3-Umbrella Constitutes a Protective Mechanism Against Bile Acid-Induced Injury in Human Cholangiocytes," Hepatology, 2012, 55(1):173-183.
Huang et al., "Long-term deep-supercooling of large-volume water and red cell suspensions via surface sealing with immiscible liquids, " Nat. Commun., 2018, 9:3201, 10 pages.
Huber et al., "Variance stabilization applied to microarray data calibration and to the quantification of differential expression," Bioinformatics, 2002, 18(Suppl 1):S96-104.
Hughes et al., "Isolation of Hepatocytes from Livers from Non-Heart-Beating Donors for Cell Transplantation, " Liver Transplantation, 2006, 12:713-717.
Hunt et al., "Freeze-substitution and isothermal freeze-fixation studies to elucidate the pattern of ice formation in smooth muscle at 252 K (-21° C.)," J. Microsc., 1982, 125(2):177-186.

(56) References Cited

OTHER PUBLICATIONS

Hunt, "Studies on cellular structure and ice location in frozen organs and tissues: The use of freeze-substitution and related techniques," Cryobiology, 1984, 21(4):385-402.
Imber et al., "Optimisation of Bile Production during Normothermic Preservation of Porcine Livers," American Journal of Transplantation, 2002, 2(7):593-599.
International Preliminary Report on Patentability in International Appln. No. PCT/US2015/020336, dated Sep. 13, 2016, 5 pages.
International Preliminary Report on Patentability in International Appln. No. PCT/US2018/037525, dated Dec. 17, 2019, 6 pages.
International Preliminary Report on Patentability in International Appln. No. PCT/US2019/034744, dated Dec. 10, 2020, 7 pages.
International Preliminary Report on Patentability in International Appln. No. PCT/US2020/016840, mailed on Aug. 19, 2021, 11 pages.
International Search Report and Written Opinion in International Appln. No. PCT/US2015/020336, dated Jun. 25, 2015, 7 pages.
International Search Report and Written Opinion in International Appln. No. PCT/US2018/037525, dated Aug. 29, 2018, 14 pages.
International Search Report and Written Opinion in International Appln. No. PCT/US2019/034744, dated Aug. 16, 2019, 10 pages.
International Search Report and Written Opinion in International Appln. No. PCT/US2020/016840, mailed on Jun. 22, 2020, 14 pages.
Invitation to Pay Additional Fees And, Where Applicable, Protest Fee in International Appln. No. PCT/US2020/016840, mailed on Apr. 13, 2020, 2 pages.
Invitation to Pay Additional Fees And, Where Applicable, Protest Fee in International Appln. No. PCT/US2022/072229, mailed on Jul. 18, 2022, 3 pages.
Ishiguro and Rubinsky, "Mechanical interactions between ice crystals and red blood cells during directional solidification," Cryobiology, 1994, 31(5):483-500.
Ishine et al., "A Histological Analysis of Liver Injury in Freezing Storage," Cryobiology, 1999, 39(3):271-277.
Ishine et al., "Transplantation of Mammalian Livers Following Freezing: Vascular Damage and Functional Recovery," Cryobiology, 2000, 40(1):84-89.
Izamis, "Ex vivo Perfusion Optimization of Donor Liver Grafts for Transplantation and Cell Isolation," Thesis for the degree of Doctor of Philosophy, Massachusetts Institute of Technology, Jun. 2010, 242 pages.
Jacobsen et al., "Transplantation of rabbit kidneys perfused with glycerol solutions at 10° C.," Cryobiology, 1978, 15(1):18-26.
Jain et al., "Long-Term Survival After Liver Transplantation in 4,000 Consecutive Patients at a Single Center," Annals of Surgery, 2000, 232(4):490-500.
Jassem et al., "Normothermic machine perfusion (NMP) inhibits proinflammatory responses in the liver and promotes regeneration," Hepatology, 2019, 70(2):682-695, 34 pages.
Kamiike et al., "Adenine nucleotide metabolism and its relation to organ viability in human liver transplantation, " Transplantation, 1988, 45(1):138-143.
Kan et al., "Perfusion of medium with supplemented growth factors changes metabolic activities and cell morphology of hepatocyte-nonparenchymal cell coculture," Tissue Eng., Oct. 2004, 10(9-10):1297-307.
Karimian et al., "Ex Situ normothermic machine perfusion of donor livers," J. Vis. Exp., 2015, 99:e52688, 9 pages.
Katenz et al., "Cryopreservation of primary human hepatocytes: The benefit of trehalose as an additional cryoprotective agent," Liver Transplant., 2007, 13(1):38-45.
Kaufman et al., "Immunobiology in VCA," Transplant International, 2016, 29(6):644-654.
Koetting et al., "Donation After Cardiac Death: Dynamic Graft Reconditioning During or After Ischemic Preservation?," Artificial Organs, 2011, 35(6):565-571.

Kramer et al., "Differentiation between cell death modes using measurements of different soluble forms of extracellular cytokeratin 18," Cancer Res, 2004, 64(5):1751-6.
Kueckelhaus et al., "A Mobile Extracorporeal Extremity Salvage System for Replantation and Transplantation," Ann Plast Surg, 2016, 76(3):355-360.
Kueckelhaus et al., "Vascularized composite allotransplantation: current standards and novel approaches to prevent acute rejection and chronic allograft deterioration," Transpl Int, 2016, 29(6):655-662.
Kuiper et al., "The biological function of an insect antifreeze protein simulated by molecular dynamics," eLife, 2015, 4:e05142, 14 pages.
Kuleshova et al., "Vitrification as a Prospect for Cryopreservation of Tissue-Engineered Constructs," Biomaterials, Mar. 2007, 28(9):1585-1596.
Laing et al., "The Use of an Acellular Oxygen Carrier in a Human Liver Model of Normothermic Machine Perfusion," Transplantation, 2017, 101(11):2746-2756.
Laing et al., "Viability testing and transplantation of marginal livers (VITTAL) using normothermic machine perfusion: study protocol for an open-label, nonrandomised, prospective, single-arm trial," BMJ Open, 2017, 7(11):e017733, 15 pages.
Lamming et al., "Hepatic signaling by the mechanistic target of rapamycin complex 2 (mTORC2)," FASEB J., 2014, 28(1):300-15, 16 pages.
Landin et al., "Perioperative ischemic injury and fibrotic degeneration of muscle in a forearm allograft: functional follow-up at 32 months post transplantation," Ann Plast Surg, 2011, 66:202-209.
Lanir et al., "Hepatic Transplantation Survival: Correlation with Adenine Nucleotide Level in Donor Liver," Hepatology, 1988, 8(3):471-475.
Layne et al., "Freeze duration influences postfreeze survival in the frog Rana sylvatica," J. Exp. Zool., 1998, 280(2):197-201.
Lee et al., "Metabolic Flux Analysis of Postburn Hepatic Hypermetabolism," Metabolic Engineering, 2000, 2:312-327.
Lewis et al., "The Grand Challenges of Organ Banking: Proceedings from the First Global Summit on Complex Tissue Cryopreservation," Cryobiology, Apr. 2016, 72(2):169-182.
Libbrecht, "Physical Dynamics of Ice Crystal Growth," Annu. Rev. Mater. Res., 2017, 47(1):7.1-7.25.
Lin and Carroll, "The effect of calcium and magnesium on frozen rat uteri, and the calcium content of uteri frozen by various procedures," Cryobiology, 1968, 5(2):105-108.
Liu and Green, "Endoplasmic reticulum stress and liver diseases," Liver Res., 2019, 3(1):55-64.
Liu et al., "Cryopreservation of human spermatozoa with minimal non-permeable cryoprotectant," Cryobiology, Aug. 2016, 73(2):162-167.
Liu et al., "Preservation of Mouse Sperm by Convective Drying and Storing in 3-O-Methyl-D-Glucose," PLoS One, 2012, 7(1):e29924, 7 pages.
Lüer et al., "Role of oxygen during hypothermic machine perfusion preservation of the liver," Transplant International, 2010, 23(9):944-950.
Luu and Storey, "Solving Donor Organ Shortage with Insights from Freeze Tolerance in Nature: Activating endogenous antioxidant systems with non-coding RNA to precondition donor organs," BioEssays News Rev. Mol. Cell. Dev. Biol., 2018, 40(10):e1800092, 5 pages.
Manuchehrabadi et al., "Improved tissue cryopreservation using inductive heating of magnetic nanoparticles," Sci. Transl. Med., 2017, 9(379):eaah4586, 11 pages.
Martins et al., "The role of normothermic machine perfusion in liver transplantation," Int J Surg, 2020, 82(S):52-60, 9 pages.
Matton et al., "Biliary Bicarbonate, pH and Glucose Are Suitable Biomarkers of Biliary Viability During Ex Situ Normothermic Machine Perfusion of Human Donor Livers," Transplantation, 2018, 103(7):1405-1413.
Matton et al., "Normothermic machine perfusion of donor livers without the need for human blood products," Liver Transpl, 2018, 24(4):528-538.

(56) References Cited

OTHER PUBLICATIONS

McCord, "Oxygen-derived free radicals in postischemic tissue injury," The New England Journal of Medicine, 1985, 312(3):159-163.
McCormack et al., "Use of Severely Steatotic Grafts in Liver Transplantation: A Matched Case-Control Study," Annals of Surgery, 2007, 246(6):940-948.
Mergental et al., "Transplantation of Declined Liver Allografts Following Normothermic Ex-Situ Evaluation," Am. J. Transplant. Off. J. Am. Soc. Transplant. Am. Soc. Transpl. Surg., 2016, 16(11):3235-3245.
Mergental et al., "Transplantation of discarded livers following viability testing with normothermic machine perfusion," Nat. Commun., 2020, 11:2939, 13 pages.
Michalopoulos and Bhushan, "Liver regeneration: biological and pathological mechanisms and implications," Nat. Rev. Gastroenterol. Hepatol., 2021, 18:40-55, 16 pages.
Minor et al., "Controlled Oxygenated Rewarming of Cold Stored Liver Grafts by Thermally Graduated Machine Perfusion Prior to Reperfusion," American Journal of Transplantation, 2013, 13(6):1450-1460.
Minor et al., "Fibrinolysis in organ procurement for transplantation after cardiocirculatory compromise," Thrombosis and Haemostasis, 2003, 90:361-362.
Mitchell et al., "Energy Metabolism Following Prolonged Hepatic Cold Preservation: Benefits of Interrupted Hypoxia on the Adenine Nucleotide Pool in Rat Liver," Cryobiology, 1999, 39(2):130-137.
Miyagi et al., "The Significance of Preserving the Energy Status and Microcirculation in Liver Grafts From Non-Heart-Beating Donor," Cell Transplantation, 2008, 17:173-178.
Monbaliu et al., "Preserving the Morphology and Evaluating the Quality of Liver Grafts by Hypothermic Machine Perfusion: A Proof-of-Concept Study Using Discarded Human Livers," Liver Transplantation, 2012, 18(12):1495-1507.
Moore et al., "Impact of Donor, Technical, and Recipient Risk Factors on Survival and Quality of Life After Liver Transplantation," Archives of Surgery, 2005, 140(3):273-277.
Moradi et al., "Artificial Blood Substitutes: First Steps on the Long Route to Clinical Utility," Clin Med Insights Blood Disord. 2016, 9:33-41.
Moss et al., "Observations on the effects of glycerol on the cold storage of the canine liver," J. Surg. Res., 1966, 6(4):147-151.
Mueller et al., "Caspase 3 inhibition improves survival and reduces early graft injury after ischemia and reperfusion in rat liver transplantation," Transplantation, 2004, 78(9):1267-73.
Mugnano et al., "Antifreeze glycoproteins promote intracellular freezing of rat cardiomyocytes at high subzero temperatures," Am. J. Physiol. Regul. Integr. Comp. Physiol., 1995, 269(2):R474-479.
Müller et al., "Ischemia/reperfusion injury of porcine limbs after extracorporeal perfusion," J Surg Res, 2013, 181(1):170-182.
Mundinger et al., "Infrared fluorescence imaging of lymphatic regeneration in nonhuman primate facial vascularized composite allografts," Ann Plast Surg, 2012, 68(3):314-319.
Murata and Tanaka, "Liquid-liquid transition without macroscopic phase separation in a water-glycerol mixture," Nat. Mater., 2012, 11:436-443.
Murata et al., "Superoxide dismutase mimetic m40401 reduces ischemia-reperfusion injury and graft coronary artery disease in rodent cardiac allografts," Transplantation, 2004, 78(8):1166-1171.
Nasralla et al., "A randomized trial of normothermic preservation in liver transplantation," Nature, 2018, 557(7703):50-56, 23 pages.
Nassar et al., "Ex Vivo Normothermic Machine Perfusion Is Safe, Simple, and Reliable: Results From a Large Animal Model," Surg. Innov., 2015, 22:61-69, 10 pages.
Natori et al., "Apoptosis of sinusoidal endothelial cells occurs during liver preservation injury by a caspase-dependent mechanism," Transplantation, 1999, 68:89-96.
Natori et al., "The caspase inhibitor IDN-6556 prevents caspase activation and apoptosis in sinusoidal endothelial cells during liver preservation injury," Liver Transpl, 2003, 9(3):278-84.

Naullage et al., "Molecular Recognition of Ice by Fully Flexible Molecules," J. Phys. Chem. C, 2017, 121(48):26949-26957.
Nelson et al., "An improved ex vivo method of primary porcine hepatocyte isolation for use in bioartificial liver systems," European Journal of Gastroenterology & Hepatology, 2000, 12(8):923-930.
Nösser et al., "Development of a Rat Liver Machine Perfusion System for Normothermic and Subnormothermic Conditions," Tissue Eng. Part A, 2020, 26(1):57-65.
Ohman et al., "Activation of autophagy during normothermic machine perfusion of discarded livers is associated with improved hepatocellular function," Am J Physiol Gastrointest Liver Physiol., Jan. 2022, 322(1):G21-G33.
Okamoto et al., "Successful Sub-zero Non-freezing Preservation of Rat Lungs at -2° C. Utilizing a New Supercooling Technology," Journal of Heart and Lung Transplantation, 2008, 27(10):1150-1157.
Oltean et al., "Intraluminal polyethylene glycol stabilizes tight junctions and improves intestinal preservation in the rat," Am. J. Transplant. Off. J. Am. Soc. Transplant. Am. Soc. Transpl. Surg., 2012, 12(8):2044-2051.
Op den Dries et al., "Ex vivo Normothermic Machine Perfusion and Viability Testing of Discarded Human Donor Livers," American Journal of Transplantation, 2013, 13:1327-1335, 9 pages.
Op den Dries et al., "Hypothermic Oxygenated Machine Perfusion Prevents Arteriolonecrosis of the Peribiliary Plexus in Pig Livers Donated after Circulatory Death," PLoS ONE, 2014, 9;e88521, 10 pages.
OrganPreservationAlliance.org [online], "Building a Roadmap for Solving Organ Disease and Impairement," available on or before Feb. 29, 2016, via Internet Archive: Wayback Machine URL <http://web.archive.org/web/20160229102808/http://www.organpreservationalliance.org:80/roadmap/>, retrieved on Aug. 8, 2022, URL<retrieved on Aug. 8, 2022, retrieved from URL<http://www.organpreservationalliance.org:80/roadmap/>, 2 pages.
Orning and Lien, "Multiple roles of caspase-8 in cell death, inflammation, and innate immunity," J Leukoc Biol, 2020, 109:121-141.
Ott et al., "Solid-liquid phase equilibria in water + ethylene glycol," J. Chem. Thermodyn., 1972, 4:123-126.
Ozer et al., "The Effect of Ex Situ Perfusion in a Swine Limb Vascularized Composite Tissue Allograft on Survival up to 24 Hours," J Hand Surg Am, 2016, 41:3-12.
Panizo et al., "Ischemic injury in posttransplant endomyocardial biopsies: immunohistochemical study of fibronectin," Transplant Proc, 1999, 31:2550-2551.
Pegg, "The relevance of ice crystal formation for the cryopreservation of tissues and organs," Cryobiology, 2010, 60(3 supp):S36-44.
Perk et al., "A fitness index for transplantation of machine-perfused cadaveric rat livers," BMC Research Notes, 2012, 5:325, 7 pages.
Perk et al., "A Metabolic Index of Ischemic Injury for Perfusion-Recovery of Cadaveric Rat Livers," PLoS ONE, 2011, 6(12): e28518, 11 pages.
Peter et al., "Hepatic Control of Perfusate Homeostasis During Normothermic Extrocorporeal Preservation," Transplantation Proceedings, 2003, 35(4):1587-1590.
QiagenBioinformatics.com [online], "Ingenuity Pathway Analysis," available on or before Feb. 21, 2019, via Internet Archive: Wayback Machine URL<http://web.archive.org/web/20190221071551/https://www.qiagenbioinformatics.com/products/ingenuity-pathway-analysis/>, retrieved on Aug. 8, 2022, URL<https://www.qiagenbioinformatics.com/products/ingenuity-pathway-analysis>, 4 pages.
Raigani et al., "Pumping new life into old ideas: Preservation and rehabilitation of the liver using ex situ machine perfusion," Artif Organs, 2020, 44(2):123-128, 6 pages.
Raigani et al., "Viability testing of discarded livers with normothermic machine perfusion: Alleviating the organ shortage outweighs the cost," Clin. Transplant., 2020, 34(11):e14069, 26 pages.
Ray, "Preserving the liver for transplantation," Nat. Rev. Gastroenterol. Hepatol., 2018, 15(6):327.
Reddy et al., "Non-Heart-Beating Donor Porcine Livers: the Adverse Effect of Cooling," Liver Transplantation, 2005, 11(1):35-38.
Reddy et al., "Preservation of porcine non-heart-beating donor livers by sequential cold storage and warm perfusion," Transplantation, 2004, 77(9):1328-1332.

(56) References Cited

OTHER PUBLICATIONS

Reiling et al., "Urea production during normothermic machine perfusion: Price of success?," Liver Transplant. Off. Publ. Am. Assoc. Study Liver Dis. Int. Liver Transplant. Soc., 2015, 21(5):700-703.
Rigo et al., Extracellular Vesicles from Human Liver Stem Cells Reduce Injury in an Ex Vivo Normothermic Hypoxic Rat Liver Perfusion Model. Transplantation., May 2018, 102(5):e205-10.
Ritchie et al., "limma powers differential expression analyses for RNA-sequencing and microarray studies," Nucleic Acids Res., 2015, 43(7):e47, 13 pages.
Robinson and Newsholme, "Some properties of hepatic glycerol kinase and their relation to the control of glycerol utilization," Biochem. J., 1969, 112(4):455-464.
Robinson et al., "edgeR: a Bioconductor package for differential expression analysis of digital gene expression data," Bioinformatics, 2010, 26(1):139-140.
Rubinsky et al., "The process of freezing and the mechanism of damage during hepatic cryosurgery," Cryobiology, 1990, 27(1):85-97.
Sakaguchi et al., "Preservation of Myocardial Function and Metabolism at Subzero Nonfreezing Temperature Storage of the Heart," The Journal of Heart and Lung Transplantation, 1996, 15(11):1101-1107, 8 pages.
Sanders et al., "The effect of rapamycin on DNA synthesis in multiple tissues from late gestation fetal and postnatal rats," Am. J. Physiol. Cell Physiol., 2008, 295:C406-C413.
Schlegel and Dutkowski, "Letter to editor: repair or prevent: what is the real impact of normothermic machine perfusion in liver transplantation?," Hepatology, 2019, 70(6):2231-2232, 4 pages.
Schlegel et al., "Hypothermic oxygenated perfusion (HOPE) protects from biliary injury in a rodent model of DCD Liver transplantation," Journal of Hepatology 59:984-991 (2013).
Searle et al., "Chromatogram libraries improve peptide detection and quantification by data independent acquisition mass spectrometry," Nat. Commun., 2018, 9:5128, 12 pages.
Selzner et al., "Normothermic ex vivo liver perfusion using steen solution as perfusate for human liver transplantation: First North American results," Liver Transplant. Off. Publ. Am. Assoc. Study Liver Dis. Int. Liver Transplant. Soc., 2016, 22:1501-1508.
Serracino-Inglott et al., "Hepatic ischemia-reperfusion injury," The American Journal of Surgery, 2001, 181:160-166.
Shannon et al., "Cytoscape: a software environment for integrated models of biomolecular interaction networks," Genome Res., 2003, 13(11):2498-504.
Shen et al., "Decreased hepatocyte autophagy leads to synergistic IL-1β and TNF mouse liver injury and inflammation," Hepatology, 2020, 72:595-608, 31 pages.
Shigeta et al., "Impact of Rewarming Preservation by Continuous Machine Perfusion: Improved Post-Transplant Recovery in Pigs," Transplantation Proceedings, 2013, 45(5):1684-1689.
Soltys et al., "Successful Nonfreezing, Subzero Preservation of Rat Liver with 2,3-Butanediol and Type I Antifreeze Protein," Journal of Surgical Research, 2001, 96(1):30-34.
Sosa et al., "Early cytokine signatures of ischemia/reperfusion injury in human orthotopic liver transplantation," JCI Insight, 2016, 1:e89679, 17 pages.
Spahn, "Blood substitutes. Artificial oxygen carriers: perfluorocarbon emulsions," Crit Care., 1999, 3(5):R93-R97.
Spindler et al., "Dimethyl sulfoxide and ethylene glycol promote membrane phase change during cryopreservation," Cryo Lett., 2011, 32(2):148-157.
Sridharan et al., "Metabolomic Modularity Analysis (MMA) to Quantify Human Liver Perfusion Dynamics," Metabolites, 2017, 7(4):e58, 18 pages.
SRTR.org [online], "Organ Procurement Organization (OPO) Reports," Jan. 2020, retrieved on Aug. 9, 2022, retrieved from URL<https://www.srtr.org/reports/opo-specific-reports/>, 6 pages.

St Peter et al., "Extended preservation of non-heart-beating donor livers with normothermic machine perfusion, " British Journal of Surgery, 2002, 89(5):609-616.
Storey et al., "Cryomicroscopic analysis of freezing in liver of the freeze-tolerant wood frog," Am. J. Physiol. Regul. Integr. Comp. Physiol., 1992, 263:R185-R194.
Storey et al., "Molecular Biology of Freezing Tolerance," Comprehensive Physiology, Jul. 2013, 3:1283-1308.
Storey, "Living in the Cold: Freeze-Induced Gene Responses in Freeze-Tolerant Vertebrates," Clin. Exp. Pharmacol. Physiol., 1999, 26:57-63.
Sugimachi et al., "Nonmetabolizable glucose compounds impart cryotolerance to primary rat hepatocytes," Tissue Engineering, Mar. 2006, 12(3):579-588.
Sutton et al., "Criteria for viability assessment of discarded human donor livers during ex vivo normothermic machine perfusion," PLoS One, 2014, 9(11):e110642, 10 pages.
T Hart et al., "Determination of an adequate perfusion pressure for continuous dual vessel hypothermic machine perfusion of the rat liver," Transpl. Int., Apr. 2007, 20(4):343-352.
Taylor and Pegg "The effect of ice formation on the function of smooth muscle tissue stored at -21 or -60° C.," Cryobiology, 1983, 20(1):36-40.
Taylor et al., "New Approaches to Cryopreservation of Cells, Tissues, and Organs," Transfus. Med. Hemotherapy, 2019, 46(3):197-215.
Taylor et al., "Twenty-Four Hour Hypothermic Machine Perfusion Preservation of Porcine Pancreas Facilitates Processing For Islet Isolation," Transplantation Proceedings, 2008, 40:480-482.
Tessier et al., "Effect of Ice Nucleation and Cryoprotectants during High Subzero-Preservation in Endothelialized Microchannels," ACS Biomater. Sci. Eng., 2018, 4(8):3006-3015, 25 pages.
Tolboom et al., "A Model for Normothermic Preservation of the Rat Liver," Tissue Engineering, 2007, 13(8):2143-2151.
Tolboom et al., "Recovery of Warm Ischemic Rat Liver Grafts by Normothermic Extracorporeal Pefusion," Transplantation, 2009, 87(2):170-177.
Tolboom et al., "Sequential cold storage and normothermic perfusion of the ischemic rat liver," Tranplantation Proceedings, 2008, 40(5):1306-1309.
Tolboom et al., "Subnormothermic Machine Perfusion at Both 20° C. and 30° C. Recovers Ischemic Rat Livers for Successful Transplantation," Journal of Surgical Research, 2012, 175(1):149-156.
Troutman, "Hypothermic Machine Perfusion of Composite Tissues," Thesis for the degree of Master of Science, Virginia Polytechnic Institute and State University, Nov. 2017, 62 pages.
Ulusal et al., "Heterotopic hindlimb allotransplantation in rats: an alternative model for immunological research in composite-tissue allotransplantation," Microsurgery, 2005, 25(5):410-414.
Urbańczyk et al., "Antifreeze glycopeptides: from structure and activity studies to current approaches in chemical synthesis," Amino Acids, 2017, 49(2):209-222.
Usta et al., "Supercooling as a Viable Non-Freezing Cell Preservation Method of Rat Hepatocytes," PLoS ONE, 2013, 8(7):69334, 15 pages.
Uygun et al., "Diluted blood reperfusion as a model for transplantation of ischemic rat livers: alanine aminotransferase is a direct indicator of viability," Transplant. Proc., 2010, 42(7):2463-2467.
Vairetti et al., "Correlation Between the Liver Temperature Employed During Machine Perfusion and Reperfusion Damage: Role of $Ca^{2+}$," Liver Transplantation, 2008, 14(4):494-503.
Vajdová et al., "ATP-Supplies in the Cold-Preserved Liver: A Long-Neglected Factor of Organ Viability," Hepatology, 2002, 36(6):1543-1552.
Vajdová et al., "Cold-Preservation-Induced Sensitivity of Rat Hepatocyte Function to Rewarming Injury and Its Prevention by Short-Term Reperfusion," Hepatology, 2000, 32(2):289-296.
Van den Ende, "Multifunctional fructans and raffinose family oligosaccharides," Front. Plant Sci., 2013, 4:247, 11 pages.
Van der Plaats et al., "The Groningen Hypothermic Liver Perfusion Pump: Functional Evaluation of a New Machine Perfusion System," Annals of Biomedical Engineering, 2006, 34(12):1924-1934.

(56) References Cited

OTHER PUBLICATIONS

Van Leeuwen et al., "Transplantation of high-risk donor livers after ex situ resuscitation and assessment using combined hypo- and normothermic machine perfusion: a prospective clinical trial," Ann. Surg., 2019, 270(5):906-914.
Van Rijn et al., "DHOPE-DCD Trial Investigators. Hypothermic machine perfusion in liver transplantation—a randomized trial," N. Engl. J. Med., 2021, 384(15):1391-1401, 12 pages.
Vodkin and Kuo, "Extended criteria donors in liver transplantation," Clin. Liver. Dis., 2017, 21(2):289-301, 13 pages.
Vollmar et al., "In vivo quantification of ageing changes in the rat liver from early juvenile to senescent life," Liver, 2002, 22(4):330-341.
Warnecke et al., "Normothermic ex-vivo preservation with the portable Organ Care System Lung device for bilateral lung transplantation (INSPIRE): a randomised, open-label, non-inferiority, phase 3 study," Lancet Respir. Med., 2018, 6(5):357-367.
Watson and Jochmans, "From "Gut Feeling" to Objectivity: Machine Preservation of the Liver as a Tool to Assess Organ Viability," Curr. Transplant Reports, 2018, 5(1):72-81.
Watson et al., "Observations on the ex situ perfusion of livers for transplantation," Am. J. Transplant., 2018, 18(8):2005-2020.
Weng et al., "Bacterial Ice Nucleation in Monodisperse D2O and H2O-in-Oil Emulsions," Langmuir, Sep. 2016, 32(36):9229-9236, 8 pages.
Weng et al., "Molecular Dynamics at the Interface between Ice and Poly(vinyl alcohol) and Ice Recrystallization Inhibition," Langmuir, 2018, 34(17):5116-5123.
Weng et al., "Role of synthetic antifreeze agents in catalyzing ice nucleation," Cryobiology, 2018, 84:91-94.
Werner et al., "Ex Situ Perfusion of Human Limb Allografts for 24 Hours," Transplantation, 2017, 101:e68-e74.
Westerkamp et al., "Oxygenated Hypothermic Machine Perfusion After Static Cold Storage Improves Hepatobiliary Function of Extended Criteria Donor Livers," Transplantation, 2016, 100:825-835.
Wojcicki et al., "Biliary Tract Complications after Liver Transplantation: A Review," Digestive Surgery, 2008, 25(4):245-257.
Wolanczyk et al., "Ice nucleating activity in the blood of the freeze-tolerant frog, *Rana sylvatica*," Cryobiology, 1990, 27:328-335.
Wowk and Fahy, "Inhibition of bacterial ice nucleation by polyglycerol polymers," Cryobiology, 2002, 44(1):14-23.
Wowk et al., "Vitrification enhancement by synthetic ice blocking agents," Cryobiology, 2000, 40(3):228-236.
Xu et al., "Excorporeal Normothermic Machine Perfusion Resuscitates Pig DCD Livers with Extended Warm Ischemia," Journal of Surgical Research, 2012, 173(2):e83-e88.
Xu et al., "High-molecular-weight polyethylene glycol inhibits myocardial ischemia-reperfusion injury in vivo," J Thorac Cardiovasc Surg, 2015, 149(2):588-593.
Xu et al., "Modulating TRADD to restore cellular homeostasis and inhibit apoptosis," Nature, 2020, 587:133-138, 36 pages.
Yamada et al., "Tolerance in xenotransplantation," Curr. Op. Organ Transplant., 2017, 22(6):522-528, 7 pages.
Yeh and Uygun, "Increasing donor liver utilization through machine perfusion," Hepatology, 2019, 70:431-433, 6 pages.
Yoshida et al., "Involvement of signaling of VEGF and TGF-beta in differentiation of sinusoidal endothelial cells during culture of fetal rat liver cells," Cell and Tissue Research, Sep. 2007, 329(2):273-282.
Young et al., "Gene ontology analysis for RNAseq: accounting for selection bias, " Genome Biol., 2010, 11(2):R14, 12 pages.
Zachariassen and Kristiansen, "Ice Nucleation and Antinucleation in Nature," Cryobiology, 2000, 41(4):257-279.
Zhai et al., "Ischaemia-reperfusion injury in liver transplantation-from bench to bedside," Nat. Rev. Gastroenterol. Hepatol., 2013, 10(2):79-89.
Zhao et al., "Cell-permeable Peptide Antioxidants Targeted to Inner Mitochondrial Membrane inhibit Mitochondrial Swelling, Oxidative Cell Death, and Reperfusion Injury," The Journal of Biological Chemistry, 2004, 279(33):34682-34690.
Zhu et al., "Lysosomal quality control of cell fate: a novel therapeutic target for human diseases," Cell Death Dis., 2020, 11(9):817, 13 pages.
Bertheloot et al., "Necroptosis, pyroptosis and apoptosis: an intricate game of cell death," Cell Mol Immunol., May 2021, 18(5):1106-1121.
BioInformatics.MDAnderson.org [online], "Mbatch," updated Sep. 22, 2023, retrieved on Nov. 20, 2023, retrieved from URL<bioinformatics.mdanderson.org/public-software/mbatch>, 2 pages.
Cronin et al., "Poster Presentation 25: Leveraging machine perfusion for whole organ preservation using partial freezing," Cryobiology, Apr. 2018, 81:233.
Dhani et al., "A long way to go: caspase inhibitors in clinical use," Cell Death Dis., Oct. 2021, 12(10):949, 13 pages.
International Preliminary Report on Patentability in International Appln. No. PCT/US2022/072229, mailed Nov. 23, 2023, 11 pages.
Seo et al., "Necroptosis molecular mechanisms: Recent findings regarding novel necroptosis regulators," Exp Mol Med., Jun. 2021, 53(6):1007-1017.
Tessier et al., "Oral Presentation 26: Partial freezing: A nature-inspired strategy for organ banking," Cryobiology, Apr. 2018, 81:220.
Tessier et al., "The role of antifreeze glycopeptides (AFGP) and polyvinyl alcohol/polyglycerol (X/Z-1000) cocktails as ice modulators during partial freezing of rat livers," bioRxiv, posted Aug. 4, 2021, 33 pages.
Uygun et al., "S118: Extending the viability of organs for transplantation," Cryobiology, 2019, 91:178.
CellBiologics.com [online], "Skeletal Muscle Cell Basal Medium /W kit—500 ML," available on or before Aug. 5, 2016, via Internet Archive: Wayback Machine URL<https://web.archive.org/web/20160805053623/https://cellbiologics.com/index.php?route=produc t/product&path=3_158&product_id=2979>, retrieved on May 23, 2024, URL</https://cellbiologics.com/index.php?route=product/product&path=3_158&product_id=2979>, 1 page.
Pasut et al., "Polyethylene glycols: An effective strategy for limiting liver ischemia reperfusion injury," World J Gastroenterol., Jul. 2016, 22(28):6501-8.
Skin Grafts—Indication, Application and Current Research, 2011 ed., Spear (ed)., Aug. 2011, Chapter 13, 17 pages.

* cited by examiner

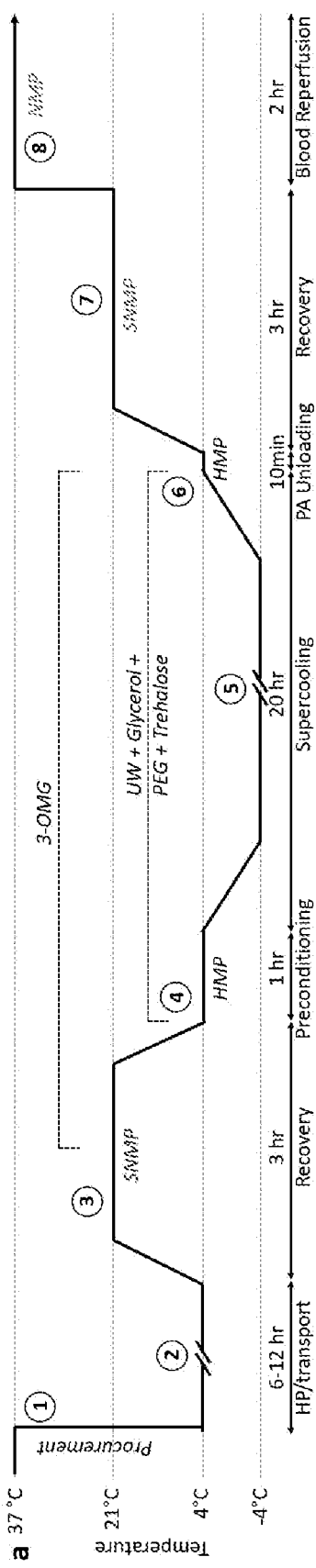
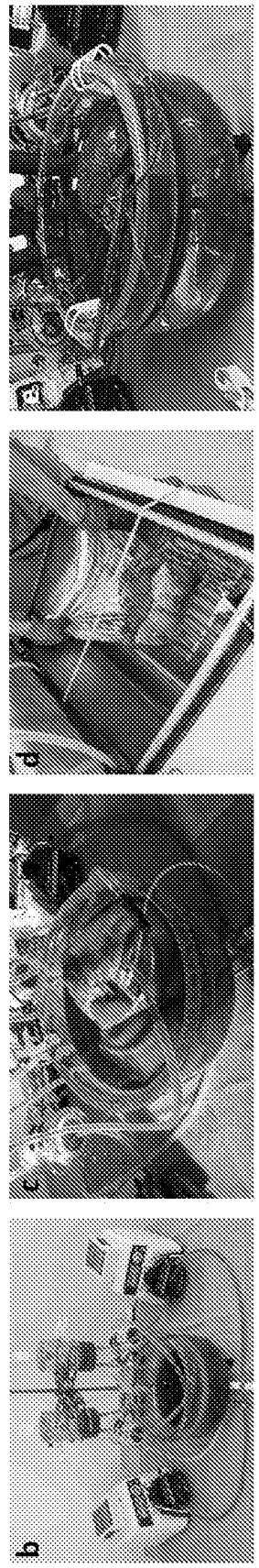
FIG. 1A FIG. 1B FIG. 1C FIG. 1D FIG. 1E

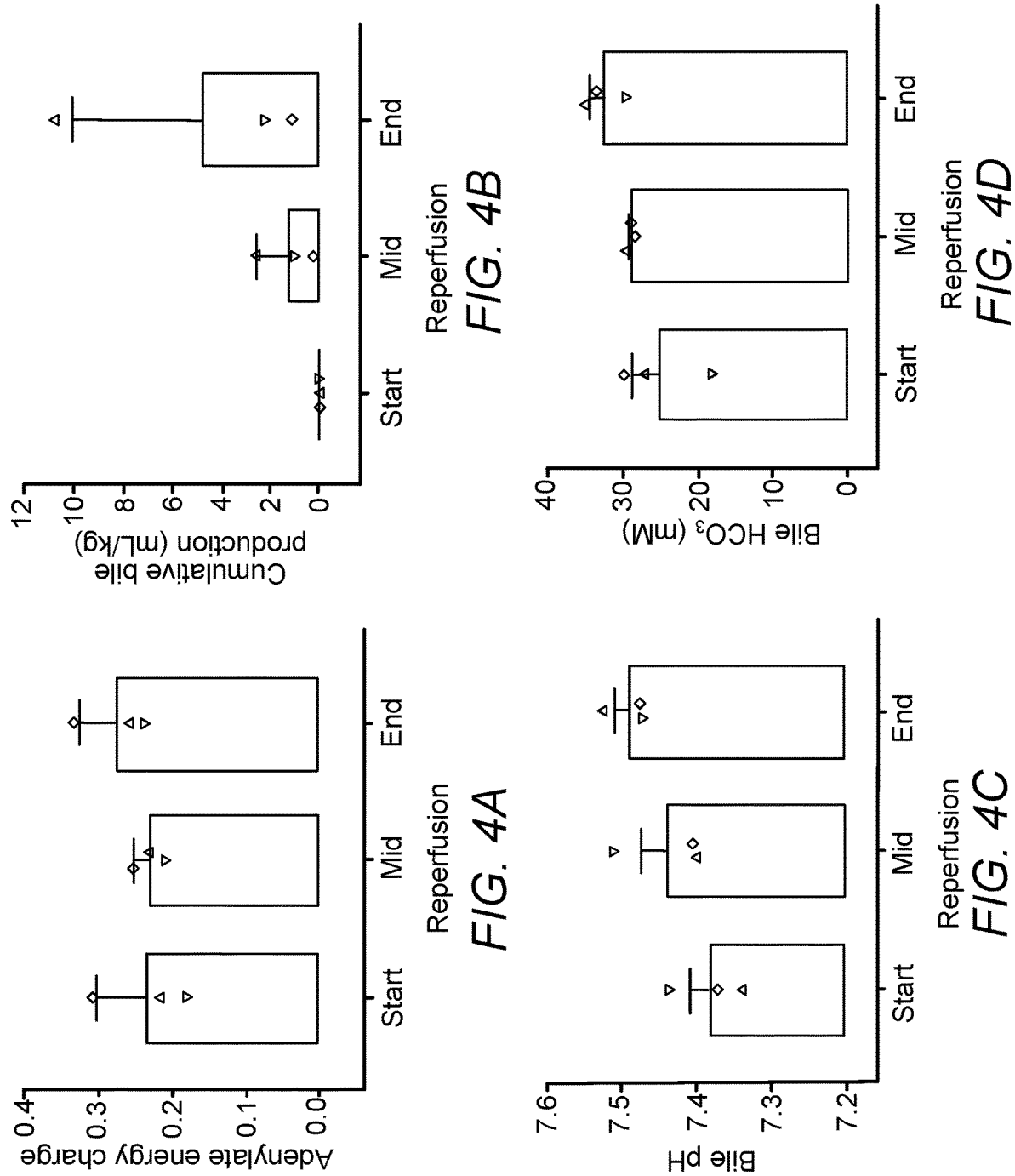

CRYOPRESERVATION OF TISSUES AND ORGANS

CLAIM OF PRIORITY

This application is a national stage application under 35 USC § 371 of International Application No. PCT/US2019/034744, filed on May 30, 2019, which claims the benefit of U.S. Provisional Application Ser. No. 62/677,999, filed on May 30, 2018. The entire contents of the foregoing are incorporated herein by reference.

FEDERALLY SPONSORED RESEARCH OR DEVELOPMENT

This invention was made with Government support under Grant No. DK096075, DK107875, DK114506, and HL143149 awarded by the National Institutes of Health. The Government has certain rights in the invention.

TECHNICAL FIELD

This disclosure is related to methods of preserving biological samples such as organs and tissues.

BACKGROUND

The inability to preserve vascularized tissues and organs beyond several hours contributes to the lack of donor tissues and organs for transplantation, and complicates global organ matching, immune tolerance induction, and tissue engineering, all of which have the potential to transform organ transplantation as we know it today (Giwa, S. et al. The promise of organ and tissue preservation to transform medicine. *Nat. Biotechnol.* 35, 530-542 (2017); Editorial: Buying time for transplants. *Nat. Biotechnol.* 35, 801 (2017); Alvarez, L. et al. Saving Organ Shortage Through Organ Banking and Bioengineering. (2015).)

Hypothermic preservation at +4° C. (Giwa, S. et al. The promise of organ and tissue preservation to transform medicine. *Nat. Biotechnol.* 35, 530-542 (2017); Alvarez, L. et al. Saving Organ Shortage Through Organ Banking and Bioengineering. (2015); Bruinsma, B. G. & Uygun, K. Subzero organ preservation: the dawn of a new ice age? *Curr. Opin. Organ Transplant.* 22, 281-286 (2017)) has been the clinical standard for nearly 50 years (Editorial: Buying time for transplants. *Nat. Biotechnol.* 35, 801 (2017)), but limits liver preservation to less than about 12 hours. Prior work has shown that viable preservation duration of rat livers can be improved by supercooled ice free storage at −6° C. (Berendsen, T. A. et al. Supercooling enables long-term transplantation survival following 4 days of liver preservation. *Nat. Med.* 20, 790-793 (2014); Bruinsma, B. G. et al. Supercooling preservation and transplantation of the rat liver. *Nat. Protoc.* 10, 484-494 (2015)). However, scalability of supercooling preservation to human organs is intrinsically limited due to volume dependent stochastic ice formation at these subzero temperatures. Human livers are about 200 times larger than rat livers, which exponentially increases the likelihood of heterogeneous ice nucleation during supercooling, a stochastic process that is dependent on volume and temperature (*Supercooling.* (InTech, 2012). doi:10.5772/1978).

SUMMARY

The present disclosure relates to methods of subzero preservation of biological tissue samples, such as entire organs from mammals, e.g., humans. The present disclosure is based, at least in part, on the discovery that biological tissue samples can be supercooled while minimizing formation of ice crystals by reducing liquid-air interfaces and lowering the melting point of the tissue samples, e.g., organs, or liquid in the tissue samples by use of cryoprotective agents while ensuring uniform distribution of cryoprotective agents throughout the biological sample by using improved perfusion techniques.

In one aspect, the present disclosure relates to methods for preserving a biological sample, the method including: (a) perfusing the biological sample at a first perfusion rate with a first loading solution including one or more cryoprotective agent(s) at a hypothermic temperature; (b) perfusing the biological sample at a second perfusion rate lower than the first perfusion rate with a second loading solution including a higher concentration of at least one of the one or more cryoprotective agent(s) than in the first loading solution at a hypothermic temperature; (c) placing the perfused biological sample in a container; (d) removing sufficient air from the container to avoid ice crystal formation in cells within the biological sample or the loading solution, and sealing the container; and (e) cooling the biological sample in the container to a subzero temperature, thereby preserving the biological sample at a subzero temperature.

In some embodiments, the method also includes, perfusing the biological sample with a pre-supercooling recovery solution including one or more cryoprotective agent(s) at a sub-normothermic temperature; and perfusing the biological sample with the pre-supercooling recovery solution at a hypothermic temperature. In another embodiment, the perfusion step at a sub-normothermic temperature includes supplementing the pre-supercooling recovery solution with insulin and one or more additional cryoprotective agent(s) during the perfusion step, or replacing the pre-supercooling recovery solution with a pre-supercooling recovery solution further including insulin and one or more additional cryoprotective agent(s) during the perfusion step. In other embodiments, between 20 g and 80 g 3-OMG per 1 L and between 100 U and 400 U insulin per 1 L are added to the pre-supercooling recovery solution during the perfusion step at the sub-normothermic temperature. For example, about 38.8 g 3-OMG per 1 L and about 190 U insulin per 1 L can be added to the pre-supercooling recovery solution during the perfusion step at the sub-normothermic temperature.

Further, the method can also include recovery steps for the subzero preserved biological sample, including perfusing the biological sample with an unloading solution including one or more cryoprotective agent(s) at a hypothermic temperature; perfusing the biological sample with a post-supercooling recovery solution including one or more cryoprotective agent(s) at a sub-normothermic temperature; and warming the biological sample to a normothermic temperature, thereby recovering the preserved biological sample for use.

In yet other embodiments, the first loading solution includes one or more of the following cryoprotective agents: polyethylene glycol (PEG), glycerol, trehalose, and University of Wisconsin solution (UW), and the second loading solution includes a higher concentration of glycerol than the first loading solution.

Still further, in other embodiments, the hypothermic temperature is between 0° C. and 12° C. (e.g., 4° C.), the sub-normothermic temperature is between 12° C. and 35° C. (e.g., 21° C.), or the normothermic temperature is greater than 35° C. (e.g., 36) ° ° C.

In certain embodiments, the subzero temperature is about −4° C., below −4° C., e.g., below −5° C., −6° C., −7° ° C., −8° C., −9° C., −10° C., −11° C., −12° C., −13° C., −14° C., −15° C., −16° C., −17° C., −18° C., −19° C., −20° C., −25° C., −30° C., −35° C., −40° C., or even lower temperature.

In yet other embodiments, the removal of sufficient air from the container results in reduction of one or more liquid-air interfaces in the container, thereby reducing or eliminating formation of ice crystals.

In other embodiments, the perfusion of the biological sample with the first loading solution and/or the second loading solution reduces the melting temperature of the liquid within the biological sample. In another embodiment, the biological sample remains unfrozen when cooled to a subzero temperature.

The biological sample is an organ or tissue, for example, a donor organ for organ transplantation. The biological sample can obtained from a human, a primate, or a pig. In certain embodiments, the organ is a lab-grown organ. In certain other embodiments,
the biological sample is a heart, kidney, bone, lung, eye, ovary, pancreas or any tissues that can be perfused through a vessel such as limbs and other vascular composite allografts.

In some embodiments, the pre-supercooling recovery solution also includes one or more of insulin, dexamethasone, heparin, antibiotics, albumin, and Williams medium E. In various embodiments, the pre-supercooling recovery solution includes: between 5 U and 20 U insulin per 1 L; between 4 mg and 16 mg dexamethasone per 1 L; between 2500 U and 10,000 U heparin per 1 L; between 4 mL and 16 mL penicillin-streptomycin (5000 U/ml) per 1 L; between 25 mL and 100 mL 25% human albumin per 1 L; between 10 g and 40 g 35 kDa PEG; and Williams' medium E. For example, the pre-supercooling recovery solution can include: about 10 U insulin per 1 L; about 8 mg dexamethasone per 1 L; about 5000 U heparin per 1 L; about 8 mL penicillin-streptomycin (5000 U/ml) per 1 L; about 50 mL 25% human albumin per 1 L; about 20 g 35 kDa PEG; and Williams' medium E.

In various embodiments, the first loading solution includes: between 20 U and 80 U insulin per 1 L; between 4 mg and 16 mg dexamethasone per 1 L; between 25 g and 100 g 35 kDa PEG per 1 L; between 25 mL and 100 mL glycerol; between 20 g and 80 g Trehalose dihydrate; and UW. For example, the first loading solution can include about 40 U insulin per 1 L; about 8 mg dexamethasone per 1 L; about 50 g 35 kDa PEG per 1 L; about 50 mL glycerol; about 37.83 g Trehalose dihydrate; and UW.

In various embodiments, the second loading solution includes: between 20 U and 80 U insulin per 1 L; between 4 mg and 16 mg dexamethasone per 1 L; between 25 g and 100 g 35 kDa PEG per 1 L; between 50 mL and 200 mL glycerol per 1 L; between 20 g and 80 g trehalose dihydrate per 1 L; and UW. For example, the second loading solution can include: about 40 U insulin per 1 L; about 8 mg dexamethasone per 1 L; about 50 g 35 kDa PEG per 1 L; about 100 mL glycerol per 1 L; about 37.8 g trehalose dihydrate per 1 L; and UW.

In various embodiments, the unloading solution includes: between 5 U and 20 U insulin per 1 L; between 4 mg and 16 mg dexamethasone per 1 L; between 4 mL and 16 mL penicillin-streptomycin (5000 U/ml) per 1 L; between 25 g and 100 g 35 kDa PEG per 1 L; between 250 mg and 1000 mg 6-Hydroxy-2,5,7,8-tetramethylchromane-2-carboxylic acid per 1 L; between 25 mL and 100 mL 25% human albumin per 1 L; between 25 mL and 100 mL glycerol per 1 L; between 20 g and 80 g trehalose dihydrate per 1 L; and Williams' medium E.

In various embodiments, the unloading solution includes: between 5 U and 20 U insulin per 1 L; between 4 mg and 16 mg dexamethasone per 1 L; between 4 mL and 16 mL penicillin-streptomycin (5000 U/ml) per 1 L; between 25 g and 100 g 35 kDa PEG per 1 L; between 250 mg and 1000 mg 6-Hydroxy-2,5,7,8-tetramethylchromane-2-carboxylic acid per 1 L; between 25 mL and 100 mL 25% human albumin per 1 L; between 25 mL and 100 mL glycerol per 1 L; between 20 g and 40 g trehalose dihydrate per 1 L; and Williams' medium E.

In various embodiments the post-supercooling recovery solution includes: between 5 U and 20 U insulin per 1 L; between 4 mg and 16 mg dexamethasone per 1 L; between 2500 U and 10,000 U sodium heparin per 1 L; between 4 mL and 16 mL penicillin-streptomycin (5,000 U/ml) per 1 L; between 250 mg and 1000 mg 6-Hydroxy-2,5,7,8-tetramethylchromane-2-carboxylic acid per 1 L; between 25 mL and 100 mL 25% human albumin per 1 L; between 10 g and 40 g 35 kDa PEG per 1 L; and Williams' medium E. For example, the post-supercooling recovery solution can include: about 10 U insulin per 1 L; about 8 mg dexamethasone per 1 L; about 5000 U sodium heparin per 1 L; about 8 mL penicillin-streptomycin (5,000 U/ml) per 1 L; about 500 mg 6-Hydroxy-2,5,7,8-tetramethylchromane-2-carboxylic acid per 1 L; about 50 mL 25% human albumin per 1 L; about 20 g 35 kDa PEG per 1 L; and Williams' medium E.

In some embodiments, the pre-supercooling recovery solution is replaced with a pre-supercooling recovery solution additionally including between 20 g and 80 g 3-OMG per 1 L and between 100 U and 400 U insulin per 1 L. In other embodiments, the pre-supercooling recovery solution is replaced with a pre-supercooling recovery solution additionally including about 38.8 g 3-OMG per 1 L and about 190 U insulin per 1 L.

The various steps described herein can be performed for various durations. For example, in some embodiments, the two steps of (a) perfusing the biological sample at a first perfusion rate with a first loading solution comprising one or more cryoprotective agent(s) at a hypothermic temperature and (b) perfusing the biological sample at a second perfusion rate lower than the first perfusion rate with a second loading solution comprising a higher concentration of at least one of the one or more cryoprotective agent(s) than in the first loading solution at a hypothermic temperature, combined, can be performed for a duration of approximately 1 hour. For another example, the step of (f) perfusing the biological sample with an unloading solution comprising one or more cryoprotective agent(s) at a hypothermic temperature can be performed for a duration of approximately 10 minute; and the step of (g) perfusing the biological sample with a post-supercooling recovery solution comprising one or more cryoprotective agent(s) at a sub-normothermic temperature can be performed for approximately 3 hours.

In various other embodiments, the perfusion steps can include perfusing the biological sample by single-pass perfusion or recirculation perfusion. In various other embodiments, the perfusion step at the sub-normothermic temperature includes perfusing the biological sample by single-pass perfusion followed by recirculation perfusion. In certain embodiments, all perfusion steps are performed with a perfusion rate that is lower than the perfusion rate of blood that the biological sample would experience in vivo. In some embodiments where the biological sample is a human liver, the human liver can be perfused with a loading buffer by portal and arterial perfusion at a perfusion rate of about 3 mmHg for the portal vein (PV) and about 30 mmHg for the hepatic artery (HA) for a period of time. In other embodiments, the perfusion steps are performed using a pump that generates non-pulsatile flow.

In yet other embodiments, the biological sample is preserved at the subzero temperature for more than 12 hours, e.g., more than 13, 14, 15, 16, 17, 18, 19, 20, 21, 22, 23, or 24 hours. The biological sample can also be supercooled in a surgical isolation bag. In certain other embodiments, sufficient air is removed from the container by immersing the container containing the biological sample in water or by using a vacuum pump. In other embodiments, the biological sample is viable after being recovered from subzero preservation, as determined by measuring one or more of a tissue adenosine triphosphate (ATP) to adenosine monophosphate (AMP) ratio, a tissue ATP to adenosine diphosphate (ADP) ratio, lactate clearance, potassium concentration, urea concentration, aspartate aminotransferase (AST) and alanine aminotransferase (ALT) concentrations, and terminal deoxynucleotidyl transferase dUTP nick end labeling (TUNEL).

In one aspect, the present disclosure relates to systems for subzero preserving a biological sample. The system can include: a pump; a solution reservoir; a heat exchanger; a hollow fiber oxygenator; a jacketed bubble trap; a pressure sensor; a tubing that serially connects the pump, the solution reservoir, the heat exchanger, the hollow fiber oxygenator, the jacketed bubble trap, and the pressure sensor; and a computer control unit that operates the system to perform any of the perfusion steps described herein.

In another aspect, the present disclosure relates to various solutions used for subzero preserving a biological sample. For example, the present disclosure can relate to loading solutions which include, per 1 L volume: between 25 g and 100 g 35 kDa PEG; between 25 mL and 200 mL glycerol; between 20 g and 80 g trehalose; and UW. The loading solution can also include, per 1 L volume: between 20 U and 80 U insulin; and between 4 mg and 16 mg dexamethasone. In one embodiment, the loading solution of includes: about 40 U insulin per 1 L; about 8 mg dexamethasone per 1 L; about 50 g 35 kDa PEG per 1 L; about 50 mL or about 100 mL glycerol; about 37.83 g Trehalose dihydrate; and UW. For another example, the present disclosure can relate to post-supercooling recovery solution including: between 5 U and 20 U insulin per 1 L; between 4 mg and 16 mg dexamethasone per 1 L; between 2500 and 10,000 U sodium heparin per 1 L; between 4 mL and 16 mL penicillin-streptomycin (5,000 U/ml) per 1 L; between 250 mg and 1,000 mg 6-Hydroxy-2,5,7,8-tetramethylchromane-2-carboxylic acid per 1 L; between 25 mL and 100 mL 25% human albumin per 1 L; between 10 g and 40 g 35 kDa PEG per 1 L; and Williams' medium E. In certain embodiments, the post-supercooling recovery solution includes: about 10 U insulin per 1 L; about 8 mg dexamethasone per 1 L; about 5000 U sodium heparin per 1 L; about 8 mL penicillin-streptomycin (5,000 U/ml) per 1 L; about 500 mg 6-Hydroxy-2,5,7,8-tetramethylchromane-2-carboxylic acid per 1 L; about 50 mL 25% human albumin per 1 L; about 20 g 35 kDa PEG per 1 L; and Williams medium E.

The term "cryoprotective agents" as used herein refers to compounds or solutions of compounds, that can be used to perfuse, immerse, or contact a biological sample (e.g., an organ or tissue) to lower the melting point (or freezing temperature) of the biological sample or liquid in the biological sample.

The term "subzero preservation" as used herein refers to the preservation of biological samples at temperatures below the freezing temperature of water (i.e., 0° C.). Subzero preservation has the potential to extend the storage limits of biological tissue samples such as organs, as the metabolic rate halves for every 10° C. reduction in temperature, thereby reducing the rate of biological tissue sample deterioration.

The term "supercooling" as used herein refers to cooling a substance such as a liquid or a liquid within a biological tissue to a temperature below its melting point (or freezing point) without solidification or crystallization (e.g., ice crystal formation). Under normal atmospheric conditions, ice transitions to water at 0° C., i.e., the melting point. Nevertheless, the observed freezing temperature for pure water is usually below the melting point (i.e., the water is supercooled).

The term "liquid-air interface" or "air-liquid interface" as used herein refers to the boundary between a liquid and a gas (or biological tissue and gas) that can exist, for example, in a container that is holding a biological sample being preserved. In general, the likelihood of ice crystal formation in supercooled biological samples is greater for biological samples having larger dimensions.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 1A is a schematic temperature profile of the new supercooling protocols described herein.

FIGS. 1B-1E are photographs relating to the supercooling protocol described herein and illustrated in FIG. 1A. FIG. 1B shows an example of a machine perfusion system that can be used with the protocols described herein. FIG. 1C shows a liver in a sub-normothermic machine perfusion (SNMP) recovery stage. FIG. 1D shows a liver in a supercooling basin of a chiller. FIG. 1E shows normothermic reperfusion of a supercooled liver with blood.

FIG. 2A shows a liver during the cooling phase of sub-normothermic machine perfusion (SNMP). FIG. 2B shows a liver submerged in the chiller basin during ice-free subzero supercooled storage. FIG. 2C shows a liver during reperfusion.

FIG. 3A shows tissue adenylate energy charge before and after supercooling. FIG. 3B shows cumulative bile production before and after supercooling. FIG. 3C shows vascular resistance of the hepatic artery (PA) and portal vein (PV) before and after supercooling. FIG. 3D shows oxygen update before and after supercooling. FIG. 3E shows aspartate aminotransferase (AST) and alanine aminotransferase (ALT) concentrations in the perfusate before and after supercooling. FIG. 3H shows quantification of terminal deoxynucleotidyl transferase dUTP nick end labeling (TUNEL) stained liver biopsies before and after supercooling. Error bars: mean±SEM. Stars: P<0.05.

FIG. 3F shows parenchymal liver biopsies stained with hematoxylin and eosin (HE) staining (top) and TUNEL staining (bottom) during pre-supercooling NSMP. FIG. 3G shows HE and TUNEL stained parenchymal liver biopsies during post-supercooling SNMP. Scale bars: 100 µm.

FIGS. 4A-K are graphs and light microscope images showing key ex vivo viability parameters during simulated transplantation by normothermic blood reperfusion. FIG. 4A shows tissue adenylate energy charge at the start (T=0 min), during (T=60 min), and end (T=120 min) of reperfusion. FIG. 4B shows cumulative bile production at the start, during, and end of reperfusion. FIG. 4C shows bile pH at the start, during, and end of reperfusion. FIG. 4D shows bile $HCO_3^-$ concentrations at the start, during, and end of reperfusion. FIG. 4E shows bile glucose level at the start, during, and end of reperfusion. FIG. 4F shows lactate concentrations of the arterial inflow at various time points during reperfusion. FIG. 4G shows vascular resistance of the hepatic artery (HA) and portal vein (PV) at various time points during reperfusion. FIG. 4H shows aspartate aminotransferase (AST; top) and alanine aminotransferase (ALT; bottom) concentrations in the plasma at various time points during reperfusion. FIG. 4I shows parenchymal liver biopsies during reperfusion stained with hematoxylin and eosin (HE). FIG. 4J shows TUNEL staining of parenchymal liver biopsies during reperfusion. FIG. 4K shows quantification of TUNEL stained liver biopsies. Apoptotic cells were quantified per field of view of approximately 430 cells. The horizontal dashed line represents the reported range of TUNEL positive cells in biopsied taken directly after full reperfusion in vivo during liver transplantation (34). Error bars: mean±SEM. Star: P<0.05. Scale bars: 100 µm.

FIG. 6A shows tissue ATP and AMP ratio. FIG. 6B shows tissue ATP and ADP ratio. FIG. 6C shows lactate clearance derived from in and outflow measurements. FIG. 6D shows lactate concentrations (top) and pH (bottom) of the arterial inflow. FIG. 6E shows perfusate potassium concentrations. FIG. 6F shows urea concentrations in the perfusate. Error bars: mean±SEM. Star: p<0.05.

FIG. 7A shows ATP and AMP ratio. FIG. 7B shows ATP and ADP ratio. FIG. 7C shows oxygen uptake. FIG. 7D shows plasma urea concentrations. FIG. 7E shows lactate clearance derived from in and outflow measurements. FIG. 7F shows plasma potassium concentrations. Error bars: mean±SEM.

DETAILED DESCRIPTION

Figure 2A:
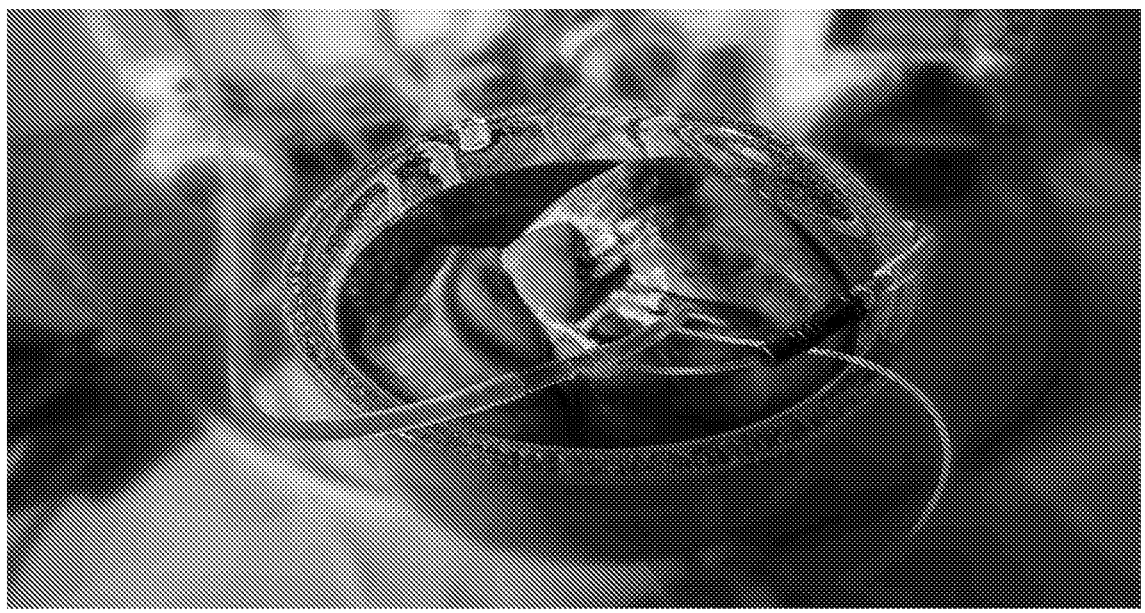
FIGS. 2A-2C are photographs that show livers during the supercooling protocol.

The present disclosure relates to improved supercooling protocols that avert freezing and crystal formation in the cells of tissue samples, e.g., mammalian, e.g., human tissue samples, such as whole organs, e.g., liver, heart, kidney, bone, lung, skin, eye, ovary, pancreas, or any tissues that can be perfused through a vessel such as limbs and other vascular composite allografts. The examples below show that human livers can be stored at a subzero temperature with supercooling followed by sub-normothermic machine perfusion (SNMP), effectively extending the ex vivo life of the organ by about 27 hours to a total of about 39 hours. The examples also show that viability of livers before and after supercooling is unchanged, and that after supercooling livers can withstand the stress of simulated transplantation by ex vivo normothermic reperfusion with blood. To our knowledge, this is the first study that shows the feasibility of subzero human organ preservation.

The absence of technology to preserve organs for more than a few hours is one of the fundamental causes of the donor organ shortage crisis (Giwa, S. et al. The promise of organ and tissue preservation to transform medicine. *Nat. Biotechnol.* 35, 530-542 (2017); Editorial: Buying time for transplants. *Nat. Biotechnol.* 35, 801 (2017); Bruinsma, B. G. & Uygun, K. Subzero organ preservation: the dawn of a new ice age? *Curr. Opin. Organ Transplant.* 22, 281-286 (2017)). Subzero preservation has the potential to extend the organ storage limits as the metabolic rate halves for every 10° C. reduction in temperature (Berendsen, T. A. et al. *Supercooling* enables long-term transplantation survival following 4 days of liver preservation. *Nat. Med.* 20, 790-793 (2014)) thereby reducing organ deterioration rate.

In some embodiments, the organs described herein refer to organs for transplantation, e.g., organs obtained from an organ donor and transplanted in an organ recipient. In other embodiments, the organs described herein refer to organs grown in vitro (i.e., lab-grown organs), for example, by using regenerative medicine technology.

Supercooling has the major advantage that it allows preservation at high subzero storage temperature (approximately −4° C., for example, −5° C. to −3° C., −6° C. to −2° ° C., or −7° C. to −1° C.), while avoiding phase transitions and consequent lethal ice-mediated injury (Bruinsma, B. G. & Uygun, K. Subzero organ preservation: the dawn of a new ice age? *Curr. Opin. Organ Transplant.* 22, 281-286 (2017); Berendsen, T. A. et al. Supercooling enables long-term transplantation survival following 4 days of liver preservation. *Nat. Med.* 20, 790-793 (2014); Bruinsma, B. G. et al. Supercooling preservation and transplantation of the rat liver. *Nat. Protoc.* 10, 484-494 (2015)), as well as toxicity of most common CPAs. In some embodiments, supercooling can allow preservation at lower temperature than high subzero storage temperature (e.g., below −4° C., −5° C., −6° C., −7° C., −8° C., −9° C., −10° C., −11° C., −12° C., −13° C., −14° C., −15° C., −16° C., −17° C., −18° C., −19° C., −20° C., −25° C., −30° C., −35° C., −40° C., or even lower temperature).

Supercooling allows for extended preservation of biological tissue samples, for example, for days to months (e.g., greater than 3, 4, 5, 6, 7, 8, 9, 10, 20, or 30 days, greater than 1, 2, 3, 4, 5, or 6 weeks, or greater than 1, 2, 3, 4, 5, or 6 months). In some embodiments, the preservation period is less than 3, 4, 5, 6, 7, 8, 9, 10, 20, or 30 days, less than 1, 2, 3, 4, 5, or 6 weeks, or less than 1, 2, 3, 4, 5, or 6 months.

The cooling rate for subzero preservation can also vary. In some embodiments, the cooling can be at a rate of <50° C./minute, e.g., <20° C./minute, <10° C./minute, <9° C./minute, <8° C./minute, <7° C./minute, <6° C./minute, <5° C./minute, <4° C./minute, <3° C./minute, <2° C./minute, <1° C./minute, <0.9° C./minute, <0.8° C./minute, <0.7°

C./minute, <0.6° C./minute, <0.5° C./minute, <0.4° C./minute, <0.3° C./minute, <0.2° C./minute, or <0.1° C./minute. In some embodiments, the cooling rate is about 1° C./minute.

In some embodiments, the subzero temperature is below 0° C., e.g., below −1° C., below −2° C., below −3° C., below −4° C., below −5° C., below −6° C., below −7° C., below −8° C., below −9° C., below −10° ° C., below −11° C., below −12° C., below −13° C., below −14° ° C., below −15° ° C., below −20° C., below −25° ° C., below −30° C., below −35° C. or below −40° C. In some embodiments, the subzero temperature is above −40° C., e.g., above −35° C., above −30° ° C., above −25° C., above −20° C., above −15° C., above −14° C., above −13° ° C., above −12° C., above −11° C., above −10° C., above −9° C., above −8° C., above −7° C., above −6° C., above −5° C., above −4° C., above −3° C., above −2° C., or above −1° C.

In some embodiments, the biological sample of the present invention can have a volume of greater than 1 mL, 10 mL, 20 mL, 30 mL, 40 mL, 50 mL, 60 mL, 70 mL, 80 mL, 90 mL, 100 mL, 110 mL, 120 mL, 130 mL, 140 mL, 150 mL, 175 mL, 200 mL, 250 mL 300 mL, 350 mL, 400 mL, 450 mL, 500 mL, 600 mL, 700 mL, 800 mL, 900 mL, 1 L, 1.1 L, 1.2 L, 1.3 L, 1.4 L, 1.5 L, 1.6 L, 1.7 L, 1.8 L, 1.9 L, 2.0 L, 2.5 L, 3 L, 3.5 L, 4 L, 4.5 L, or 5 L. In other embodiments, the biological sample of the present invention can have a volume of less than 1 mL, 10 mL, 20 mL, 30 mL, 40 mL, 50 mL, 60 mL, 70 mL, 80 mL, 90 mL, 100 mL, 110 mL, 120 mL, 130 mL, 140 mL, 150 mL, 175 mL, 200 mL, 250 mL, 300 mL, 350 mL, 400 mL, 450 mL, 500 mL, 600 mL, 700 mL, 800 mL, 900 mL, 1 L, 1.1 L, 1.2 L, 1.3 L, 1.4 L, 1.5 L, 1.6 L, 1.7 L, 1.8 L, 1.9 L, 2.0 L, 2.5 L, 3 L, 3.5 L, 4 L, 4.5 L, or 5 L.

In some embodiments, the biological sample of the present invention can be perfused using hypothermic machine perfusion (HMP; 0-12° C.), sub-normothermic machine perfusion (SNMP; 12-35° C.), normothermic machine perfusion (NMP; >35), or using gradual rewarming whereby the temperature of the biological sample is gradually raised.

In some embodiments, the hypothermic temperature can be between 0-12° C., 1-10° C., between 2-8° C., between 3-6° C., or about 4° C.

In some embodiments, the sub-normothermic temperature can be between 12-35° C., 15-30° C., 18-25° C., or about 21° C.

In some embodiments, the normothermic temperature can be about 35° C., about 36° C., about 37° C., about 38° C., about 39° C., or about 40° ° C.

The present disclosure provides new methods for subzero preservation of biological samples. The methods involve contacting, perfusing, and/or submerging the biological sample with one or more of a recovery solution, loading solutions (e.g., a first loading solution and a second loading solution), an unloading solution, or any other solutions as described herein in a storage solution bag or other similar containers (e.g., a surgical isolation bag), removing air from the container, and cooling the biological sample to a subzero temperature without the formation of ice crystals in cells of the tissue.

The present disclosure can be used for preserving an organ, e.g., a mammalian, e.g., human, organ. The methods include perfusing, contacting, or immersing the organ with pre-conditioning solutions, loading solutions, or recovery solutions as described herein, and supercooling the organ. Methods of perfusing an organ are known in the art. For example, perfusion can be performed by pouring solution over or through the arteries or veins of the organ. In some embodiments, a perfusion device (e.g., a pump or injector) can be used. Alternatively or in addition, the organ can also be immersed within the pre-conditioning solutions, loading solutions, or recovery solutions. In some embodiments, the method can include multiple perfusing, contacting, or immersing steps involving multiple solutions.

The methods as described herein can also improve the outcome (e.g., viability) of preservation of biological samples. The tissue or organs are prepared for preservation using techniques described herein. In some embodiments, the tissue or organs are obtained using art known techniques and maintained in recovery solutions appropriate for the biological samples.

The new protocols described herein involve a three-pronged approach to eliminate freezing and ice crystal formation in cells of tissue samples, such as whole organs, e.g., livers, during subzero storage. The overall temperature profile of the complete method, including the three key aspects of supercooling, involves the eight stages shown in FIG. 1A. Those eight stages include: (1) Obtaining a biological sample from a source (e.g., a subject or an organ donor, e.g., a human, a primate, or a pig), where the biological sample is cooled from a normothermic temperature (e.g., 37) ° C. to a hypothermic temperature (e.g., 4° C.). The biological sample is preserved in a hypothermic preservation solution (e.g., UW); (2) Storage and transportation of the hypothermic preserved biological sample to a site where the sample can be prepared for subzero preservation (conventionally, this step is limited to up to 12 hours); (3) Recovery of the biological sample stored under hypothermic preservation to a sub-normothermic temperature (e.g., 21° C.) by perfusing the biological sample with a pre-supercooling recovery solution at a sub-normothermic temperature (this step can occur for a period of time sufficient to warm the biological sample to a sub-normothermic temperature, e.g., about 3 hours). During this step, the recovery solution may be supplemented with additional insulin and cryoprotective agent(s) (e.g, 3-OMG) during the perfusion step; (4) Perfusion of the biological sample with one or more loading solution(s) (e.g., a first loading solution and a second loading solution described in the Examples) containing cryoprotective agent(s) at a hypothermic temperature (e.g., 4° C.) to allow uniform perfusion of the loading buffer prior to supercooling; (5) Supercooling the biological sample at a subzero temperature (e.g., −4° C.), where the biological sample is placed in a container (e.g., an organ isolation bag) and air is removed from the container to reduce liquid-air interfaces (this step results in subzero preservation of the biological sample); (6) Perfusion of the preserved biological sample with an unloading buffer at a hypothermic temperature (e.g., 4° C.); (7) Recovery of the biological sample after supercooling using a post-supercooling recovery solution at a sub-normothermic temperature; and (8) warming of the recovered biological sample to a normothermic temperature for use.

The three key aspects of supercooling are represented by stages 3, 4, and 5, in FIG. 1A. The key aspects of recovery of biological samples from supercooling preservation are represented by stages 6 and 7 in FIG. 1A.

First, in stage 3, the biological sample is perfused with specific cryoprotective agents to depress the melting point of the liquids within tissue samples, e.g., livers, which means reducing the degree of supercooling. The standard clinical hypothermic preservation (HP) solution is University of Wisconsin solution (UW) which can be used as the base for various useful supercooling preservation solutions. UW contains potassium hydroxyethyl starch, raffinose, and potassium lactobionate, which could modify ice nucleation and lower the melting point as compared to pure water (see TABLE 1).

TABLE 1

Melting Points of the Supercooling Preservation Solution

| | Additive concentration | | Melting point (° C.) | |
|---|---|---|---|---|
| | % w/V | Molarity | Mean | SEM |
| H2O | | | 0.00 | 0.01 |
| UW | | | −0.59 | 0.01 |
| UW + PEG | 5.00 | 1.43 × 10-6 | −0.58 | 0.11 |
| UW + PEG + TRE | 3.78 | 0.10 | −0.81 | 0.02 |
| UW + PEG + TRE + GLY | 12.57 | 1.36 | −3.03 | 0.05 |

Potential toxicity of additional CPAs during prolonged high subzero preservation is an important consideration, which is why these should be avoided to the extent possible. Thus, the protocols described herein require the use of four additives: (A) Trehalose, for the protection of the extracellular compartment and to provide cell membrane stabilization at subzero temperatures (or other sugars including monosaccharides, disaccharides, and trisaccharides, such as sucrose, lactulose, lactose, maltose, cellobiose, chitobiose, glucose, galactose, fructose, xylose, mannose, maltose, raffinose); (B) polyethylene glycol (PEG) (or other polymers and poloxamers in some embodiments such polypropylene glycol, as hydroxyl ethyl starch (HES), gelatin, pluronics, and kolliphor); (C) glycerol (or other permeable CPAs that are which is freely permeable over plasma membranes in some embodiments, such as dimethyl sulfoxide (DMSO), ethylene glycol, propylene glycol, propanediol) (Storey, K. B. & Storey, J. M. Molecular Biology of Freezing Tolerance. in *Comprehensive Physiology* 3, 1283-1308 (American Cancer Society); Best, B. P. Cryoprotectant Toxicity: Facts, Issues, and Questions. *Rejuvenation Res.* 18, 422-436 (2015)); and (D) 3-O-methyl-D-glucose (3-OMG), which accumulates intracellularly, or other non-metabolizable monosaccharides in some embodiments (such as Methyl α-D-glucopyranoside, 2,3,4,6-Tetrabenzoyl-D-glucopyranose, Methyl β-D-glucopyranoside, 6-Deoxy-D-glucose, α-D-Glucopyranose pentabenzoate).

Second, in stage 4, the new protocols include a specific loading scheme of the new preservation cocktail (loading solutions). Although the melting point of the preservation solution is depressed by the addition of trehalose and to a greater extend by glycerol (see TABLE 1), the solution melting point does not fully reflect the melting point depression of the liquids in the actual tissue samples when loaded with that solution. For example, the melting point of liquids within preconditioned livers (FIG. 6) can be significantly ($p<0.0001$, $t(13)=7.761$) higher (e.g., −2.1° C.) as compared to the preservation solution (e.g., −3.03° C.), which can be explained by incomplete equilibration and a dilution effect of the preservation solution in the relatively large organ volume. While a 10 g rat liver can be simply flushed manually with a syringe, the increased size of human grafts makes homogeneous loading of cryoprotective agents significantly harder, which initially resulted in freezing of the grafts. Uniform distribution of cryoprotective agents within the tissue is important in supercooled storage, because ice might initially nucleate at an insufficiently protected site and propagate throughout the entire organ or a portion thereof sufficient enough to result in failure of transplantation.

Increased viscosity of the preservation solution due to the additional cryoprotective agents could potentially increase shear stress on the endothelium. Excess shear stress can consequently cause significant endothelial injury (Hart, N. A. et al. Determination of an adequate perfusion pressure for continuous dual vessel hypothermic machine perfusion of the rat liver. *Transpl. Int.* 20, 343-352 (2007)). To address both concerns, the new hypothermic machine perfusion (HMP) protocol includes a step to homogeneously precondition the tissue samples and organs and avert freezing during supercooling. Briefly, the tissue samples, e.g., organs, are machine perfused at +4° C., without recycling of the preservation solution. The cryoprotective agent concentrations are increased gradually during HMP to avoid potential osmotic injury, and the perfusion flowrates and pressures were accurately compensated to account for the increase viscosity and avert endothelial injury.

Sub-normothermic machine perfusion (SNMP) is important to reconstitute the tissue samples, e.g., organs, e.g., human livers, after supercooling. Additional modifications related to engineering of the system to allow perfusion of human tissue samples are discussed below and the overall protocol is outlined in FIGS. 1A-1E and described in detail below.

Third, in stage 5 (or between stage 4 and stage 5) the air/liquid interfaces within the tissue sample can be minimized to reduce or eliminate freezing or ice crystal formation during supercooling. These interfaces are thermodynamically favorable sites of heterogeneous ice nucleation due to surface tension. To achieve supercooling with whole organs, the liquid/air interfaces can be minimized by de-airing the storage solution bag in which the tissue sample is to be stored, ahead of supercooling the tissue sample, to minimize such ice nucleation.

Recovery of Biological Samples after Sample Acquisition

After procurement (stage 1), and transport (if required) at 4° C., e.g., for 1-12 hours (stage 2), the tissue sample or organ is "recovered" by SNMP at a sub-normothermic temperature (e.g., at 21)° ° C. (stage 3) (see FIG. 1A). In particular, in some embodiments, a biological sample can be obtained from a subject (e.g., a mammal, e.g., a human, a primate, or a pig) and cooled to 4° C. in a hypothermic storage solution (e.g., University of Wisconsin solution). The biological sample may be warmed to a sub-normothermic temperature (e.g., 21° C.) by perfusing the sample with a recovery solution at a sub-normothermic temperature prior to preconditioning the biological sample for supercooling. The recovery solution can contain cryoprotective agents such as polyethylene glycol (PEG). The recovery solution can further contain insulin, dexamethasone, heparin, antibiotics (e.g., penicillin-streptomycin), albumin, and Williams medium E.

In some embodiments, the recovery solution can be supplemented with additional insulin and 3-OMG during the perfusion step, or replaced with a recovery solution that contains additional insulin and 3-OMG In some embodiments, the biological sample can be perfused with the recovery solution for a duration of about 3 hours.

Pre-Conditioning Biological Samples Prior to Supercooling

Next, in stage 4, the biological tissue sample, e.g., organ, is pre-conditioned. The present disclosure relates to the use of cryoprotective agents to pre-condition biological samples prior to subzero preservation to eliminate or reduce freezing (formation of ice crystals). For example, pre-conditioning of a biological sample at a hypothermic temperature (e.g., 4° C.) using any of the loading solutions described herein prior to supercooling the biological sample can eliminate or reduce freezing (formation of ice crystals), for example by reducing the melting point of the liquids within biological sample. The hypothermic machine perfusion (HMP) step described herein is an example of such pre-conditioning step.

In some embodiments, the cryoprotective agent can contain or include the hypothermic preservation (HP) solution University of Wisconsin solution (UW). UW contains potassium hydroxyethyl starch, raffinose, and potassium lactobionate that could modify ice nucleation and lower the melting point as compared to pure water (see Table 1). The protective agents can also include trehalose (e.g., D-(+)-Trehalose dehydrate), polyethylene glycol (PEG), Glycerol, and 3-O-methyl-D-glucose (3-OMG).

In some embodiments, other solutions such as Celsior® flushing and cold storage solution, Perfadex® electrolyte preservation solution, Somah, histidine-tryptophan-ketoglutarate, Unisol® solution, or Hypothermosol® biopreservation media can be used in the cryoprotective agent instead of, or in combination with UW.

As noted above, the pre-conditioning step can be, and typically is, preceded by a recovery step (Stage 3), where the biological sample that may be acquired at 4° C. can be perfused with a recovery solution comprising glycerol, trehalose, and PEG while warming the biological sample to a sub-normothermic temperature (e.g., about 21° C.) prior to preconditioning.

New Protocol for Loading the Cryoprotective Agents

Further in stage 4, the present disclosure relates to a new method of preconditioning the biological sample by perfusing the biological sample with a loading buffer containing cryoprotective agents (e.g., PEG glycerol, trehalose, and UW). In some embodiments, this process can be performed at a hypothermic ambient temperature (e.g., about 4° C.).

In some embodiments, two or more different loading solutions can be used. For example, the biological sample can be perfused with a first loading buffer containing PEG glycerol, trehalose, and UW, followed by a second loading buffer that contains a higher concentration of one or more cryoprotective agents (e.g., glycerol). When different loading solutions are used, the perfusion rate can be adjusted to maintain a constant perfusion pressure (e.g., for human livers, a perfusion rate that is sufficient to obtain perfusion pressure of about 3 mmHg for portal vein and about 30 mmHg for hepatic artery can be used). This perfusion step can be performed for a period of time sufficient to uniformly perfuse the loading buffer throughout the biological sample (e.g., 1 hour).

Reduction of Liquid-Air Interfaces

Further in stage 5, supercooled liquid (e.g., contained within a biological sample) is intrinsically metastable and can spontaneously transform to lower-energy-level ice crystals through the formation of ice nuclei, which can be readily achieved by ice seeding. In the context of biological sample preservation, formation of ice crystals is generally undesirable because of ice-mediated injury to cells (Bruinsma, B. G. & Uygun, K. Subzero organ preservation: the dawn of a new ice age? Curr. Opin. Organ Transplant. 22, 281-286 (2017); Berendsen, T. A. et al. Supercooling enables long-term transplantation survival following 4 days of liver preservation. Nat. Med. 20, 790-793 (2014); Bruinsma, B. G. et al. Supercooling preservation and transplantation of the rat liver. Nat. Protoc. 10, 484-494 (2015)), which can cause cell death and organ damage.

In the context of supercooling, liquid-air interfaces provide thermodynamically favorable sites of heterogeneous ice nucleation due to surface tension present at the interface. The present disclosure demonstrates that formation of ice crystals or ice nucleation can be reduced, e.g., significantly reduced, during high subzero preservation in stage 5 by reducing or eliminating liquid-air interfaces. For example, air can be removed from a storage solution bag that is holding a biological sample (e.g., an organ) between stage 4 and stage 5, before subjecting the biological sample to supercooling in stage 5. Such air removal can be achieved by various methods, including immersing the storage solution bag containing the biological sample in water or other liquid (i.e., water displacement method), which results in the water or other liquid pushing out the air in the bag, or using a vacuum pump to remove air from the storage solution bag. When using the vacuum methods, the container for the biological sample can be rigid, whereas when using the displacement method, the container must be flexible.

In some embodiments, the elimination of liquid-air interfaces can be performed after pre-conditioning the biological sample with one or more loading solutions (e.g., after SNMP step), and prior to supercooling.

Supercooling of Biological Samples

In stage 5, after the biological sample is appropriately pre-conditioned (stage 4) as discussed above, the tissue sample can be supercooled. The methods described herein can preserve biological sample at a subzero temperature by supercooling (i.e., without freezing or ice crystal formation) for various time periods, for example, for more than 12, 13, 14, 15, 16, 17, 18, 19, 20, 21, 22, 23, or 24 hours, or more than 1, 2, 3, 4, 5, 6, or 7 days, or for more than 1, 2, 3, 4, 5, or 6 months, or even longer. In some embodiments, the period is less than 12, 13, 14, 15, 16, 17, 18, 19, 20, 21, 22, 23, or 24 hours, or less than 1, 2, 3, 4, 5, 6, or 7 days, or for less than 1, 2, 3, 4, 5, or 6 months.

In some embodiments, the biological sample can be an organ such as a liver, a heart, a lung, skin, a brain, an eye, or a bone for use in organ transplantation, where storage and transport of the organ is necessary between harvesting from an organ donor and transplantation of the organ in an organ recipient. The time between the organ harvesting and transplantation can vary, and can be more than for more than 12, 13, 14, 15, 16, 17, 18, 19, 20, 21, 22, 23, or 24 hours, or more than 1, 2, 3, 4, 5, 6, or 7 days, or for more than 1, 2, 3, 4, 5, or 6 months, or even longer. In some embodiments, the time between the organ harvesting and transplantation can be is less than 12, 13, 14, 15, 16, 17, 18, 19, 20, 21, 22, 23, or 24 hours, or less than 1, 2, 3, 4, 5, 6, or 7 days, or for less than 1, 2, 3, 4, 5, or 6 months. The organ can be a whole organ or a portion thereof. In some embodiments, the tissue sample or organ can be a tissue for use in tissue engineering, and regenerative medicine.

Unloading and Recovery of Supercooled Biological Samples for Subsequent Use

Supercooled biological samples can be recovered for subsequent use (e.g., organ transplantation) by perfusing the supercooled sample with an unloading solution at a hypothermic temperature (e.g., 4)° ° C. (stage 6), and a post-supercooling recovery solution at a sub-normothermic temperature (e.g., 21° C.)(stage 7)(see FIG. 1A).

The unloading solution can include cryoprotective agents such as PEG glycerol, and trehalose. In some embodiments, the unloading solution can further include insulin, dexamethasone, antibiotics (e.g., penicillin-streptomycin), antioxidant (Trolox), albumin, and Williams' medium E. The biological sample can be (e.g., HMP) with the unloading solution for a duration of about 10 minutes (stage 6).

The post-supercooling recovery solution can include PEG. In some embodiments, the post-supercooling recovery solution can further include insulin, dexamethasone, heparin, antibiotics (e.g., penicillin-streptomycin), antioxidant (e.g., Trolox), albumin, and Williams' medium E. The biological sample can be perfused with the post-supercooling recovery solution during the recovery stage (e.g., using SNMP) for a duration of about 3 hours (Stage 7).

Following the recovery steps, the biological samples can be warmed to a normothermic condition (e.g., 37° C.) for use (e.g., organ transplantation)(e.g., using normothermic machine perfusion (NMP)).

Machine Perfusion and Supercooling System

The present disclosure relates to machine perfusion systems that can perform the perfusion protocols described herein. The machine perfusion systems can include a pump (e.g., a roller pump) that is configured to produce non-pulsatile flow (e.g., duplex non-pulsatile circulation), a perfusate reservoir (e.g., a jacketed organ chamber), a heat exchanger, a hollow fiber oxygenator, a jacketed bubble trap, a pressure sensor, and/or a sampling port. These components of the perfusion systems can be serially connected by a tubing (e.g., silicon tubing). In some embodiments, the perfusate and/or biological sample temperature can be controlled by a separated warming/cooling circuits. The warming circuit can warmed by a warm water bath, while the cooling circuit can be cooled by a chiller. Both circuits can be pumped through heat exchanger and the jackets of the bubble t raps and the organ chamber. The chiller can include a refrigerant basin that can hold the biological sample during supercooling.

In some embodiments, the machine perfusion and supercooling system can be controlled by a computer control unit that is operatively connected to the other components of the system such that the computer control unit can control parameters such as perfusate temperature, perfusate flow rate, and time duration and sequence with which these parameters are maintained, to perform the perfusion protocols described herein.

EXAMPLES

The invention is further described in the following examples, which do not limit the scope of the invention described in the claims.

Example 1: Organ Acquisition

Human livers were procured in standard fashion (Bruinsma, B. G. et al. Subnormothermic Machine Perfusion for Ex Vivo Preservation and Recovery of the Human Liver for Transplantation: Subnormothermic MachAine Perfusion of Human Livers. *Am. J. Transplant.* 14, 1400-1409 (2014)) by the organ procurement organizations (OPO) New England Donor Services Bank (NEDS, Waltham, MA, USA) and LiveOnNY (New York, NY, USA). Informed consent was obtained from the donors by the OPO. After the livers were rejected for transplantation, they were transported to our lab under conventional hypothermic preservation (HP) conditions in University of Wisconsin Solution (UW). We excluded livers based on the following criteria: warm ischemic time >60 min, cold ischemic time >18 hours, >20% macro steatosis, donor history of liver fibrosis and any grade of liver laceration.

Example 2: Perfusates Used for Subzero Preservation

Reagents

Details of the perfusates and storage solution are described below

Pre-Supercooling Recovery Solution (4 Liter)
- 40 U of regular insulin (Massachusetts General Hospital Pharmacy, Boston, MA, USA)
- 32 mg Dexamethasone (Sigma Aldrich, St. Louis, MO, USA)
- 20,000 U of sodium heparin (Massachusetts General Hospital Pharmacy, Boston, MA, USA)
- 32 mL penicillin-streptomycin (5,000 U/ml) (Thermo Fisher Scientific, Waltham, MA, USA)
- 200 mL of 25% Human albumin (Massachusetts General Hospital Pharmacy, Boston, MA, USA)
- 80 g 35 kDa Polyethylene Glycol (Sigma Aldrich, St. Louis, MO, USA)
- Williams' medium E to a total volume of 4000 mL (Sigma Aldrich, St. Louis, MO, USA)

Additives Added to 2 L Pre-Supercooling Recovery Solution
- 77.68 g m added during perfusion (Sigma Aldrich, St. Louis, MO, USA)
- 380 U regular insulin, added during perfusion (Massachusetts General Hospital Pharmacy, Boston, MA, USA)

Loading Solution 1 (1 Liter)
- 40 U regular insulin (Massachusetts General Hospital Pharmacy, Boston, MA, USA)
- 8 mg dexamethasone (Sigma Aldrich, St. Louis, MO, USA)
- 50 g 35 kDa Polyethylene Glycol (Sigma Aldrich, St. Louis, MO, USA)
- 50 mL glycerol (Thermo Fisher Scientific, Waltham, MA, USA)
- 37.83 g D-(+)-Trehalose dihydrate (Sigma Aldrich, St. Louis, MO, USA)
- University of Wisconsin Solution to a total volume of 1000 mL (Bridge to Life Ltd., Columbia, SC, USA)

Loading Solution 2 (3 Liter)
- 120 U regular insulin (Massachusetts General Hospital Pharmacy, Boston, MA, USA)
- 24 mg dexamethasone (Sigma Aldrich, St. Louis, MO, USA)
- 150 g 35 kDa Polyethylene Glycol (Sigma Aldrich, St. Louis, MO, USA)
- 300 mL glycerol (Thermo Fisher Scientific, Waltham, MA, USA)
- 113.49 g D-(+)-Trehalose dihydrate (Sigma Aldrich, St. Louis, MO, USA)
- University of Wisconsin Solution to a total volume of 3000 mL (Bridge to Life Ltd., Columbia, SC, USA)

Unloading Solution (1 Liter)
- 10 U regular insulin (Massachusetts General Hospital Pharmacy, Boston, MA, USA)
- 8 mg dexamethasone (Sigma Aldrich, St. Louis, MO, USA)
- 8 ml penicillin-streptomycin (5,000 U/ml) (Thermo Fisher Scientific, Waltham, MA, USA)
- 50 g 35 kDa Polyethylene Glycol (Sigma Aldrich, St. Louis, MO, USA)
- 500 mg 6-Hydroxy-2,5,7,8-tetramethylchromane-2-carboxylic acid (Trolox, Cayman Chemical Company, Ann Arbor, MI, USA)
- 50 ml 25% Human albumin (Massachusetts General Hospital Pharmacy, Boston, MA, USA)

50 ml Glycerol (Thermo Fisher Scientific, Waltham, MA, USA)

37.83 g D-(+)-Trehalose dihydrate (Sigma Aldrich, St. Louis, MO, USA)

1000 ml Williams' medium E (Sigma Aldrich, St. Louis, MO, USA)

Post-Supercooling Recovery Solution (2×4 Liter)

40 U of regular insulin (Massachusetts General Hospital Pharmacy, Boston, MA, USA)

32 mg dexamethasone (Sigma Aldrich, St. Louis, MO, USA)

20,000 U of sodium heparin (Massachusetts General Hospital Pharmacy, Boston, MA, USA)

32 mL penicillin-streptomycin (5,000 U/ml) (Thermo Fisher Scientific, Waltham, MA, USA)

2 g 6-Hydroxy-2,5,7,8-tetramethylchromane-2-carboxylic acid (Trolox, Cayman Chemical Company, Ann Arbor, MI, USA)

200 mL of 25% Human albumin (Massachusetts General Hospital Pharmacy, Boston, MA, USA)

80 g 35 kDa Polyethylene Glycol (Sigma Aldrich, St. Louis, MO, USA)

Williams' medium E to a total volume of 4000 mL (Sigma Aldrich, St. Louis, MO, USA)

Blood

3 U non-leuko reduced packed red blood cells, type O Rh+(Research Blood Components LLC, Boson, MA, USA)

3 U non-leuko reduced type O Rh- fresh frozen plasma (Research Blood Components LLC, Boson, MA, USA)

20 U regular insulin (Massachusetts General Hospital Pharmacy, Boston, MA, USA)

32 mg dexamethasone (Sigma Aldrich, St. Louis, MO, USA)

10,000 U of sodium heparin (Massachusetts General Hospital Pharmacy, Boston, MA, USA)

16 mL penicillin-streptomycin (5,000 U/ml) (Thermo Fisher Scientific, Waltham, MA, USA)

30 ml 8.4% sodium bicarbonate

Williams' medium E to a total volume of 2000 mL (Sigma Aldrich, St. Louis, MO, USA)

The two recovery perfusates ('pre-supercooling recovery solution' and 'post-supercooling recovery solution') were made for sub-normothermic machine perfusion (SNMP) recovery after HP and supercooling. Both were composed of 4 liter modified Williams' medium E (WE) (Sigma Aldrich, St. Louis, MO, USA) and were exactly the same, except the addition of Trolox (Cayman Chemical Company, Ann Arbor, MI, USA) to the post-supercooling recovery solution. For step wise cryoprotective agent loading two loading solutions ('loading solution 1' and 'loading solution 2') were made, which respectively composed of 1 and 3 liter of University of Wisconsin solution (UW) (Bridge to Life Ltd., Columbia, SC, USA) supplemented with 35 kDa Polyethylene Glycol (PEG) (Sigma Aldrich, St. Louis, MO, USA), D-(+)-Trehalose dihydrate (Sigma Aldrich, St. Louis, MO, USA) and glycerol (Thermo Fisher Scientific, Waltham, MA, USA). For the stepwise cryoprotective agent unloading, 1 liter of modified WE was supplemented with PEG, trehalose and glycerol. For blood reperfusion, 3 units of non-leuko reduced type O Rh+ packed red blood cells (Research Blood Components LLC, Boson, MA, USA) were combined with 3 units of non-leuko reduced type O Rh+ fresh frozen plasma (Research Blood Components LLC, Boson, MA, USA) and supplemented with modified WE to a total volume of 4 liters. The perfusates were refrigerated at 4° C. and the blood was warmed to 37° C. before use. The pH of all solutions was corrected to a pH between 7.3-7.4, by addition of $NaHCO_3$ before priming the perfusion system.

Example 3: Machine Perfusion and Supercooling System

Figure 2B:
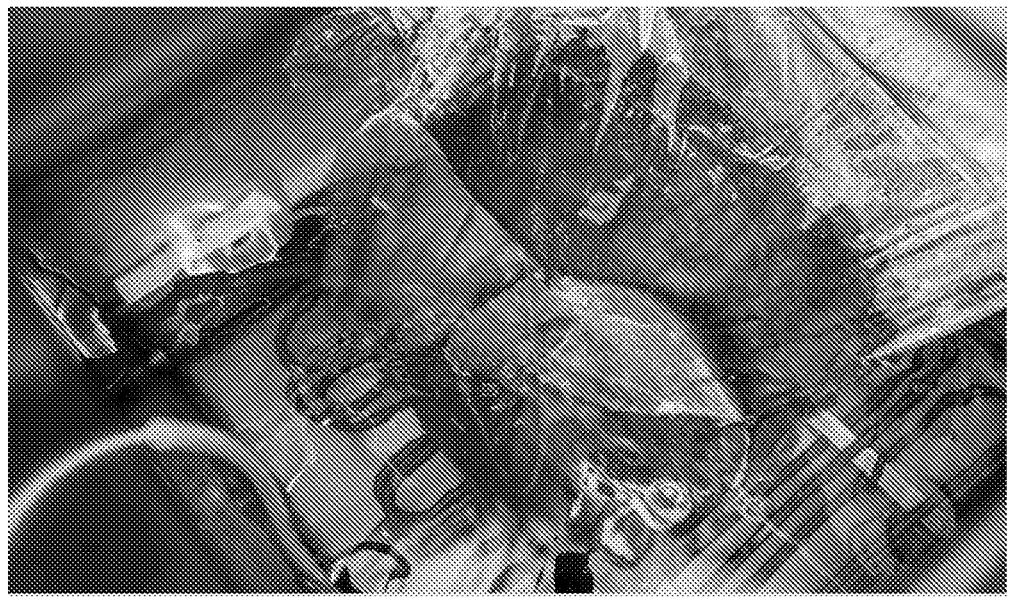

The machine perfusion system consisted of a duplex non-pulsatile circulation, providing portal and arterial perfusion, as shown in FIG. 2B. The liver drains freely in a jacketed organ chamber that also serves as perfusate reservoir (Radnoti, Monrovina, CA, USA). For both portal and arterial circulation, the perfusate is pumped by a flow rate controlled roller pump (Cole Palmer, Vernon Hills, IL, USA) through a heat exchanger combined with a hollow fiber oxygenator (LivaNova, London, UK), a jacketed bubble trap (Radnoti, Monrovia, CA, USA), a pressure sensor (Living Systems Instrumentation, Albans City. VT, USA) and sampling port (Cole Palmer, Vernon Hills, IL, USA), which are connected in series with size 24 silicone tubing (Cole Palmer, Vernon Hills, IL, USA). The two membrane oxygenators are perfused at a combined flow of 2 L/min with a mixture of 95% $O_2$ and 5% $CO_2$.

Both bubble traps are filled to 25% and therefore also serve as compliance chamber to minimize pressure pulses created by the roller pumps. The system contains a perfusate in and outflow which can be configured to either recirculation perfusion or single-pass perfusion. The liver and perfusate temperature are controlled by a separated warming/cooling circuit. Water or refrigerant is either warmed by a warm water bath (ThermoFisher Scientific, Pittsburgh, PA, USA) or cooled by a chiller (Optitemp, Traverse City, MI, USA) respectively, and pumped through the heat exchangers and the jackets of the bubble traps and the organ chamber. The chiller contains a 75 liter refrigerant basin that also holds the liver during supercooling.

Example 4: Biological Sample Pre-Conditioning Protocol

An outline of the research design and photographs of the various aspects of the steps are shown in FIGS. 1A-1E. FIG. 1A shows a schematic temperature profile of the supercooling protocol. The overall research design includes 8 stages:

Stage 1: Five human livers, rejected for transplantation, were procured in standard fashion.

Stage 2: The livers were transported under hypothermic preservation (HP) conditions.

Stage 3: Upon arrival, we recovered the grafts from the incurred warm and cold ischemia and collected pre-supercooling viability parameters during 3 hours of sub-normothermic machine perfusion (SNMP). We supplemented the perfusate with 19.42 g/L (200 mM) 3-O-methyl-d-glucose (3-OMG) during the last hour of perfusion.

Stage 4: At the end of SNMP, we gradually lowered the perfusion temperature, which was followed by hypothermic machine perfusion (HMP) with University of Wisconsin solution (UW) supplemented with 50 g/L (1.43 µM) 35 kD polyethylene glycol (PEG), 37.83 g/L (100 mM) trehalose dihydrate and 125.7 g/L (1.36 M) glycerol.

Stage 5: Following preconditioning with the cryoprotective agents, the livers were supercooled and stored free of ice at −4° C. for 20 hours.

Stage 6: After supercooling, the cryoprotective agents were gradually washed out.

Stage 7: The livers were recovered by SNMP, identical to pre-supercooling conditions except addition of Trolox to the perfusate and absence of 3-OMG and cooling at the end of SNMP. Post-supercooling viability parameters were collected during SNMP and compared to their baseline values.

Stage 8: Three livers were additionally reperfused with non-leuko-reduced red blood cells and plasma at 37° C. as a model for transplantation.

FIG. 1B shows the machine perfusion system used in the perfusion steps described herein. FIG. 1C shows a liver during the SNMP recovery step. FIG. 1D shows a liver in supercooling basin of the chiller. FIG. 1E shows normothermic reperfusion with blood.

Back Table Graft Preparation

While the graft was submerged in ice cold UW (Stage 2, FIG. 1A), the common bile duct (CBD), hepatic artery (HA) and portal vein (PV) were dissected. Side branches were identified and tied using 2.0 silk sutures. Subsequently, the cystic duct and artery were dissected, tied and cut distally from the suture. Next, the gallbladder and diaphragm were removed. Cannulas were inserted in the CBD, HA, and PV (Organ Assist, Groningen, the Netherlands) and secured in place by 1.0 silk sutures. Lastly, the liver was flushed with 1.5 and 0.5 liters ice cold ringers lactate through the PV and HA respectively, to remove the UW solution. The vasculature was checked for leaks during the flush, which were tied or repaired with 2.0 silk or 5.0 prolene sutures accordingly.

Pre-Supercooling Sub-Normothermic Machine Perfusion

The machine perfusion system was primed with the pre-supercooling recovery solution and the machine perfusion system in- and outflow were configured in single-pass perfusion. The warm water bath was set at 21° C. and connected to the cooling/rewarming circuit. The prepared liver was placed in the organ chamber and the cannulas were de-aired and connected to the perfusion system. Perfusion was initiated by starting the pumps at 50 mL/min. The flow rates were manually adjusted to obtain perfusion pressures of 5 mmHg and 60 mmHg for the PV and HA respectively. The bile duct cannula was connected to a collection reservoir and a needle thermocouple (Omega, Biel, Switzerland) was inserted in the right lobe. After 2 liters of perfusate was passed through the liver, the machine perfusion system was configured from the single-pass to recirculation perfusion and the remaining 2 liters recovery solution was recirculated throughout the perfusion. The liver was gradually rewarmed during the first 30 minutes of perfusion. After 90 minutes of perfusion, regular insulin (Massachusetts General Hospital Pharmacy, Boston, MA, USA) and 3-O-Methyl-D-Glucose (Sigma Aldrich, St. Louis, MO, USA) were added to the perfusate. (Stage 3, FIG. 1A)

After 150 minutes, the perfusate and liver were gradually cooled to 4° C. in 30 min, by connecting the cooling/rewarming circuit to the chiller. Perfusion pressures were lowered to 3 mmHg and 30 mmHg during hypothermic machine perfusion (HMP). After gradual cooling, the machine perfusion system was configured into single-pass perfusion and the livers were perfused with 1 L loading solution 1, followed by 3 L of loading solution 2 (Stage 4, FIG. 1A)

Supercooling

Following preconditioning during HMP, the liver was disconnected from the machine perfusion system and bagged in a Steri-Drape™ Isolation Bag (3M™ Healthcare, St. Paul, MN, USA). Before the bag was closed, all air and residual loading solution was removed. The bagged liver was suspended and fully submerged in the chiller basin and supercooling was initiated by setting the chiller temperature to −4° ° C. (Stage 5, FIG. 1A). The chiller temperature was regularly checked during supercooling. After 20 hours of supercooling, the liver was removed from the chiller basin. To confirm none of the livers froze during supercooling, the livers were visually inspected, and the soft liver tissue manually palpated when they were removed from the bag.

Figure 2C:
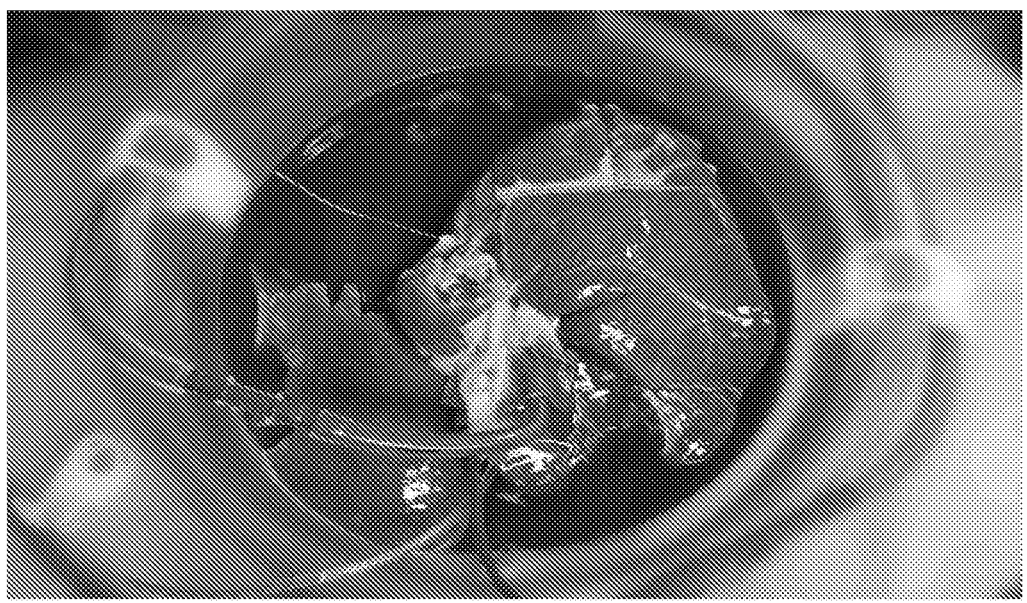

Photos of the livers during the supercooling protocol are shown in FIGS. 2A-2C. FIG. 2A shows a liver during the cooling phase of sub-normothermic machine perfusion (SNMP). FIG. 2B shows a liver submerged in the chiller basin during ice-free subzero supercooled storage. FIG. 2C shows a liver during reperfusion.

Post-Supercooling Sub-Normothermic Machine Perfusion

After the liver was removed from the bag it was connected to the machine perfusion system. Post-supercooling SNMP was identical to pre-supercooling machine perfusion except the following points: (1) Hypothermic single-pass perfusion of 1 L unloading solution preceded the single-pass perfusion of 2 L recovery solution (Stage 6, FIG. 1A). Similar to pre-supercooling SNMP, the start of perfusion with recovery solution was defined as start of perfusion. (2) Perfusion was continued for 180 minutes at 21° C. instead of cooling before supercooling after 150 minutes perfusion (Stage 7, FIG. 1A). (3) The antioxidant 6-Hydroxy-2,5,7,8-tetramethylchromane-2-carboxylic acid ("Trolox") was added to the perfusate. (4) No 3-OMG or insulin were added to the perfusate.

Blood Reperfusion

The temperature of the warm water bath was set to from 21° ° C. to 38° C. to warm the liver core temperature to 37° C. within 15 minutes. Meanwhile, the single-pass perfusion configuration of the perfusion system was used to replace the 2 L recovery solution with 2 L warm blood which was recirculated during 2 hours reperfusion. Target pressures of 5 mmHg and 60 mmHg were used for the PV and HA respectively (Stage 8, FIG. 1A).

Example 5: Methods for Data Acquisition and Analysis

Viability Metrics

The livers were weighed before pre-supercooling SNMP and either after post-supercooling SNMP or blood reperfusion. One liver was weighed after both pre-supercooling SNMP and reperfusion (liver 3). HA and PV flow rates and pressures were registered every 30 minutes during perfusions and reperfusion.

Real time perfusate and blood measurements were performed every 30 minutes; pH, $pO_2$, $HCO_3$ and lactate were measured in the PV, HA and vena cava (VC) and Na, K, Ca, Cl, glucose and Hb were measured in the perfusate reservoir, using an Istat blood analyzer (Abbot Laboratories, Chicago, IL, USA). Whole blood counts were performed during reperfusion of one liver (liver 5) using a CELL-DYN® Emerald Hematology Analyzer (Abbot Laboratories, Chicago, IL, USA). Every 30 minutes additional 5 mL perfusate samples or plasma samples were collected, immediately frozen on dry ice and stored at −80° ° C. for post hoc analysis of AST, ALT and Urea, using colorimetric kits (ThermoFisher Scientific, Pittsburgh, PA) according to the manufacturers' instructions.

Bile volume in the bile reservoir was measured and collected at the start, mid and end of SNMP and blood reperfusion.

Bilateral wedge biopsies were taken right before and at the end of SNMP and halfway and at the end of blood reperfusion. Biopsies were fixed in buffered 5% formaldehyde for 24 hours and stored in 70% ethanol until outsourced processing and staining for hematoxylin and eosin (HE) and terminal deoxynucleotidyl transferase dUTP nick end labeling (TUNEL) staining (Massachusetts General Hospital Histology Molecular Pathology Core, Boston, MA, USA). HE stained slides were blindly assessed by an experienced liver pathologist (E.O.A.H). Processed TUNEL slides were scanned under 40× magnification using an Aperio ImageScope (Leica Biosystems, Buffalo Grove, IL, USA). For quantification of TUNEL histology, positive cells were counted at 3 square 450 μm sections per slide on standardized locations (at 50% on the radius from the center to the edge of the slide at 0° 60° and) 120° by two independent and blinded measurers. Sections of the wedge biopsies (approx. 1 g) were flash frozen in liquid nitrogen and stored at −80° ° C. Adenylate triphosphate (ATP), Adenylate diphosphate (ADP), Adenylate monophosphate (AMP), Nicotinamide adenine dinucleotide (NAD+ and NADH) were determined as described elsewhere[16]. In short, the tissue was homogenized in liquid nitrogen and analysed with targeted multiple reaction monitoring on a 3200 Triple quadrupole liquid chromatography-mass spectrometry system (AB Sciex, Foster City, CA).

Melting Points

To measure the solution melting point, a thin (0.2 mm wire diameter) K-type thermocouple wire (Omega, Biel, Switzerland) was inserted together with the sample in a glass capillary (2.0 mm diameter). The sample was flash frozen and thawed at constant ambient temperature (4° C.) while the temperature was logged at 100 ms intervals using a USB Thermocouple Data Acquisition Module (Omega) and Picolog 6 (Picotech, St. Neots. United Kingdom) software. The melting point was derived from the horizontal asymptote of the melting temperature profile.

To measure the melting point of the liquids within livers, flash frozen tissue biopsies taken before pre- and post-supercooling SNMP were used. The tissue was crushed in liquid nitrogen and loaded in the glass capillary. The melting point was measured following the same procedure as described for the solutions.

Data Processing

To calculate vascular resistance, the perfusion pressure was divided by the corresponding flow rate and initial liver weight.

Energy Charge was calculated with the following formula: ATP+0.5 ADP/(ATP+ADP+AMP).

Oxygen consumption was calculated with the following formula:

$$(aO_2*(art\_pO2*art\_flow+Port\_pO2*port\_flow-ven\_pO2*(art\_flow+port\_flow))+Hb/100*cHb*(art\_sO2/100*art\_flow+port\_sO2/100*port\_flow-ven\_sO2/100*(art\_flow+port\_flow)))/liver\_weight.$$

Where aO2=oxygen solubility coefficient (3.14*10^−5 mlO2/mmHgO2/ml); art_pO2=arterial partial oxygen pressure (mmHg); port_pO2=portal partial oxygen pressure (mmHg); ven_pO2=venous partial oxygen pressure (mmHg); art_flow=arterial flowrate (ml/min); port_flow=portal flowrate (ml/min); art_sO2=arterial hemoglobin saturation (%); port_sO2=portal hemoglobin saturation (%); ven_sO2=venous hemoglobin saturation (%); cHb=hemoglobin oxygen-binding capacity (1.34 mlO2/gram); Hb=hemoglobin (g/dl); liver_weight=liver weight (kg).

Lactate clearance was calculated with the following formula:

$$art\_lactate*art\_flow+port\_lactate*port\_flow-ven\_lactate*(art\_flow+port\_flow).$$

Where art_lactate=arterial lactate concentration (mM); port_lactate=portal lactate concentration (mM); ven_lactate=vebous lactate concentration (mM).

In one case (liver 1), missing portal blood gas values were replaced by the arterial values to calculate oxygen uptake and lactate clearance.

Statistical Analyses

Statistical analysis was performed in the statistical analysis software Prism® version 7.03 (GraphPad Software Inc., La Jolla, CA). Data were analyzed for normal distribution by visual inspection and the Shapiro-Wilk normality test. The melting points of liver tissues and solutions were compared using paired non-paired two-tailed student's t tests, respectively. Repeated measures two-way ANOVA, with the Sidak multiple comparisons test, was used for comparison of the time-course data. Total oxygen consumption was calculated by area under the curve analysis. The effect sizes of significant differences ($\eta^2$) were calculated in Office Excel (Microsoft, Redmont, WA) using the statistical output from the statistical analysis software Prism®.

Example 6: Biological Sample Viability Analysis

Figure 3A:
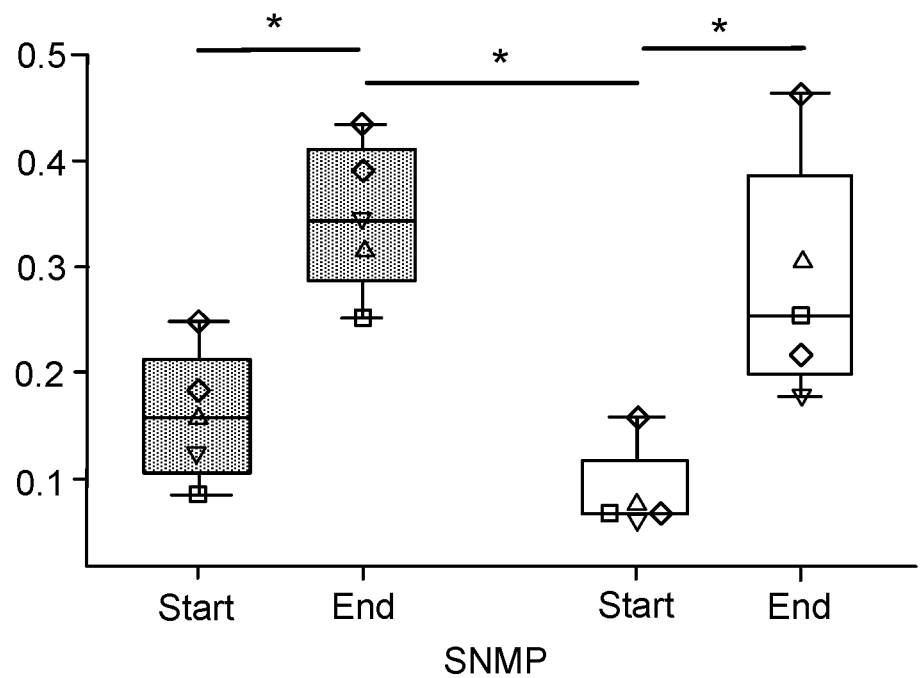
FIGS. 3A-3E and 3H are graphs showing key ex vivo viability parameters during pre-SNMP (dotted lines or left-side bars) and post-SNMP (solid lines and right-side bars bars).
Figure 7A:
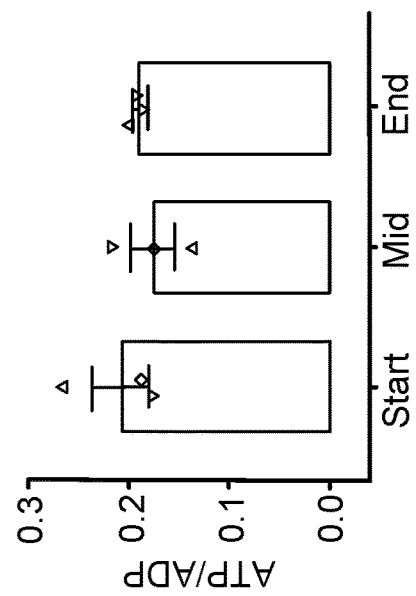
FIGS. 7A-F are graphs showing key ex vivo viability parameters during simulated transplantation by normothermic blood reperfusion.
Figure 7B:
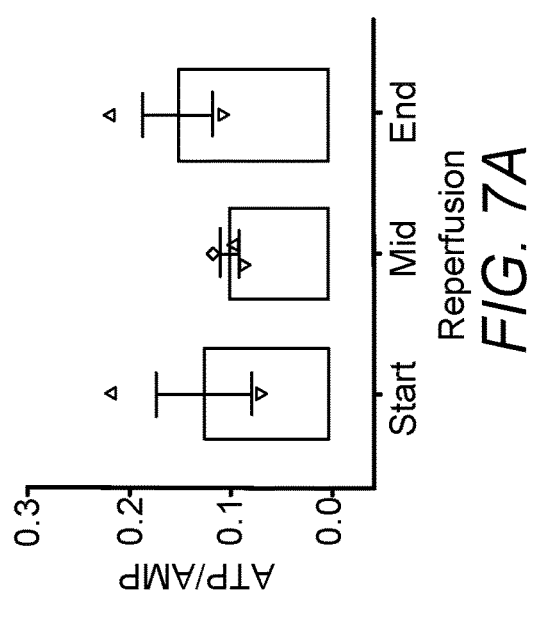

To assess if supercooled human livers retained their viability, we took advantage of the fact that SNMP has been shown to allow detailed ex vivo assessment of liver viability (Berendsen, T. A. et al. Supercooling enables long-term transplantation survival following 4 days of liver preservation. *Nat. Med.* 20, 790-793 (2014); Bruinsma, B. G. et al. Subnormothermic Machine Perfusion for Ex Vivo Preservation and Recovery of the Human Liver for Transplantation: Subnormothermic Machine Perfusion of Human Livers. *Am. J. Transplant.* 14, 1400-1409 (2014); Bruinsma, B. G. et al. Metabolic profiling during ex vivo machine perfusion of the human liver. *Sci. Rep.* 6, 22415 (2016); Sridharan, G. V. et al. Metabolomic Modularity Analysis (MMA) to Quantify Human Liver Perfusion Dynamics. *Metabolites* 7, (2017)). To be able to control for donor-to-donor variability in the marginal human livers that were rejected for transplantation (TABLE 2), we compared viability parameters during SNMP before, and after supercooling (FIG. 1A). Adenylate energy content, and particularly, the organs' ability to recover it during (re)perfusion is considered the most representative metric for liver viability (Bruinsma, B. G. & Uygun, K. Subzero organ preservation: the dawn of a new ice age? *Curr. Opin. Organ Transplant.* 22, 281-286 (2017); Bruinsma, B. G. et al. Metabolic profiling during ex vivo machine perfusion of the human liver. *Sci. Rep.* 6, 22415 (2016); Vajdová, K., Graf, R. & Clavien, P.-A. ATP-supplies in the cold-preserved liver: A long-neglected factor of organ viability. *Hepatol. Baltim. Md* 36, 1543-1552 (2002); Higashi, H., Takenaka, K., Fukuzawa, K., Yoshida, Y. & Sugimachi, K. Restoration of ATP contents in the transplanted liver closely relates to graft viability in dogs. *Eur. Surg. Res. Eur. Chir. Forsch. Rech. Chir. Eur.* 21, 76-82 (1989); Bruinsma, B. G. et al. Peritransplant Energy Changes and Their Correlation to Outcome After Human Liver Transplantation: *Transplantation* 101, 1637-1644 (2017)). The energy charge was low at the start of SNMP both before (i.e. directly after HP) and after supercooling due to slowly ongoing vital cell processes during storage. In this regard, the glycerol in the supercooling preservation solution was potentially phosphorylated at expense of ATP and ADP, contributing to the energy charge reduction during supercooling. Nonetheless, no statistical difference between pre- and post-supercooling energy charge was found (FIGS. 3A, 7A, and 7B).

TABLE 2

DONOR AND GRAFT CHARACTERISTICS.

| | Liver no. (symbol)** | | | | |
|---|---|---|---|---|---|
| | 1 (○) | 2 (□) | 3 (◊) | 4 (∧) | 5 (∨) |
| Donation type | DCD | DCD | DCD | DBD | DCD |
| Age | 57 yr | 32 yr | 53 yr | 57 yr | 60 yr |
| Sex | female | male | female | female | female |
| BMI | 29 | 28 | 36 | 23 | 30 |
| Liver Weight | 2.26 kg | 2.59 kg | 1.78 kg | 1.62 kg | 1.21 kg |
| | | Ischemia | | | |
| WIT | 00:46 | >0:30 | 00:34 | 00:00 | 00:26 |
| CIT | 05:47 | 09:04 | 06:50 | 15:05 | 07:44 |
| Steatosis | 0% | 0% | 0% | 0% | 20% |

**Liver symbols correspond to other figures.
DCD: donation after cardiac death.
DBD: donation after brain death.
WIT: warm ischemia time.
CIT: cold ischemia time.
BMI: body mass index.
Steatosis: Histological grade of steatosis.

Importantly, the energy charge recovered significantly during SNMP ($p<0.0001$, $F$ (1, 4)=443.9) both before and after supercooling (p=0.0209, mean diff. (95% CI)=0.190 (0.043 to 0.336), $\eta 2$=0.75 and p=0.0185, mean diff. (95% CI)=0.197 (0.050 to 0.343), $\eta 2$=0.47, respectively). The mean difference in end-SNMP energy charge was smaller than 20%. By comparison, >40% differences are observed in adenylate energy content between successful and unsuccessful transplanted livers in both large animal (Higashi, H., Takenaka, K., Fukuzawa, K., Yoshida, Y. & Sugimachi, K. Restoration of ATP contents in the transplanted liver closely relates to graft viability in dogs. *Eur. Surg. Res. Eur. Chir. Forsch. Rech. Chir. Eur.* 21, 76-82 (1989)) and clinical studies (Bruinsma, B. G. et al. Peritransplant Energy Changes and Their Correlation to Outcome After Human Liver Transplantation: *Transplantation* 101, 1637-1644 (2017); Lanir, A. et al. Hepatic transplantation survival: correlation with adenine nucleotide level in donor liver. *Hepatol. Baltim. Md* 8, 471-475 (1988); Kamiike, W. et al. Adenine nucleotide metabolism and its relation to organ viability in human liver transplantation. *Transplantation* 45, 138-143 (1988)).

Figure 3B:
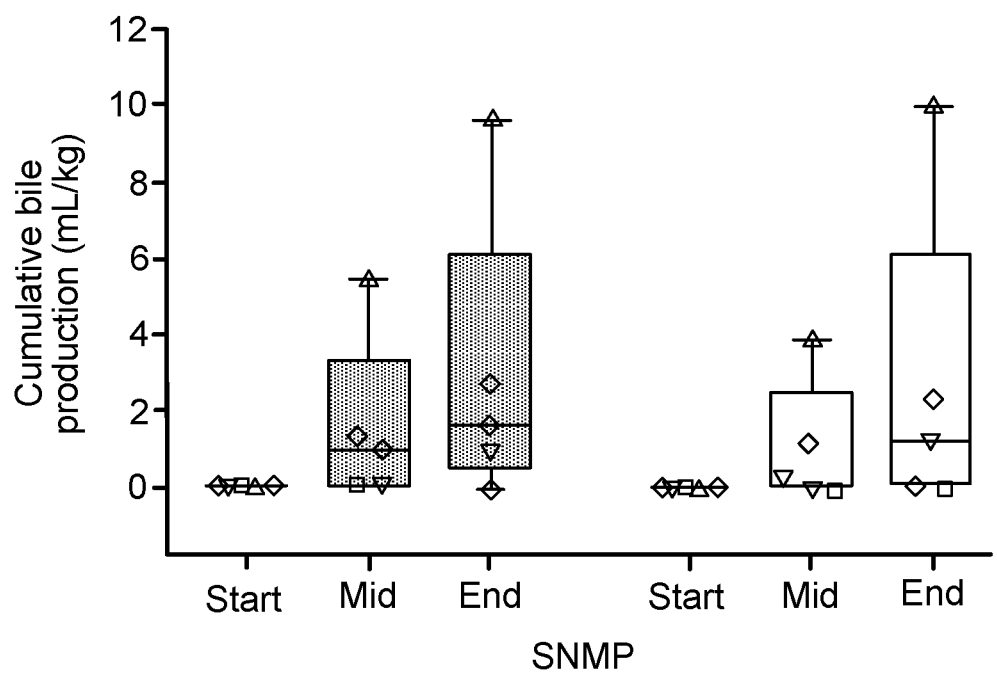
Figure 3C:
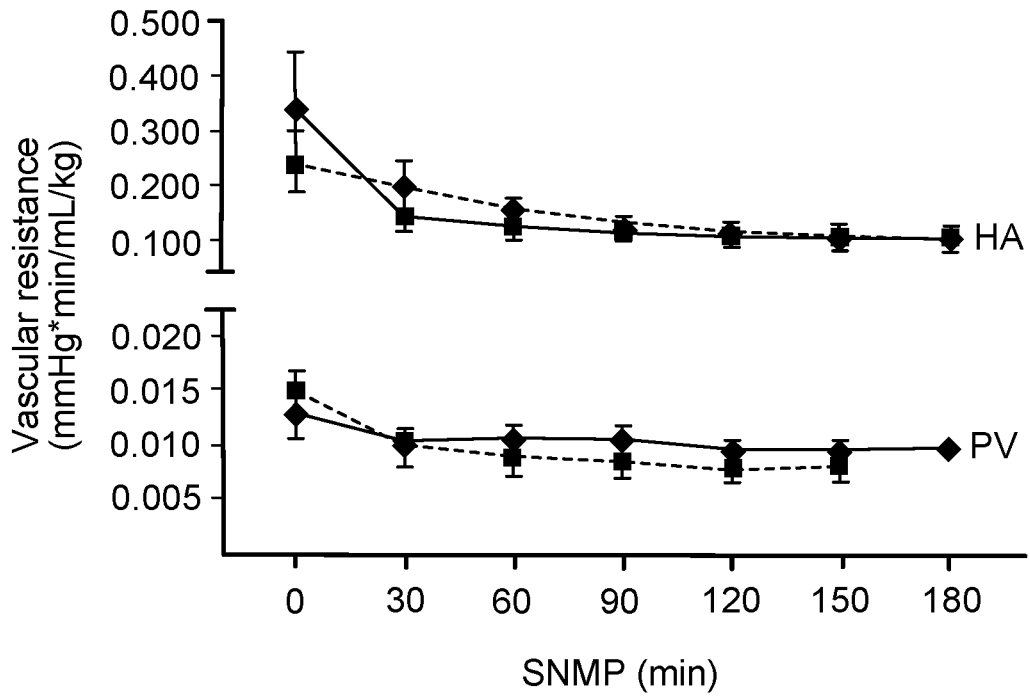

Additional important viability parameters during SNMP include bile production, vascular resistance and oxygen uptake, which were significantly correlated to transplant survival after supercooling in rats (Berendsen, T. A. et al. Supercooling enables long-term transplantation survival following 4 days of liver preservation. *Nat. Med.* 20, 790-793 (2014)). Of these parameters, bile production has been clinically correlated to graft function after liver transplantation (Kamiike, W. et al. Adenine nucleotide metabolism and its relation to organ viability in human liver transplantation. *Transplantation* 45, 138-143 (1988)) and to human liver function during SNMP (Bruinsma, B. G. et al. Metabolic profiling during ex vivo machine perfusion of the human liver. *Sci. Rep.* 6, 22415 (2016)). No statistical significance was found in bile production. Three livers produced the same amount of bile during SNMP before and after supercooling (FIG. 3B), indicating successful preservation. One liver (liver 2) did not produce bile either before or after supercooling and one liver (liver 1) stopped bile production after supercooling, while other viability parameters in both indicated preserved viability. Portal and arterial resistances (FIG. 3C) after supercooling were stable and no significant differences were found compared to pre-supercooling SNMP. The maximal observed mean difference between portal vein resistance before and after supercooling was 21% (at T=90 min), while much higher 100%-150% increases are reported in literature for non-viable livers (Berendsen, T. A. et al. Supercooling enables long-term transplantation survival following 4 days of liver preservation. *Nat. Med.* 20, 790-793 (2014); Bruinsma, B. G., Berendsen, T. A., Izamis, M.-L., Yarmush, M. L. & Uygun, K. Determination and extension of the limits to static cold storage using sub-normothermic machine perfusion. *Int. J. Artif. Organs* 36, 775-780 (2013)).

Figure 3D:
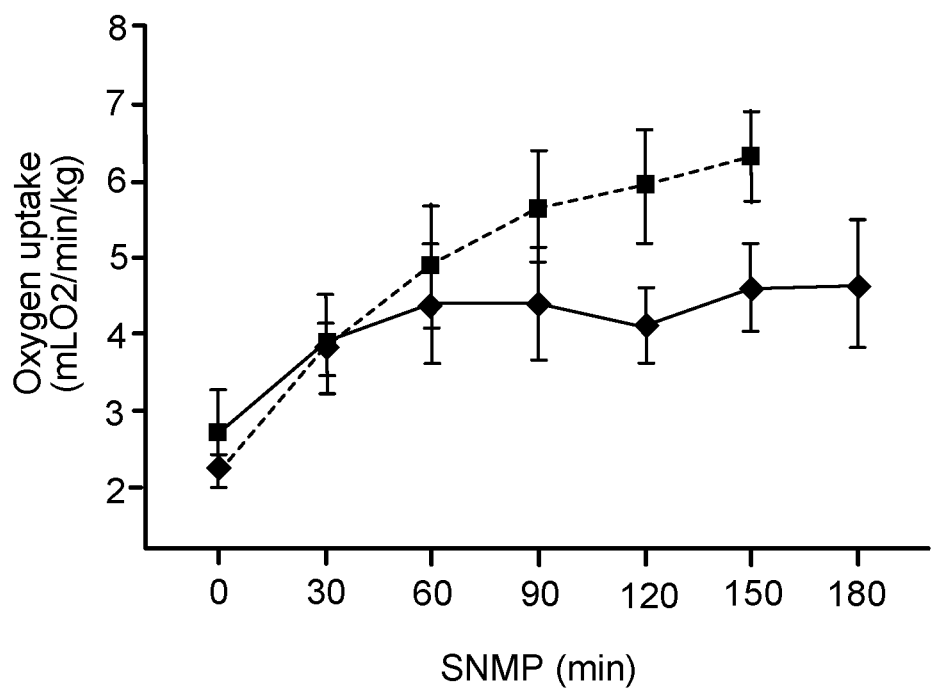

The recovery in oxygen uptake rate at the start of SNMP was the same before and after supercooling. Although the oxygen uptake at the end of SNMP was higher before supercooling, the difference in oxygen uptake rate at individual time points did not reach statistical significance. To account for the initial recovery phase of oxygen uptake during the first two hours of SNMP—which might attenuate a potential difference in the oxygen uptake at the end of perfusion—we also compared the oxygen uptake (area under the curve) at the end of perfusion (T≥120 min), which did not show a statistically significant difference. The mean difference in total oxygen uptake (total AUC) before and after supercooling (FIG. 3D) was 17% and three times lower than the reported 51% reduction in oxygen uptake (AUC) during SNMP of human livers with impaired viability (15).

Figure 6A:
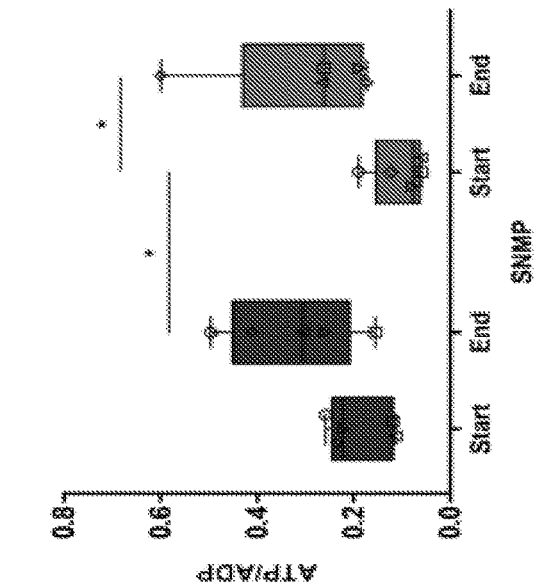
FIGS. 6A-6F are graphs showing key ex vivo viability parameters during pre-SNMP (left-side bars or dotted lines) and post-SNMP (right-side bars or solid lines).
Figure 6B:
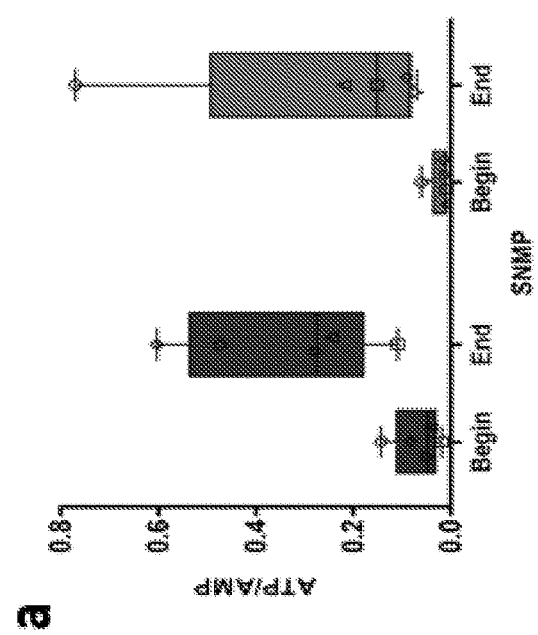
Figure 6C:
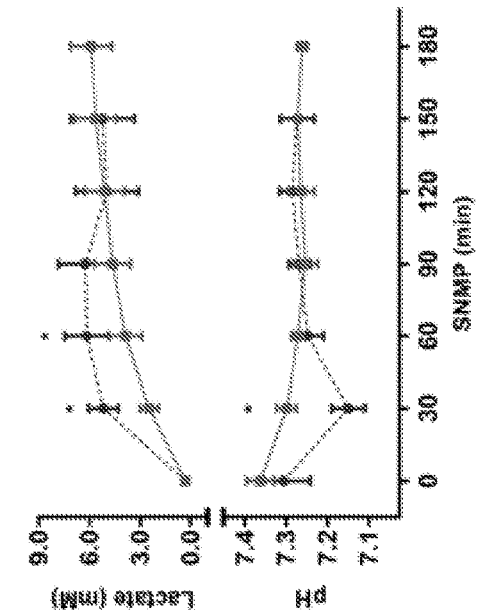
Figure 6D:
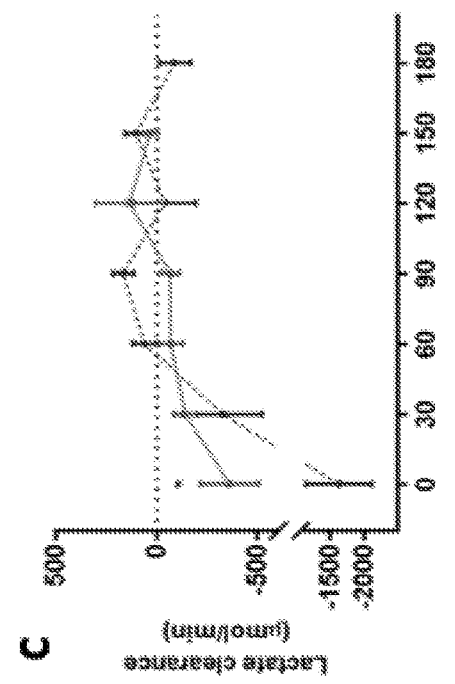
Figure 6E:
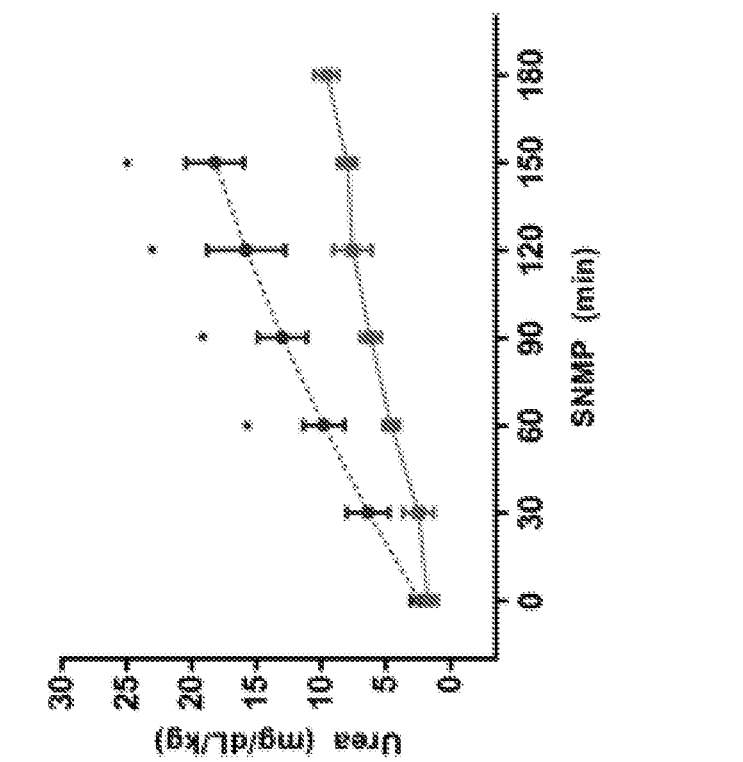
Figure 6F:
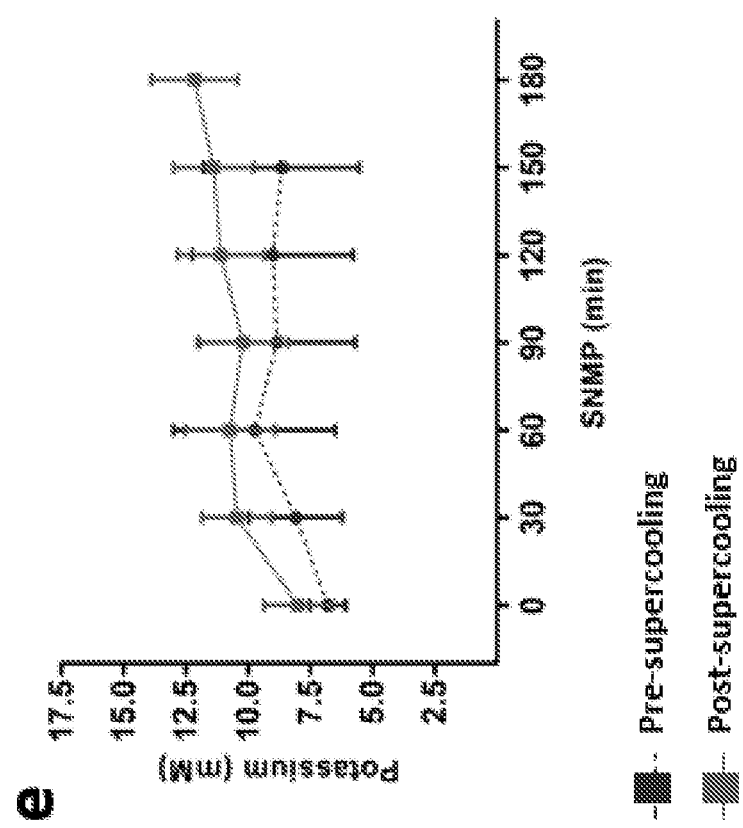

Like bile production, lactate clearance is an important liver function which was observed both before and after supercooling (FIG. 6C). Moreover, we found significantly higher lactate levels before supercooling (p=0.0105, F (5, 20)=4.056) that prevailed during the first hour of SNMP as compared to post-supercooling (p=0.0044, mean diff. (95% CI)=2.714 (0.727 to 4.701) $\eta 2$=0.42 at T=30 min and p=0.0164, mean diff. (95% CI)=2.326 (0.339 to 4.313), $\eta 2$=0.17 at T=60 min). (FIG. 6D).

Since the livers were transported to our hospital under hypothermic preservation (HP) conditions, we hypothesize that the build-up of lactate during HP is higher, compared to supercooling due to deeper metabolic stasis. As we observed this same pronounced trend in the DBD liver (liver 4), this is unlikely to be solely due to warm ischemia during procurement of DCD livers.

Figure 3E:
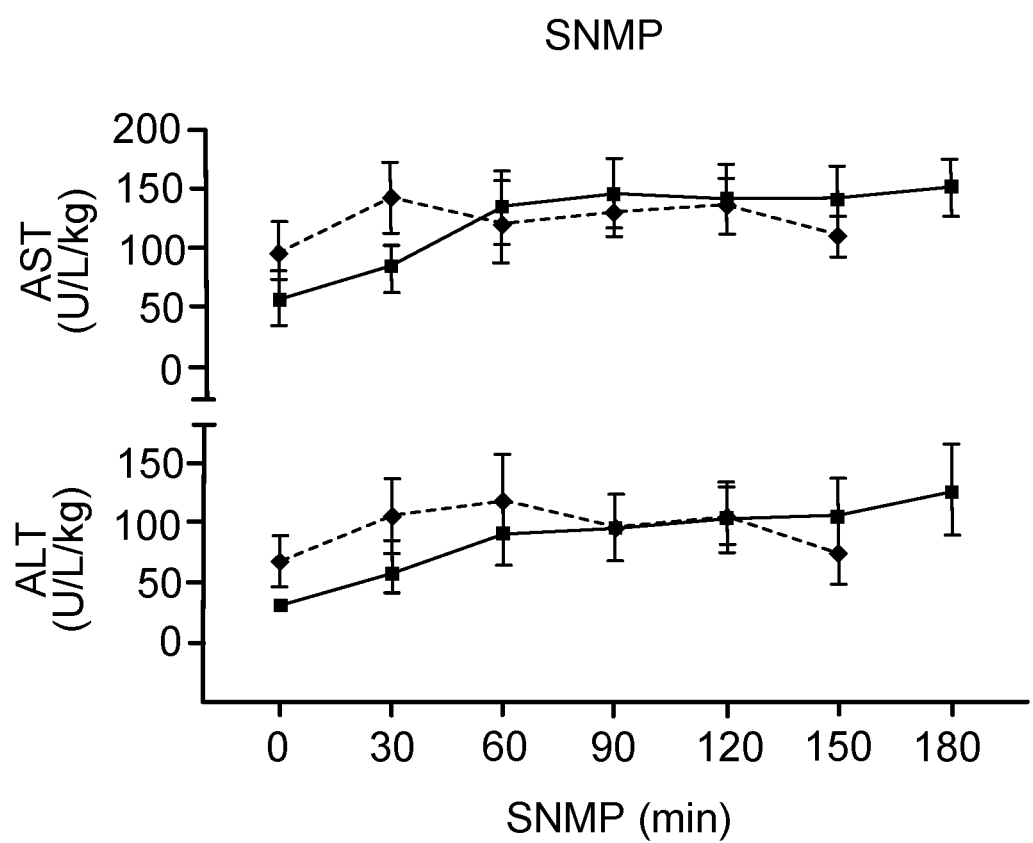
Figure 3G:
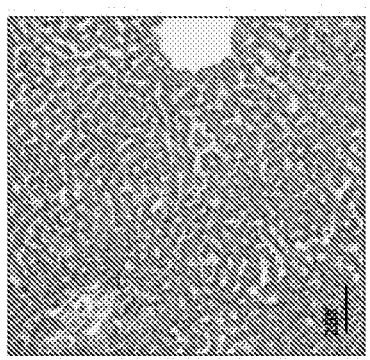
FIGS. 3F-3G are light microscopy images of histology samples during pre-SNMP and post-SNMP.
Figure 3G:
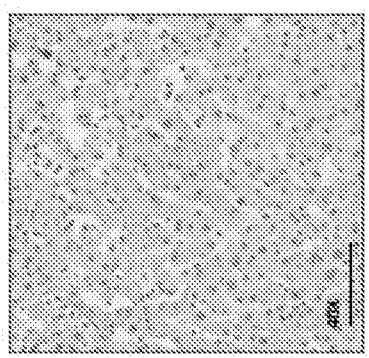
Figure 3G:
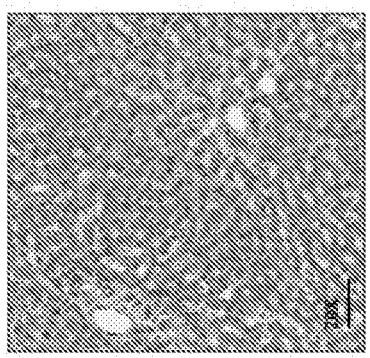
Figure 3G:
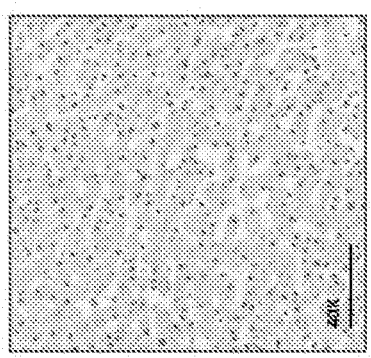
Figure 3F:
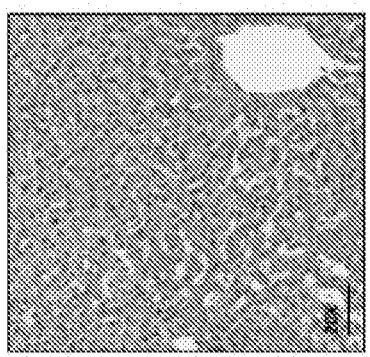
Figure 3F:
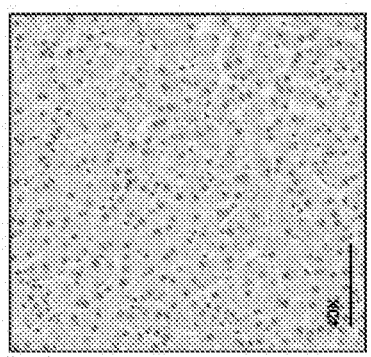
Figure 3F:
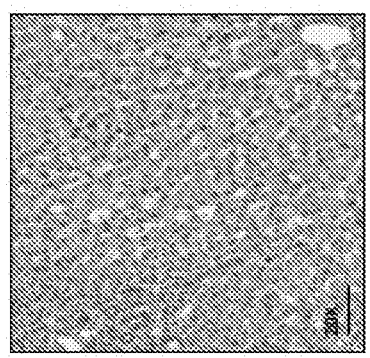
Figure 3F:
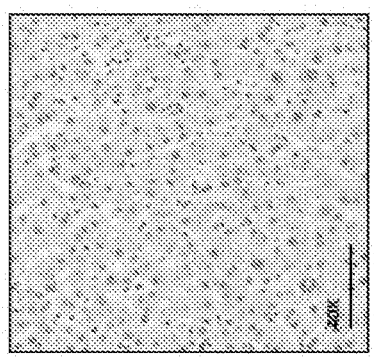
Figure 3H:
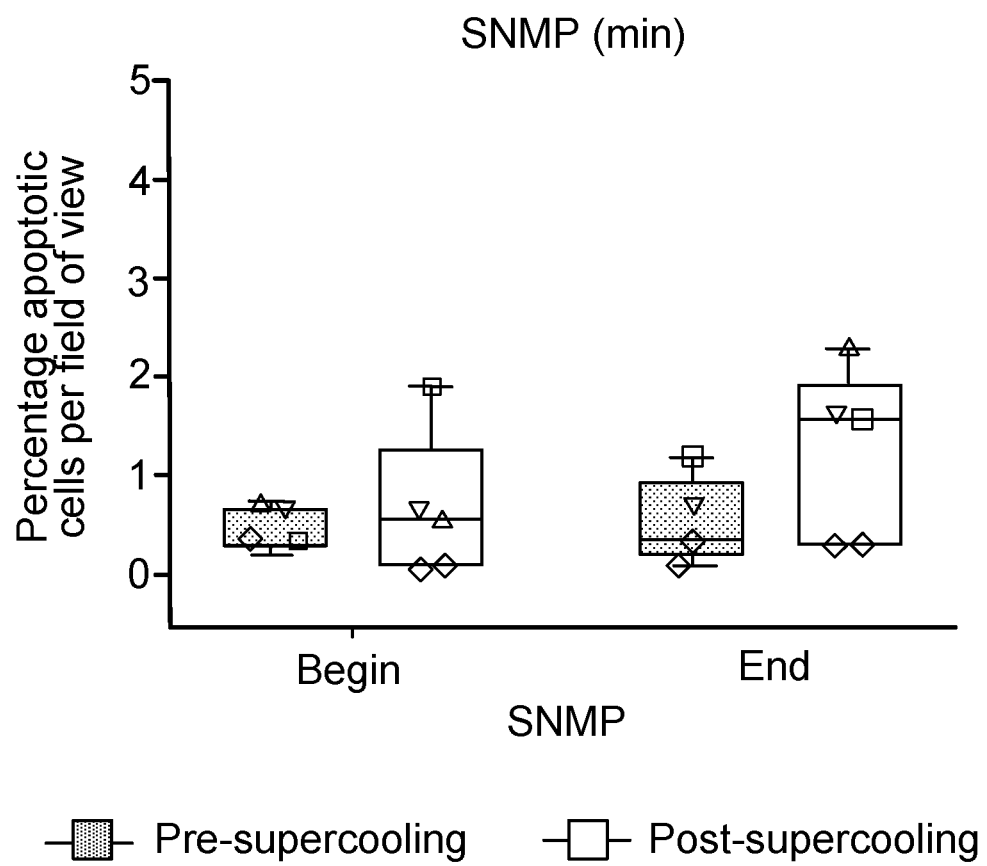

Besides liver function and metabolism, we assessed liver injury before and after supercooling. Hepatocellular injury was the same and stable before and after supercooling as demonstrated by aspartate aminotransferase (AST), alanine aminotransferase (ALT) (FIG. 3E) and potassium (FIG. 6E) concentrations in the perfusate. The transaminase levels we found are low compared to others (Bruinsma, B. G. et al. Subnormothermic Machine Perfusion for Ex Vivo Preservation and Recovery of the Human Liver for Transplantation: Subnormothermic Machine Perfusion of Human Livers. *Am. J. Transplant.* 14, 1400-1409 (2014); Bruinsma, B. G. et al. Metabolic profiling during ex vivo machine perfusion of the human liver. *Sci. Rep.* 6, 22415 (2016); op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013); Sutton, M. E. et al. Criteria for viability assessment of discarded human donor livers during ex vivo normothermic machine perfusion. *PloS One* 9, e110642 (2014); Watson, C. J. E. et al. Observations on the ex situ perfusion of livers for transplantation. *Am. J. Trans-* plant. *Off. J. Am. Soc. Transplant. Am. Soc. Transpl. Surg.* (2018). doi: 10.1111/ajt. 14687), which could be explained by the two liter perfusate that was non recirculated at the beginning of SNMP to wash out the cryoprotective agents. The stability of transaminase levels during perfusion is of particular importance since it confirms absence of potential toxicity of the cryoprotective agents (Best, B. P. Cryoprotectant Toxicity: Facts, Issues, and Questions. *Rejuvenation Res.* 18, 422-436 (2015)). This is confirmed by histology (FIGS. 3F-3G) which shows preserved lobular architecture with viable hepatocytes and intact sinusoidal endothelial cells. No necrosis, nor significant increase in apoptotic cells was observed (FIG. 3H) and preexisting focal signs of hepatocellular and endothelial injury marginally aggravated during preservation. In summary, we find that the human livers tested displayed no statistically significant difference in viability before and after extended subzero supercooling preservation. Although the difference in energy charge, oxygen uptake and apoptosis were not significant and small compared to referenced literature, they should be further investigated aiming to improve supercooling preservation.

With initial success of our supercooling protocol, we then subjected three livers to additional ex vivo normothermic reperfusion with blood as a model for transplantation (Bruinsma, B. G. et al. Peritransplant Energy Changes and Their Correlation to Outcome After Human Liver Transplantation: *Transplantation* 101, 1637-1644 (2017); Avruch, J. H. et al. A novel model for ex situ reperfusion of the human liver following subnormothermic machine perfusion. *TECHNOLOGY* 05, 196-200 (2017)) (FIGS. 1E and 5A-K). Unlike normothermic machine perfusion (NMP) which is intended to assess and improve liver viability, the blood used in reperfusion studies contains white blood cells (WBC), platelet and complement which are key components of ischemia reperfusion injury. This fundamental difference should be taken into account when we compare the viability parameters during reperfusion after supercooling to NMP data in literature after hypothermic preservation, which does not include the immunologic components. Accessibility of whole blood in sufficient quantities for human liver reperfusion studies is severely limited. Therefore, we recombined red blood cells and fresh frozen plasma instead. Although this is suboptimal to the use of fresh whole blood, we specifically used non-leuko reduced blood products and confirmed the presence of white blood cells and platelets (TABLE 3).

TABLE 3

Blood count values of the blood prior to reperfusion.

| | Absolute count | Relative count |
|---|---|---|
| White blood cells | $1.9 \times 10^3/\mu L$ | |
| Lymphocytes | $0.9 \times 10^3/\mu L$ | 45.7 % |
| Mid cells | $0.7 \times 10^3/\mu L$ | 35.9 % |
| Granulocytes | $0.3 \times 10^3/\mu L$ | 18.4 % |
| Red blood cells | $3.0 \times 10^6/\mu L$ | |
| Platelets | $87 \times 10^3/\mu L$ | |

Figure 4E:
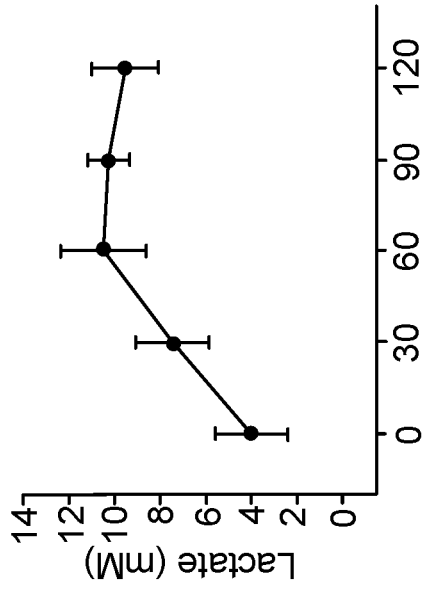
Figure 7C:
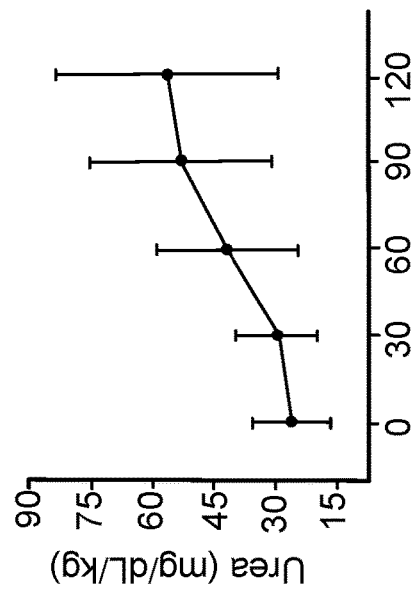

During blood reperfusion the livers had a stable energy charge (FIG. 4A and FIGS. 7A-7B). Moreover, the mean energy charge was higher after just 7 hours of HP than we previously found in both ex vivo studies and directly after reperfusion in transplanted human livers (Bruinsma, B. G. et al. Peritransplant Energy Changes and Their Correlation to Outcome After Human Liver Transplantation: *Transplantation* 101, 1637-1644 (2017)). The stability of energy charge during reperfusion is of additional importance since a drop after initial restoration of energy charge during clinical reperfusion was significantly correlated with early allograft dysfunction (Bruinsma, B. G. et al. Peritransplant Energy Changes and Their Correlation to Outcome After Human Liver Transplantation: *Transplantation* 101, 1637-1644 (2017)). This could potentially be explained by mitochondrial function that cannot keep up with the increased energy demand after the transition from a reduced to a full metabolic rate during normothermic reperfusion. Together with the increased oxygen consumption (FIG. 7C), the stable energy charge indicates preserved mitochondrial function after supercooling preservation.

Figure 4F:
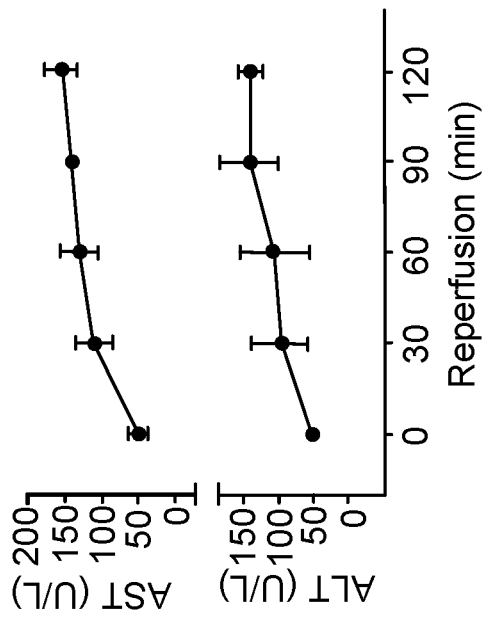
Figure 7D:
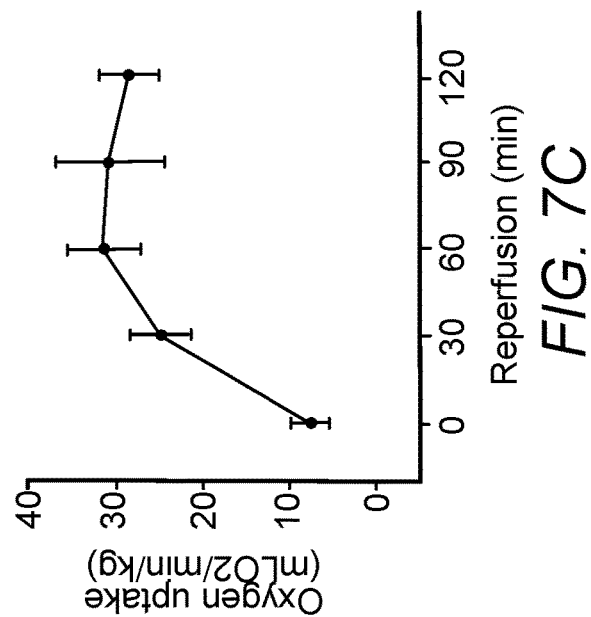
Figure 7E:
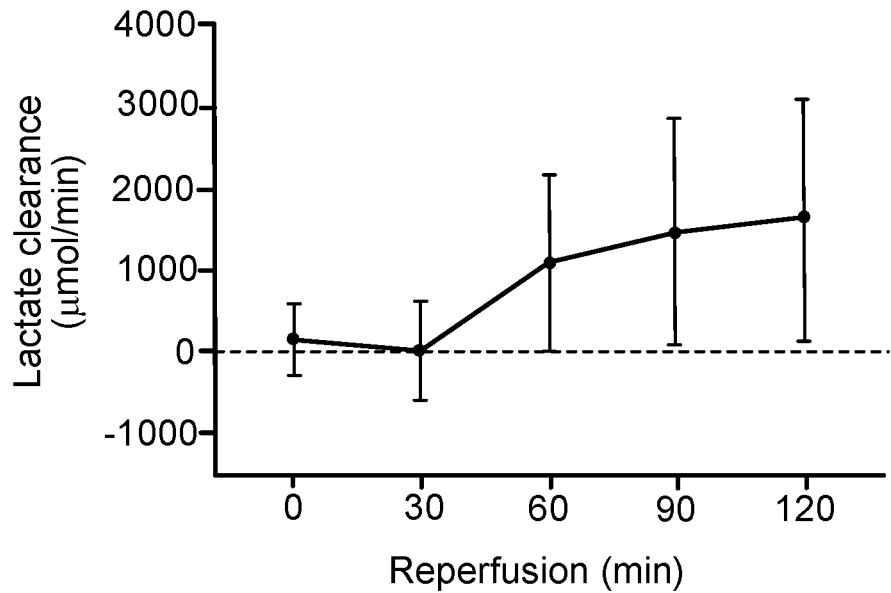

The higher metabolic rate during normothermic reperfusion resulted in increased liver function, reflected by bile and urea production and lactate metabolism. Bile (FIG. 4B) production increased as compared to SNMP and the resulting cumulative bile production volumes (per liver weight) correspond to the range of values reported in literature during NMP of transplanted (Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687: Bral, M. et al. Preliminary Single-Center Canadian Experience of Human Normothermic Ex Vivo Liver Perfusion: Results of a Clinical Trial. *Am. J. Transplant.* 17, 1071-1080 (2017); Mergental, H. et al. Transplantation of Declined Liver Allografts Following Normothermic Ex-Situ Evaluation. *Am. J. Transplant. Off. J. Am. Soc. Transplant. Am. Soc. Transpl. Surg.* 16, 3235-3245 (2016)) and non-transplanted (op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013); Sutton, M. E. et al. Criteria for viability assessment of discarded human donor livers during ex vivo normothermic machine perfusion. *PloS One* 9, e110642 (2014); Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687) livers. Bile pH, $HCO_3^-$ and glucose are increasingly acknowledged as important parameters of biliary function during NMP. The mean bile pH (FIG. 4C) and the bile $HCO_3^-$ (FIG. 4D) at the end of reperfusion respectively reached and surpassed the suggested criteria for transplantable liver viability (Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt.14687; Matton, A. P. M. et al. Biliary Bicarbonate, pH and Glucose Are Suitable Biomarkers of Biliary Viability During Ex Situ Normothermic Machine Perfusion of Human Donor Livers. *Transplantation* (2018). doi: 10.1097/TP.0000000000002500; Watson, C. J. E. & Jochmans, I. From 'Gut Feeling' to Objectivity: Machine Preservation of the Liver as a Tool to Assess Organ Viability. *Curr. Transplant. Rep.* 5, 72-81 (2018)). Although the bile glucose concentrations during reperfusion (FIG. 4E) were higher than proposed clinical transplantable criteria, they were the same as reported for research quality livers by others (Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687). Notably, these livers were perfused after much shorter clinically used durations of HP. Urea production (FIG. 7D) also increased as a result of the increased metabolic rate and was higher than reported by others during NMP in both ex vivo (op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013)) and clinical studies (Reiling, J. et al. Urea production during normothermic machine perfusion: Price of success? *Liver Transplant. Off. Publ. Am. Assoc. Study Liver Dis. Int. Liver Transplant. Soc.* 21, 700-703 (2015)), indicating preserved liver function. Like others during NMP (Bruinsma, B. G. et al. Peritransplant Energy Changes and Their Correlation to Outcome After Human Liver Transplantation: *Transplantation* 101, 1637-1644 (2017); op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013); Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687; Bral, M. et al. Preliminary Single-Center Canadian Experience of Human Normothermic Ex Vivo Liver Perfusion: Results of a Clinical Trial. *Am. J. Transplant.* 17, 1071-1080 (2017); Mergental, H. et al. *Transplantation* of Declined Liver Allografts Following Normothermic Ex-Situ Evaluation. *Am. J. Transplant. Off. J. Am. Soc. Transplant. Am. Soc. Transpl. Surg.* 16, 3235-3245 (2016)), we observed a rise in lactate during the first hour of reperfusion and subsequent clearance (FIGS. 4F and 8E). It should be considered that the livers in this study were initially rejected for transplantation and the confidence intervals of the lactate concentration at the end of reperfusion largely overlap with time matched values reported by others during NMP of rejected human livers (op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013); Westerkamp, A. C. et al. Oxygenated Hypothermic Machine Perfusion After Static Cold Storage Improves Hepatobiliary Function of Extended Criteria Donor Livers. *Transplantation* 100, 825-835 (2016)).

Figure 4G:
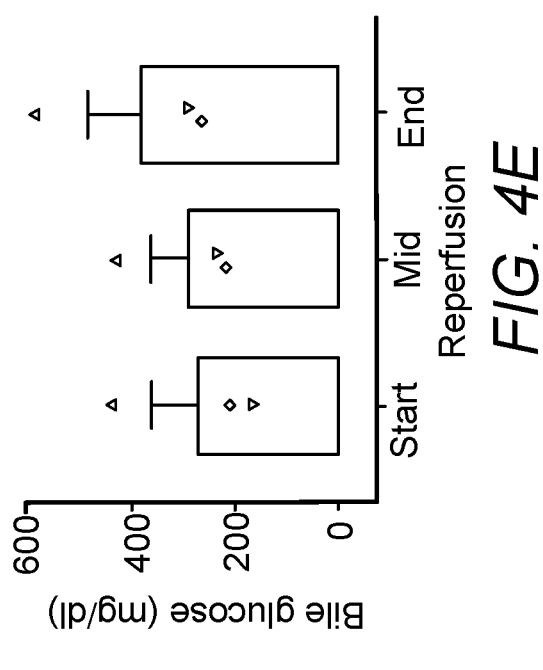
Figure 4H:
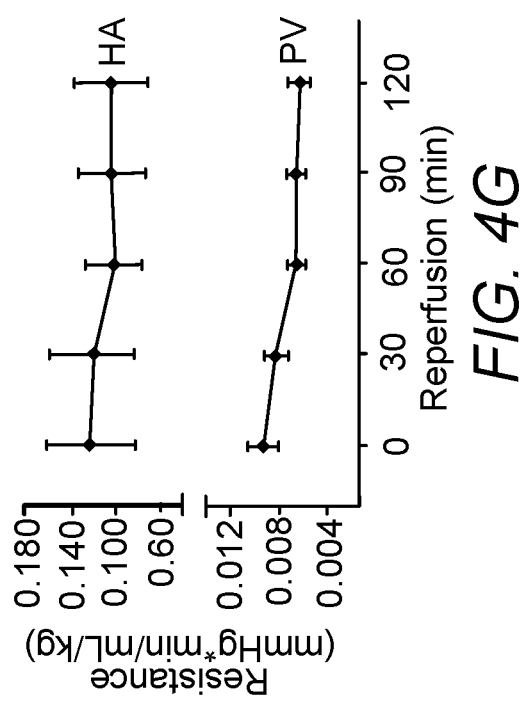
Figure 4J:
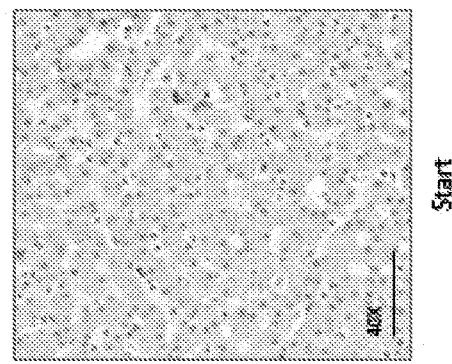
Figure 4I:
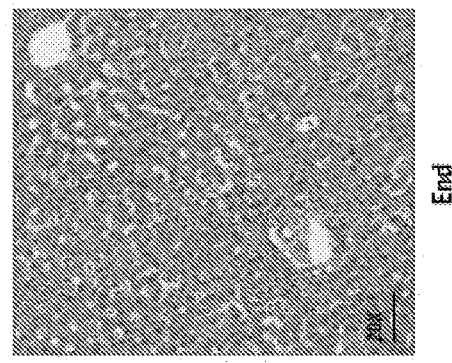

In addition to liver function and metabolism we assessed liver injury during simulated transplantation. Absolute values of vascular resistance are dependent on machine perfusion modality and values that correspond to viability remain to be sustained. However, stable resistance profiles as we found during reperfusion (FIG. 4G) are favorable since increasing resistance may reflect endothelial injury and hepatocellular edema as a measure of decreasing viability. The early increase in AST and ALT (FIG. 4H) during the first half hour of reperfusion is less than we expected based on reported AST and ALT levels during NMP in literature (op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013); Sutton, M. E. et al. Criteria for viability assessment of discarded human donor livers during ex vivo normothermic machine perfusion. *PloS One* 9, e110642 (2014); Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687; Bral, M. et al. Preliminary Single-Center Canadian Experience of Human Normothermic Ex Vivo Liver Perfusion: Results of a Clinical Trial. *Am. J. Transplant.* 17, 1071-1080 (2017); Reiling, J. et al. Urea production during normothermic machine perfusion: Price of success? *Liver Transplant. Off. Publ. Am. Assoc. Study Liver Dis. Int. Liver Transplant. Soc.* 21, 700-703 (2015); Selzner, M. et al. Normothermic ex vivo liver perfusion using steen solution as perfusate for human liver transplantation: First North American results. *Liver Transplant. Off. Publ. Am. Assoc. Study Liver Dis. Int. Liver Transplant. Soc.* 22, 1501-1508 (2016)). Histology after reperfusion (FIGS. 4I-4J) shows preserved lobular architecture with patches of reversible hepatocellular injury in the form of hepatocellular edema and hydropic changes.

Figure 4K:
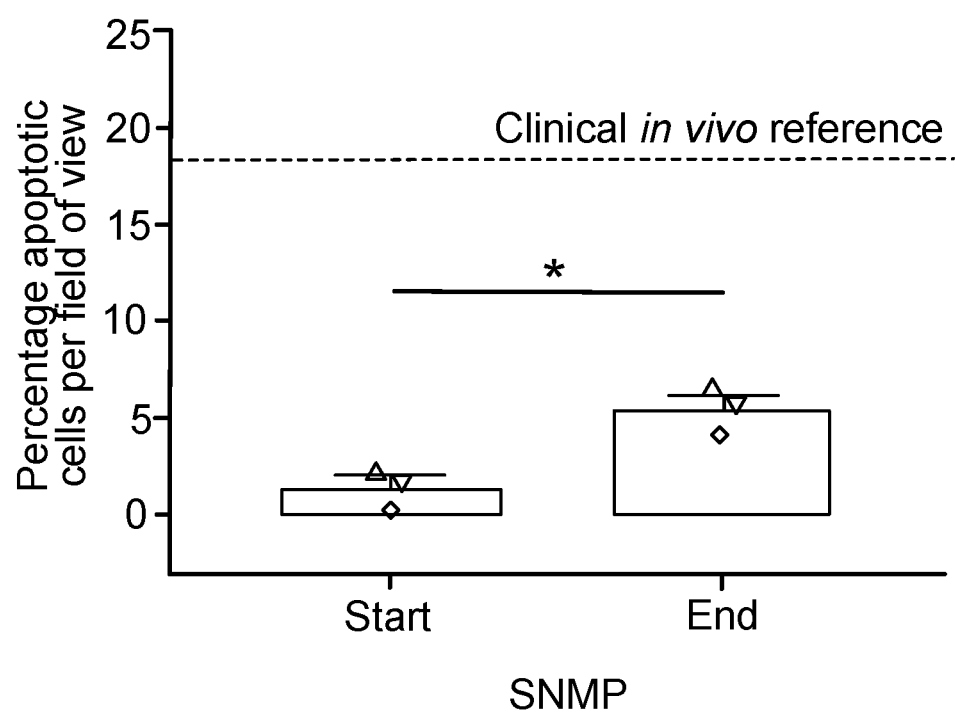
Figure 5:
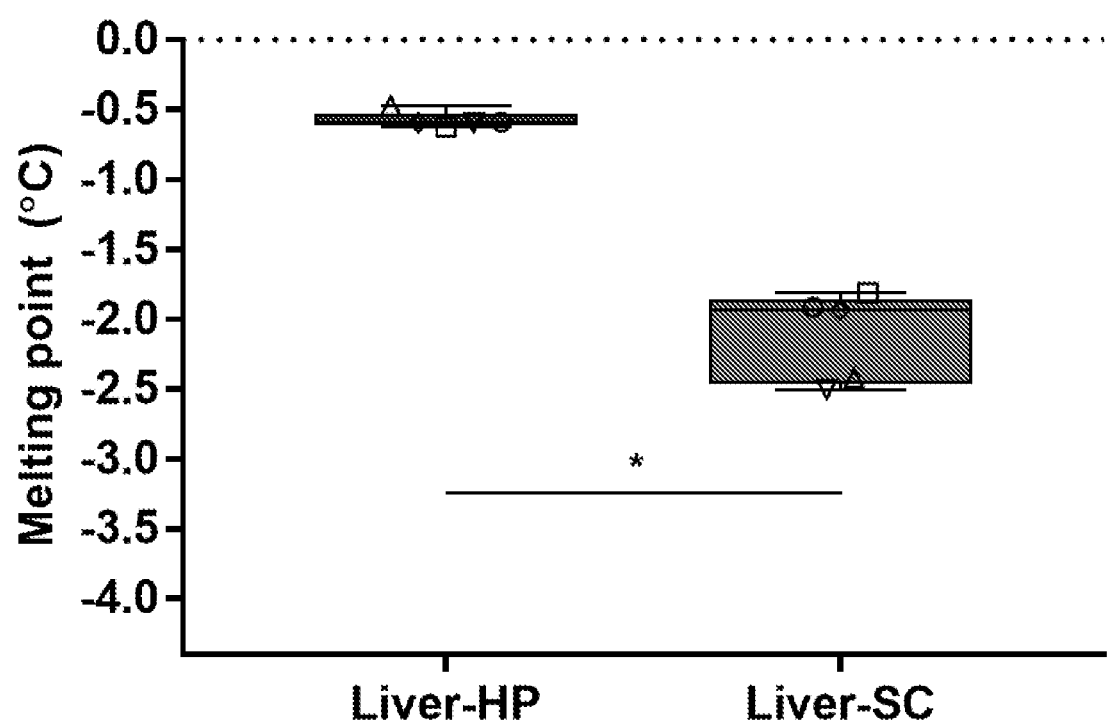
FIG. 5 is a graph showing melting points of liquids in liver preserved in University of Wisconsin hypothermic (HP) solution and supercooling (SC) preservation solution of the present disclosure. Star: p<0.05.
Figure 7F:
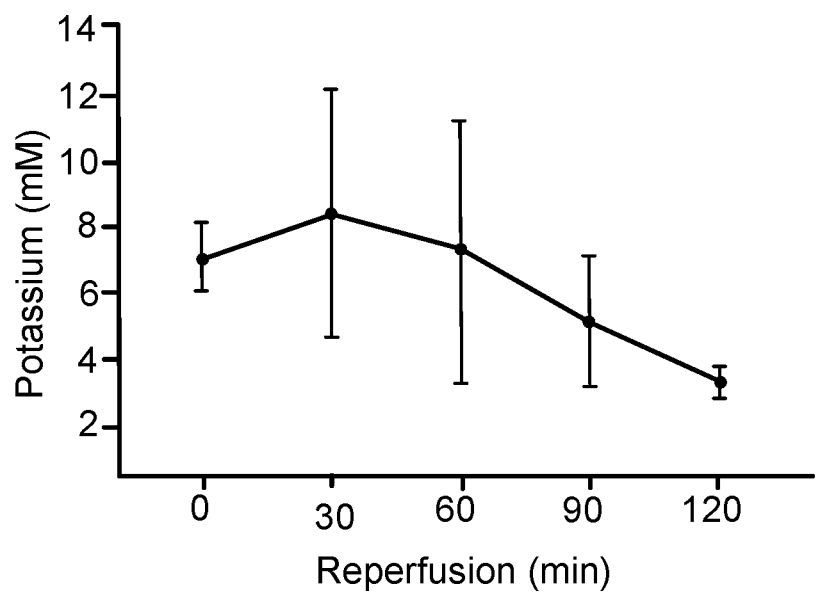

Focal spots of hepatocyte dropout with loss of sinusoidal endothelial were observed in the pericentral zone and were markedly correlated to the initial histology of the liver graft, suggesting that the pre-existing injury of the marginal grafts aggravated during reperfusion. We found a significant ($p=0.009=32.89$) increase in apoptotic cells to a percentage of 5.5% (FIG. 4K), while over 15% is normally the case directly after full reperfusion in vivo during transplantation (Borghi-Scoazec, G. et al. Apoptosis after ischemia-reperfusion in human liver allografts. *Liver Transplant. Surg. Off. Publ. Am. Assoc. Study Liver Dis. Int. Liver Transplant. Soc.* 3, 407-415 (1997)). It should be noted that apoptosis can continue to develop beyond the two-hour time course that is covered by both our ex vivo reperfusion model and the peroperative reference during clinical liver transplantation. Limited (hepato)cellular injury is furthermore confirmed by decreasing potassium after the first half our of reperfusion as well (FIG. 7F).

In this study, we showed for the first time the feasibility of subzero human organ preservation using discarded human livers. To achieve this, we developed a new multi-temperature perfusion protocol, featuring practical steps to minimize air-liquid interfaces, and repurposed cryoprotective agents to stabilize the supercooled state of a large aqueous volume, which was crucial to prevent human livers from freezing during supercooling. We validated our approach with viability assessment of the grafts during SNMP before and after supercooling and by normothermic reperfusion with blood as a model for transplantation.

Formally, this model can only suggest the adequacy of supercooling preservation. However, in the case of preclinical human tissue studies, ex vivo viability assessment during machine perfusion has strong theoretical background and is supported by experimental and clinical transplantation studies: these all indicate that supercooled human grafts retained their viability despite significantly extended preservation as compared to the clinical standard. Moreover, we observed parameters indicating viability during simulated transplantation of marginal livers up to 44 hours after procurement.

While we limited this feasibility study to −4° C., further optimization of the supercooling protocol could potentially reduce the ice-free storage temperature. Also, reduction or substitution of the glycerol in the supercooling preservation solution might be beneficial to avert potential glycerol phosphorylation during supercooling. Both might lower the rate of ATP depletion during supercooling and consequently increase the preservation duration. Rewarming perfusion is a key step in reducing reperfusion injury after supercooling, and may benefit further from either new machine perfusion modalities used in clinical trials, or emerging new technologies in ensuring optimum rewarming temperatures (Manuchehrabadi, N. et al. Improved tissue cryopreservation using inductive heating of magnetic nanoparticles. *Sci. Transl. Med.* 9, (2017)). The use of human livers makes this study clinically relevant and promotes the translation of subzero organ preservation to the clinic. However, long-term survival experiments of transplanted supercooled livers in swine or an alternative large animal model will be needed before clinical translation.

REFERENCES

1. Giwa, S. et al. The promise of organ and tissue preservation to transform medicine. *Nat. Biotechnol.* 35, 530-542 (2017).
2. Buying time for transplants. *Nat. Biotechnol.* 35, 801 (2017).
3. Alvarez, L. et al. Saving Organ Shortage Through Organ Banking and Bioengineering. (2015).
4. Bruinsma, B. G. & Uygun, K. Subzero organ preservation: the dawn of a new ice age? *Curr. Opin. Organ Transplant.* 22, 281-286 (2017).
5. Berendsen, T. A. et al. Supercooling enables long-term transplantation survival following 4 days of liver preservation. *Nat. Med.* 20, 790-793 (2014).
6. Bruinsma, B. G. et al. Supercooling preservation and transplantation of the rat liver. *Nat. Protoc.* 10, 484-494 (2015).
7. *Supercooling*. (InTech, 2012). doi: 10.5772/1978
8. Huang, H., Yarmush, M. L. & Usta, O. B. Long-term deep-supercooling of large-volume water and red cell suspensions via surface sealing with immiscible liquids. *Nat. Commun.* 9, 3201 (2018).
9. Storey, K. B. & Storey, J. M. Molecular Biology of Freezing Tolerance. in *Comprehensive Physiology* 3, 1283-1308 (American Cancer Society).
10. Best, B. P. Cryoprotectant Toxicity: Facts, Issues, and Questions. *Rejuvenation Res.* 18, 422-436 (2015).
11. Dutheil, D., Underhaug Gjerde, A., Petit-Paris, I., Mauco, G. & Holmsen, H. Polyethy lene glycols interact with membrane glycerophospholipids: is this part of their mechanism for hypothermic graft protection? *J. Chem. Biol.* 2, 39-49 (2009).
12. Oltean, M. et al. Intraluminal polyethylene glycol stabilizes tight junctions and improves intestinal preservation in the rat. *Am. J. Transplant. Off. J. Am. Soc. Transplant. Am. Soc. Transpl. Surg.* 12, 2044-2051 (2012).
13. Jacobsen, I. A., Pegg, D. E., Wusteman, M. C. & Robinson, S. M. Transplantation of rabbit kidneys perfused with glycerol solutions at 10 degrees C. *Cryobiology* 15, 18-26 (1978).
14. Hart, N. A. et al. Determination of an adequate perfusion pressure for continuous dual vessel hypothermic machine perfusion of the rat liver. *Transpl. Int.* 20, 343-352 (2007).
15. Bruinsma, B. G. et al. Subnormothermic Machine Perfusion for Ex Vivo Preservation and Recovery of the Human Liver for Transplantation: Subnormothermic Machine Perfusion of Human Livers. *Am. J. Transplant.* 14, 1400-1409 (2014).
16. Bruinsma, B. G. et al. Metabolic profiling during ex vivo machine perfusion of the human liver. *Sci. Rep.* 6, 22415 (2016).
17. Sridharan, G. V. et al. Metabolomic Modularity Analysis (MMA) to Quantify Human Liver Perfusion Dynamics. *Metabolites* 7, (2017).
18. Vajdová, K., Graf, R. & Clavien, P.-A. ATP-supplies in the cold-preserved liver: A long-neglected factor of organ viability. *Hepatol. Baltim. Md* 36, 1543-1552 (2002).
19. Higashi, H., Takenaka, K., Fukuzawa, K., Yoshida, Y. & Sugimachi, K. Restoration of ATP contents in the transplanted liver closely relates to graft viability in dogs. *Eur. Surg. Res. Eur. Chir. Forsch. Rech. Chir. Eur.* 21, 76-82 (1989).
20. Bruinsma, B. G. et al. Peritransplant Energy Changes and Their Correlation to Outcome After Human Liver Transplantation: *Transplantation* 101, 1637-1644 (2017).
21. Lanir, A. et al. Hepatic transplantation survival: correlation with adenine nucleotide level in donor liver. *Hepatol. Baltim. Md* 8, 471-475 (1988).
22. Kamiike, W. et al. Adenine nucleotide metabolism and its relation to organ viability in human liver transplantation. *Transplantation* 45, 138-143 (1988).
23. Bruinsma, B. G., Berendsen, T. A., Izamis, M.-L., Yarmush, M. L. & Uygun, K. Determination and extension of the limits to static cold storage using subnormothermic machine perfusion. *Int. J. Artif. Organs* 36, 775-780 (2013).
24. op den Dries, S. et al. Ex vivo Normothermic Machine Perfusion and Viability Testing of Discarded Human Donor Livers: Normothermic Perfusion of Human Livers. *Am. J. Transplant.* 13, 1327-1335 (2013).
25. Sutton, M. E. et al. Criteria for viability assessment of discarded human donor livers during ex vivo normothermic machine perfusion. *PloS One* 9, e110642 (2014).
26. Watson, C. J. E. et al. Observations on the ex situ perfusion of livers for transplantation. *Am. J. Transplant. Off. J. Am. Soc. Transplant. Am. Soc. Transpl. Surg.* (2018). doi: 10.1111/ajt. 14687
27. Avruch, J. H. et al. A novel model for ex situ reperfusion of the human liver following subnormothermic machine perfusion. *TECHNOLOGY* 05, 196-200 (2017).
28. Bral, M. et al. Preliminary Single-Center Canadian Experience of Human Normothermic Ex Vivo Liver Perfusion: Results of a Clinical Trial. *Am. J. Transplant.* 17, 1071-1080 (2017).
29. Mergental, H. et al. *Transplantation* of Declined Liver Allografts Following Normothermic Ex-Situ Evaluation. *Am. J. Transplant. Off. J. Am. Soc. Transplant. Am. Soc. Transpl. Surg.* 16, 3235-3245 (2016).
30. Matton, A. P. M. et al. Biliary Bicarbonate, pH and Glucose Are Suitable Biomarkers of Biliary Viability During Ex Situ Normothermic Machine Perfusion of Human Donor Livers. *Transplantation* (2018). doi: 10.1097/TP.0000000000002500
31. Watson, C. J. E. & Jochmans, I. From 'Gut Feeling' to Objectivity: Machine Preservation of the Liver as a Tool to Assess Organ Viability. *Curr. Transplant. Rep.* 5, 72-81 (2018).
32. Reiling, J. et al. Urea production during normothermic machine perfusion: Price of success? *Liver Transplant. Off. Publ. Am. Assoc. Study Liver Dis. Int. Liver Transplant. Soc.* 21, 700-703 (2015).
33. Westerkamp, A. C. et al. Oxygenated Hypothermic Machine Perfusion After Static Cold Storage Improves Hepatobiliary Function of Extended Criteria Donor Livers. *Transplantation* 100, 825-835 (2016).
34. Borghi-Scoazec, G. et al. Apoptosis after ischemia-reperfusion in human liver allografts. *Liver Transplant. Surg. Off. Publ. Am. Assoc. Study Liver Dis. Int. Liver Transplant. Soc.* 3, 407-415 (1997).
35. Selzner, M. et al. Normothermic ex vivo liver perfusion using steen solution as perfusate for human liver transplantation: First North American results. *Liver Transplant. Off. Publ. Am. Assoc. Study Liver Dis. Int. Liver Transplant. Soc.* 22, 1501-1508 (2016).
36. Manuchehrabadi, N. et al. Improved tissue cryopreservation using inductive heating of magnetic nanoparticles. *Sci. Transl. Med.* 9, (2017).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for preserving a biological sample, the method comprising:
   (a) perfusing the biological sample at a first perfusion rate with a first loading solution comprising one or more cryoprotective agent(s) at a hypothermic temperature between 0° C. and 12° C.;
   (b) perfusing the biological sample at a second perfusion rate lower than the first perfusion rate with a second loading solution comprising a higher concentration of at least one of the one or more cryoprotective agent(s) than in the first loading solution at a hypothermic temperature;
   (c) placing the perfused biological sample in a container;
   (d) removing air from the container to avoid ice crystal formation in cells within the biological sample or the first and second loading solutions, and sealing the container; and
   (e) cooling the biological sample in the container to a subzero temperature, thereby preserving the biological sample at a subzero temperature.

2. The method of claim 1, wherein the method further comprises, prior to step (a):
   perfusing the biological sample with a pre-supercooling recovery solution comprising one or more cryoprotective agent(s) at a sub-normothermic temperature between 12° C. and 35° C.; and
   perfusing the biological sample with the pre-supercooling recovery solution at a hypothermic temperature.

3. The method of claim 2, wherein the perfusion step at a sub-normothermic temperature comprises supplementing the pre-supercooling recovery solution with insulin and one or more additional cryoprotective agent(s) during the perfusion step.

4. The method of claim 2, wherein the perfusion step at sub-normothermic temperature comprises replacing the pre-supercooling recovery solution with a pre-supercooling recovery solution further comprising insulin and one or more additional cryoprotective agent(s) during the perfusion step.

5. The method of claim 2, wherein the pre-supercooling recovery solution further comprises one or more of insulin, dexamethasone, heparin, antibiotics, albumin, and Williams' medium E.

6. The method of claim 2, wherein the perfusion step at the sub-normothermic temperature comprises perfusing the biological sample by single-pass perfusion followed by recirculation perfusion; the perfusion step at the hypothermic temperature comprises perfusing the biological sample by recirculation perfusion; or all perfusion steps are performed with a perfusion rate that is lower than a perfusion rate of blood that the biological sample would experience in vivo.

7. The method of claim 1, further comprising:
   (f) perfusing the biological sample with an unloading solution comprising one or more cryoprotective agent (s) at a hypothermic temperature between 0° ° C. and 12° ° C.;
   (g) perfusing the biological sample with a post-supercooling recovery solution comprising one or more cryoprotective agent(s) at a sub-normothermic temperature between 12° C. and 35° C.; and
   (h) warming the biological sample to a normothermic temperature, thereby recovering the preserved biological sample for use.

8. The method of claim 7, wherein:
   step (f) is performed for a duration of approximately 10 minute; and/or
   step (g) is performed for approximately 3 hours, and/or wherein steps (a) and (b) each comprises perfusing the biological sample by single-pass perfusion.

9. The method of claim 1, wherein the first loading solution comprises one or more of the following cryoprotective agents: polyethylene glycol (PEG), glycerol, trehalose, and University of Wisconsin solution (UW).

10. The method of claim 1, wherein the second loading solution comprises a higher concentration of glycerol than the first loading solution.

11. The method of claim 1, wherein the subzero temperature is about −4° C.

12. The method of claim 11, wherein the subzero temperature ranges from −4° C. to −40° C.

13. The method of claim 1, wherein the removal of air from the container results in elimination or reduction of one or more liquid-air interfaces in the container, thereby reducing or eliminating formation of ice crystals.

14. The method of claim 1, wherein the perfusion of the biological sample with the first loading solution and/or the second loading solution reduces the melting temperature of a liquid within the biological sample.

15. The method of claim 1, wherein the biological sample remains unfrozen when cooled to a subzero temperature.

16. The method of claim 1, wherein the biological sample is an organ or tissue.

17. The method of claim 16, wherein the organ is a donor organ for organ transplantation.

18. The method of claim 1, wherein the biological sample is obtained from a human, a primate, or a pig.

19. The method of claim 1, wherein:
   steps (a) and (b), combined, are performed for a duration of approximately 1 hour.

20. The method of claim 1, wherein the biological sample is a human liver and wherein the human liver is perfused by portal and arterial perfusion at a perfusion rate for step (a) maintained at a level sufficient to obtain perfusion pressure of about 3 mmHg for a portal vein (PV) and about 30 mmHg for a hepatic artery (HA) for a period of time.

21. The method of claim 1, wherein the perfusion steps are performed using a pump that generates non-pulsatile flow.

22. The method of claim 1, wherein the biological sample is preserved at the subzero temperature for 12 hours to 24 hours.

23. The method of claim 7, wherein the hypothermic temperature is about 4° C.

24. The method of claim 2, wherein the sub-normothermic temperature is about 21° C.

25. The method of claim 7, wherein the normothermic temperature is greater than 35° C.

26. The method of claim 25, wherein the normothermic temperature is about 37° C.

27. The method of claim 16, wherein the organ is a lab-grown organ.

28. The method of claim 16, wherein the organ is a heart, kidney, bone, lung, eye, ovary, pancreas or any tissues that can be perfused through a vessel such as limbs and other vascular composite allografts.

29. The method of claim 16, wherein the organ is a liver.

* * * * *